United States Patent
Sugihara et al.

(10) Patent No.: US 7,949,487 B2
(45) Date of Patent: May 24, 2011

(54) MOVING BODY POSTURE ANGLE DETECTING APPARATUS

(75) Inventors: Hisayoshi Sugihara, Aichi-ken (JP); Yutaka Nonomura, Nagoya (JP); Motohiro Fujiyoshi, Seto (JP)

(73) Assignees: Toyota Jidosha Kabushiki Kaisha, Toyota-shi, Aichi-ken (JP); Kabushiki Kaisha Toyota Chuo Kenkyusho, Aichi-gun, Aichi-ken (JP)

( * ) Notice: Subject to any disclaimer, the term of this patent is extended or adjusted under 35 U.S.C. 154(b) by 526 days.

(21) Appl. No.: 11/989,767

(22) PCT Filed: Aug. 1, 2006

(86) PCT No.: PCT/IB2006/002084
§ 371 (c)(1),
(2), (4) Date: Jan. 31, 2008

(87) PCT Pub. No.: WO2007/015134
PCT Pub. Date: Feb. 8, 2007

(65) Prior Publication Data
US 2010/0138180 A1    Jun. 3, 2010

(30) Foreign Application Priority Data
Aug. 1, 2005 (JP) ................. 2005-223507

(51) Int. Cl.
*G01C 17/38* (2006.01)
*G01P 15/00* (2006.01)
*G01P 3/00* (2006.01)

(52) U.S. Cl. ............... 702/96; 318/568.12; 318/611; 701/25; 702/141; 702/145

(58) Field of Classification Search ............. 702/94, 702/96, 141, 145; 701/25, 38; 318/568.11, 318/568.12, 611; 700/251; 324/207.17
See application file for complete search history.

(56) References Cited

U.S. PATENT DOCUMENTS
5,180,956 A    1/1993    Oaki et al.
(Continued)

FOREIGN PATENT DOCUMENTS
EP    1 132 790 A1    9/2001
(Continued)

OTHER PUBLICATIONS
International Search Report.
(Continued)

*Primary Examiner* — John H Le
(74) *Attorney, Agent, or Firm* — Finnegan, Henderson, Farabow, Garrett & Dunner, LLP

(57) ABSTRACT

An angular velocity detected by an angular velocity sensor (10) is integrated by a small angle matrix calculator (12) and a matrix adding calculator (14), and then restored as a posture angle (angular velocity posture angle) by a matrix posture angle calculator (16). A posture matrix is calculated by a tilt angle calculator (22) and an acceleration matrix calculator (24) and an acceleration detected by an acceleration sensor (20) is restored as a posture angle (acceleration posture angle) by a matrix posture angle calculator (26). Low pass filters (18, 28) each extract a low range component, the difference between the two is calculated by a differencer (30), and only the drift amount is extracted. A subtracter (32) removes the drift amount from the angular velocity posture angle and the result is output from an output device (34). In addition, a posture angle matrix calculator (36) converts the result to a posture matrix, which it feeds back to the matrix adding calculator (14).

35 Claims, 30 Drawing Sheets

U.S. PATENT DOCUMENTS

| | | | |
|---|---|---|---|
| 5,737,500 | A | 4/1998 | Seraji et al. |
| 6,259,249 | B1 | 7/2001 | Miyata |
| 6,507,165 | B2 * | 1/2003 | Kato et al. .................... 318/611 |
| 7,292,000 | B2 * | 11/2007 | Saotome et al. ......... 318/568.12 |
| 7,337,046 | B2 * | 2/2008 | Minowa et al. ................. 701/25 |
| 7,610,313 | B2 * | 10/2009 | Kawai et al. ......................... 1/1 |

FOREIGN PATENT DOCUMENTS

| | | |
|---|---|---|
| EP | 1 502 712 A1 | 2/2005 |
| EP | 1 541 965 A1 | 6/2005 |
| JP | 9-318382 | 12/1997 |
| JP | A-2004-268730 | 9/2004 |
| WO | WO 2005/005108 | 1/2005 |

OTHER PUBLICATIONS

Written Opinion of the ISR.

Notification of Reason(s) for Refusal for JP Appl. No. 2008-524609 dated Nov. 16, 2010.

* cited by examiner

MOVING BODY POSTURE ANGLE DETECTING APPARATUS

INCORPORATION BY REFERENCE

The disclosure of Japanese Patent Application No. 2005-223507 filed on Aug. 1, 2005, including the specification, drawings and abstract is incorporated herein by reference in its entirety.

BACKGROUND OF THE INVENTION

1. Field of the Invention

The invention relates to a moving body posture angle detecting apparatus, and more particularly, to technology that accurately detects a posture angle of a moving body such as a robot.

2. Description of the Related Art

Acceleration sensors and angular velocity sensors are used in posture control of moving bodies such as robots. When three orthogonal axes are designated as an x axis, a y axis, and a z axis, the accelerations in the directions of these three axes are detected by three acceleration sensors and the angular velocities in the directions of the three axes are detected by three angular velocity sensors. The angles around the axes, i.e., posture angles, are obtained by time-integrating the outputs from the angular velocity sensors such that the pitch angle, the roll angle, and the yaw angle can be calculated. Japanese Patent Application Publication No. JP-A-2004-268730 describes technology which performs posture control using posture data and acceleration data output from gyro sensors.

When the offset and drift of the angular velocity sensors (yaw rate sensors) are large, however, the offset and drift values accumulate gradually and end up being extremely large values because the posture angle is obtained by the integration of the angular velocity. Those values increase with time and ultimately diverge. This problem can be avoided by using angular velocity sensors with little offset and drift, but these kinds of sensors are large, heavy, and expensive.

On the other hand, it is possible to correct the accumulation of errors from integration by detecting the gravitational direction with an acceleration sensor and correcting the posture angle obtained by the angular velocity sensor at an appropriate timing using this gravitational direction. Unfortunately, however, this method is unable to be used when the changes in movement of the moving body are fast and acceleration other than gravity is frequently generated.

BRIEF DESCRIPTION OF THE INVENTION

This invention thus provides an apparatus that is capable of detecting the posture angle of a moving body by preventing the accumulation of integration errors by means of a simple structure without using expensive, highly accurate angular velocity sensors.

One aspect of the invention relates to a moving body posture angle detecting apparatus which includes an angular velocity sensor which detects an angular velocity of a moving body; an acceleration sensor which detects an acceleration of the moving body; an angular velocity posture angle calculating device that calculates, as an angular velocity posture angle, a posture angle of the moving body from the angular velocity; an acceleration posture angle calculating device that calculates, as an acceleration posture angle, a posture angle of the moving body from the acceleration; an angular velocity posture angle low range component extracting device that extracts a low range component of the angular velocity posture angle; an acceleration posture angle low range component extracting device that extracts a low range component of the acceleration posture angle; a difference calculating device that calculates, as error, a difference between the low range component of the angular velocity posture angle and the low range component of the acceleration posture angle; an error removing device that removes the error from the angular velocity posture angle; an outputting device that outputs, as a posture angle of the moving body, an angular velocity posture angle from which the error has been removed by the error removing device; and a feedback device that feeds back the angular velocity posture angle from which the error has been removed by the error removing device to the angular velocity posture angle calculating device.

In this aspect of the invention, the angular velocity posture angle low range component extracting device and the acceleration posture angle low range component extracting device may include a device that sin converts and cos converts the angular velocity posture angle; a device that extracts a low range component of a value obtained by the sin conversion and the cos conversion; and a device that performs an atan 2 calculation or an atan calculation on the value of the extracted low component.

Another aspect of the invention relates to a moving body posture angle detecting apparatus which includes an angular velocity sensor which detects an angular velocity of a moving body; an acceleration sensor which detects an acceleration of the moving body; an angular velocity posture angle calculating device that calculates, as an angular velocity posture angle, a posture angle of the moving body from the angular velocity; an acceleration posture angle calculating device that calculates, as an acceleration posture angle, a posture angle of the moving body from the acceleration; a difference calculating device that calculates a difference between the angular velocity posture angle and the acceleration posture angle; a low range component extracting device that extracts, as error, a low range component of the difference; an error removing device that removes the error from the angular velocity posture angle; an outputting device that outputs, as a posture angle of the moving body, an angular velocity posture angle from which the error has been removed by the error removing device; and a feedback device that feeds back the angular velocity posture angle from which the error has been removed by the error removing device to the angular velocity posture angle calculating device.

Another aspect of the invention relates to a moving body posture angle detecting apparatus which includes an angular velocity sensor which detects an angular velocity of a moving body; an acceleration sensor which detects an acceleration of the moving body; a device that calculates a small angle matrix which defines a small rotation angle after a small period of time ts has passed from the angular velocity; a device that calculates a new angular velocity system posture matrix from the small angle matrix and a posture matrix that was fed back; a device that calculates a tilt angle from the acceleration; a device that calculates an acceleration system posture matrix from the tilt angle; an angular velocity system low range component extracting device that extracts a low range component of the angular velocity system posture matrix; an acceleration system low range component extracting device that extracts a low range component of the acceleration system posture matrix; a difference calculating device that calculates, as error, a difference between the low range component of the angular velocity system posture matrix and the low range component of the acceleration system posture matrix; an error removing device that removes the error from the angular velocity system posture matrix; an outputting device that calculates a posture angle from the angular velocity system posture matrix from which the error has been removed by the error removing device and outputs the result a posture angle of the moving body; and a feedback device that feeds back the angular velocity system posture matrix from which the error has been removed by the error removing device to the device that calculates the new angular velocity system posture matrix.

Still another aspect of the invention relates to a moving body posture angle detecting apparatus which includes an angular velocity sensor which detects an angular velocity of a moving body; an acceleration sensor which detects an acceleration of the moving body; a device that calculates a small angle quaternion which defines a small rotation angle after a small period of time ts has passed from the angular velocity; a device that calculates a new angular velocity system quaternion from the small angle quaternion and a quaternion that was fed back; a device that calculates a tilt angle from the acceleration; a device that calculates an acceleration system posture matrix from the tilt angle; an angular velocity system low range component extracting device that calculates a low range component of the angular velocity system quaternion; an acceleration system low range component extracting device that extracts a low range component of the acceleration system quaternion; a difference calculating device that calculates, as error, a difference between the low range component of the angular velocity system quaternion and the low range component of the acceleration system quaternion; an error removing device that removes the error from the angular velocity system quaternion; an outputting device that calculates a posture angle from the angular velocity system quaternion from which the error has been removed by the error removing device and outputs the result a posture angle of the moving body; and a feedback device that feeds back the angular velocity system quaternion from which the error has been removed by the error removing device to the means for calculating the new angular velocity system quaternion.

In the invention, the angular velocity posture angle, which is the posture angle calculated based on the angular velocity that was detected by the angular velocity sensor, is supplied to the low range component extracting device. The angular velocity posture angle includes a drift amount from the accumulation of integration error. Thus when the true value of the posture angle is divided into a high range component and a low range component, the angular velocity posture angle includes (a high range posture angle true value+a low range posture angle true value+a low range drift amount). The low range component extracting device removes the high range component and extracts (the low range posture angle true value+the low range drift amount). Meanwhile, the acceleration posture angle, which is the posture angle calculated based on the acceleration that was detected by the acceleration sensor, is also supplied to the low range component extracting device. The acceleration posture angle includes a high range noise component and a low range posture angle true value, but does not include a drift amount from the accumulation of integration error. The low range component extracting device removes the high range component and extracts the low range posture angle true value. Therefore, supplying the outputs of these low range component extracting device to the difference calculating device and calculating (the low range posture angle true value+the low range drift amount)−(the low range posture angle true value) enables only the drift amount (i.e., the error) to be extracted. A highly accurate posture angle can then be detected by removing the extracted drift amount from the angular velocity posture angle. Also, removing the extracted drift amount from the angular velocity posture angle and feeding back the result prevents the accumulation of integration error, improves output responsiveness, and stabilizes the output. The high range noise amount includes oscillation acceleration noise and electrical noise components, and an acceleration component other than gravitational force following movement of a measured body. In particular, noise from the acceleration component other than gravity following movement of the measured body becomes a large noise component in small measured bodies having large amounts of motion, such as robots, which is a major obstacle in obtaining a posture angle.

Also in the invention, the angular velocity system posture matrix calculated based on the angular velocity that was detected by the angular velocity sensor is supplied to the low range component extracting device. The angular velocity system posture matrix includes a drift amount from the accumulation of integration error. Thus when the true value of the posture is divided into a high range component and a low range component, the angular velocity system posture matrix includes (a high range posture true value+a low range posture true value+a low range drift amount). The low range component extracting device removes the high range component and extracts (the low range posture true value+the low range drift amount). Meanwhile, the acceleration system posture matrix calculated based on the acceleration that was detected by the acceleration sensor is also supplied to the low range component extracting device. The acceleration system posture matrix includes a high range noise component, a high range posture true value component, and a low range posture true value, but does not include a drift amount from the accumulation of integration error. The low range component extracting device removes the high range component and extracts the low range posture true value. Therefore, supplying the outputs of these low range component extracting device to the difference calculating device and calculating (the low range posture true value+the low range drift amount)−(the low range posture true value) enables only the drift amount (i.e., the error) to be extracted. A highly accurate posture angle can then be detected by removing the extracted drift amount from the angular velocity system posture matrix to obtain an angular velocity system posture matrix without any error, and then calculating the posture angle from this angular velocity system posture matrix. Also, removing the extracted drift amount from the angular velocity system posture matrix and feeding back the result prevents the accumulation of integration error, improves output responsiveness, and stabilizes the output. Moreover, the drift amount can similarly be extracted by calculating a quaternion from the angular velocity system posture matrix and calculating a quaternion from the acceleration system posture matrix, extracting the low range components at the quaternion stage and calculating the difference between the two. The posture matrix and the quaternion are essentially equivalent, but using the quaternion reduces the number of calculations thereby shortening the processing time.

The invention makes it possible to accurately detect the posture angle of a moving body by preventing the accumulation of integration errors without using sensors which are large, heavy, and expensive.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Exemplary embodiments of the invention will be described with reference to the drawings using, as an example, a robot for the moving body and a sensor unit for the posture angle detecting apparatus.

Figure 1:
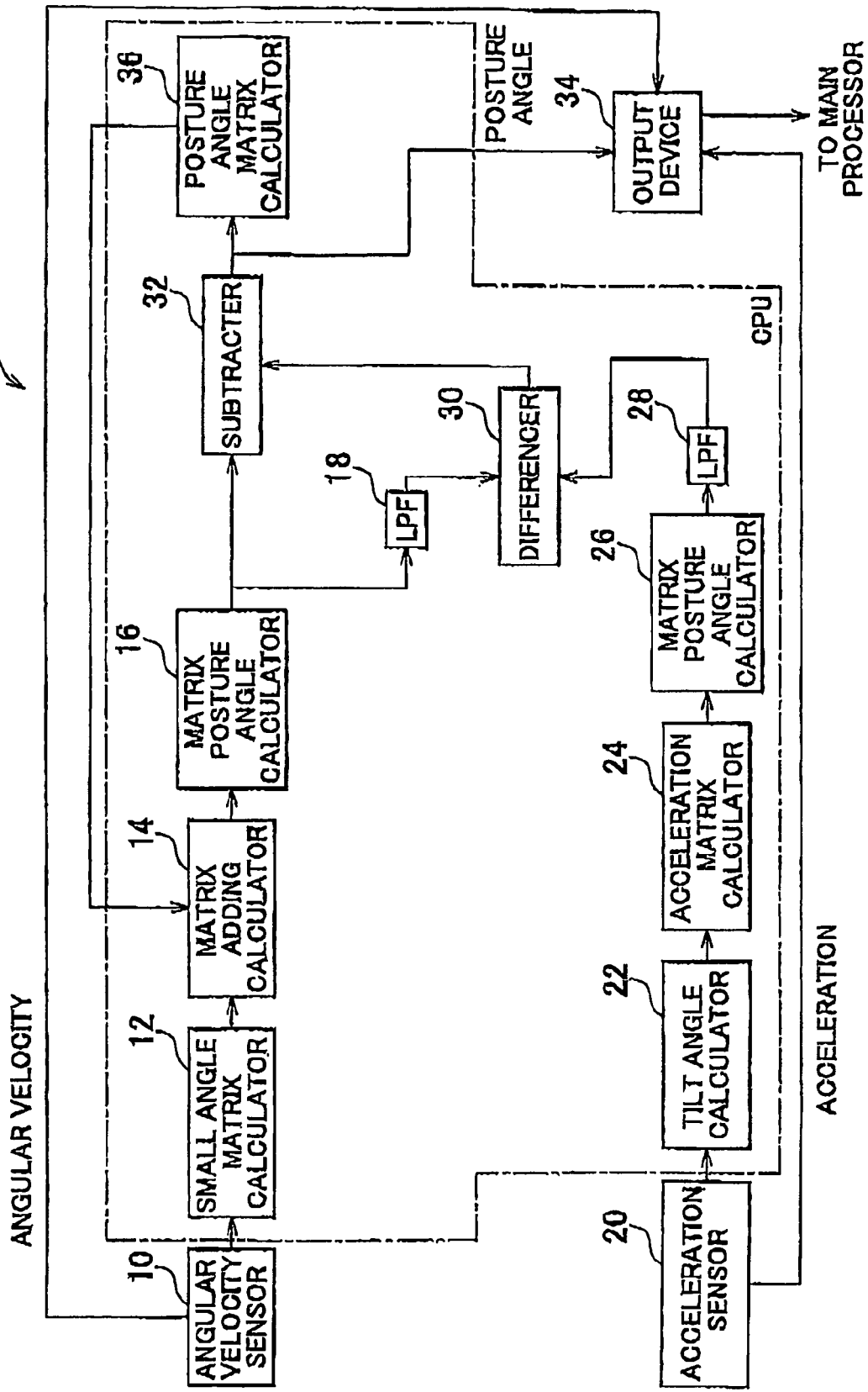
FIG. 1 is a block diagram of a first exemplary embodiment of the invention.

A first exemplary embodiment of the invention will be described. FIG. 1 is a block view showing the structure of a moving body posture angle detecting apparatus according to a first exemplary embodiment of the invention. A sensor unit 1 which includes an angular velocity sensor 10 and an acceleration sensor 20 is provided in a predetermined position on a robot.

The angular velocity sensor 10 detects the angular velocity on a sensor coordinate system (i.e., a coordinate system of the sensor unit). The angular velocities around the axes are designated as $\omega x$, $\omega y$, and $\omega z$. The angular velocity sensor 10 outputs the detected angular velocities to a small angle matrix calculator 12.

This small angle matrix calculator 12 calculates a coordinate conversion matrix for calculating a sensor coordinate system xyz as viewed in a reference coordinate system XYZ. The small angle matrix will be described later. The small angle matrix calculator 12 outputs the calculated small angle matrix to a matrix adding calculator 14.

The matrix adding calculator 14 performs an integral calculation by adding the current small angle matrix detected by the angular velocity sensor 10 that was input from the small angle matrix calculator 12 to the posture angle matrix that was fed back from the output side. The matrix adding calculator 14 then outputs the integrated matrix to a matrix posture angle calculator 16.

The matrix posture angle calculator 16 calculates the posture angle from the integrated matrix that was input, and outputs the result as an angular velocity posture angle SYA both to a low pass filter LPF 18 and a subtracter 32.

The low pass filter (i.e., angular velocity system low pass filter) 18 extracts a low range component from the angular velocity posture angle SYA and outputs it to a differencer 30. The angular velocity posture angle SYA includes a true posture angle (posture angle true value) and a drift amount from integration error. The low pass filter 18 removes the high range posture angle true value from the angular velocity posture angle SYA and extracts the low range posture angle true value and the drift amount.

Meanwhile, the acceleration sensor 20 detects the acceleration in the direction of each axis in the sensor coordinate system xyz. The detected accelerations are designated as Gx, Gy, and Gz. The acceleration sensor 20 then outputs the detected accelerations to a tilt angle calculator 22.

The tilt angle calculator 22 calculates the angles between the Z axis of the reference coordinate system XYZ and each axis of the sensor coordinate system xyz. The calculated tilt angles are designated as $\lambda x$, $\lambda y$, and $\lambda z$. The tilt angle calculator 22 then outputs the calculated tilt angles to an acceleration matrix calculator 24.

The acceleration matrix calculator 24 calculates the posture matrix with respect to the sensor coordinate system when viewed in the reference coordinate system using the tilt angle that was input, and outputs the calculated posture matrix to a matrix posture angle calculator 26.

The matrix posture angle calculator 26 then calculates the posture angle from the matrix that was input and outputs the calculated posture angle as an acceleration posture angle SGA to a low pass filter 28, similar to the matrix posture angle calculator 16.

The low pass filter (i.e., acceleration system low pass filter) 28 is a filter in which the cutoff frequency and attenuation factor are set the same as they are in the low pass filter 18. The low pass filter 28 extracts a low range component from the acceleration posture angle SGA and outputs it to the differencer 30. The acceleration posture angle SGA includes a high range posture angle pseudo value in the high range component and a low range posture angle true value in the low range component. No drift from integration error occurs in the acceleration posture angle. Because the cutoff frequency and attenuation factor of the low pass filter 28 are set the same as they are in the low pass filter 18, the low range posture angle true value of the angular velocity system is the same as the low range posture angle true value of the acceleration system. The frequency characteristic of the angular velocity system is also the same as the frequency characteristic of the acceleration system. Thus, only the drift component is accurately output by subtraction calculation of both of the low range posture angle true values. When the responsiveness of the components corresponding to the posture angles produced by the angular velocity system and the acceleration system are known beforehand, however, the cutoff frequency and the attenuation factor of the low pass filter can be adjusted to match their characteristics. This method can be effective when the adaptive range is narrow but the movement characteristics are known beforehand.

As described above, (the low range posture angle true value plus the drift amount) from the low pass filter 18, as well as (the low range posture angle true value) from the low pass filter 28 are input to the differencer 30. The differencer 30 then calculates the difference between the two and extracts the drift amount (i.e., drift amount=(low range posture angle true value+drift amount)−(low range posture angle true value)). The differencer 30 then outputs the drift amount obtained through the difference calculation to the subtracter 32.

The subtracter 32 calculates the difference between the angular velocity posture angle SYA that was input from the matrix posture angle calculator 16 and the drift amount that was input from the differencer 30, and then removes the drift amount included in the angular velocity posture angle SYA from the matrix posture angle calculator 16. As described above, the angular velocity posture angle SYA from the matrix posture angle calculator 16 includes the posture angle true value (high range component+low range component) and the drift amount. The subtracter 32 then extracts the low range posture angle true value through subtraction (i.e., low range posture angle true value=(low range posture angle true value+drift amount)−(drift amount)). The subtracter 32 then outputs the posture angle true value that was obtained through subtraction to an output device 34. The subtracter 32 also outputs the posture angle true value to a posture angle matrix calculator 36.

The posture angle matrix calculator 36 calculates a posture angle matrix from the posture angle that was input and feeds it back to the matrix adding calculator 14.

The posture angle matrix calculator 36 then performs an inverse operation of the matrix posture angle calculator 16 and creates a posture angle matrix from the posture angle. The matrix adding calculator 14 then performs an integral calculation by adding the posture angle matrix that was fed back to the small angle matrix that was calculated based on an angular velocity that was newly detected by the angular velocity sensor 10, and then calculates the posture angle from the angular velocity.

The output device 34 outputs the posture angle from which the drift amount has been removed by the subtracter 32 to an external component. In the case of a robot, a main processor (or host processor) inputs the posture angle and the like detected by the sensor unit and performs feedback control on the posture of the robot. The output device 34 outputs the posture angle at a predetermined timing to the main processor in response to a command from the main processor. The angular velocity detected by the angular velocity sensor 10 or the acceleration detected by the acceleration sensor may be supplied to the output device 34, and the output device 34 may output the angular velocity or the acceleration, in addition to the posture angle, to the main processor. Which of those is to be output is determined either by a command from the main processor or set parameters. The output device 34 outputs all of the angular velocity, the acceleration, and the posture angle at a given timing to the main processor, and selectively outputs one of those at another timing. Although not shown in the drawings, the posture matrix obtained by the posture angle matrix calculator 36 can also be output to the robot via the output device 34. This is an effective method when performing the matrix calculation within the robot.

As described above, an accurate posture angle from which the drift amount has been removed is thus detected and output. Because the drift amount is extracted based on the acceleration in the direction of each axis detected by the acceleration sensor 20, that drift amount then removed from the angular velocity posture angle and the result fed back, there is no need for the angular velocity sensor 10 to be an expensive, heavy and extremely accurate sensor.

Hereinafter, the calculations that are performed in the small angle matrix calculator 12, the matrix posture angle calculator 16, the tilt angle calculator 22, and the matrix posture angle calculator 26 will be described.

First, the posture matrix will be described. A posture matrix T(n) in discrete time n is used to represent the sensor coordinate system in the reference coordinate system XYZ. The posture matrix T(n) is formed of 4×4 elements, as shown in Expression 1 below.

[Expression 1]

$$T(n) = \begin{pmatrix} a & d & g & 0 \\ b & e & h & 0 \\ c & f & i & 0 \\ 0 & 0 & 0 & 1 \end{pmatrix} \quad (1)$$

Figure 7:
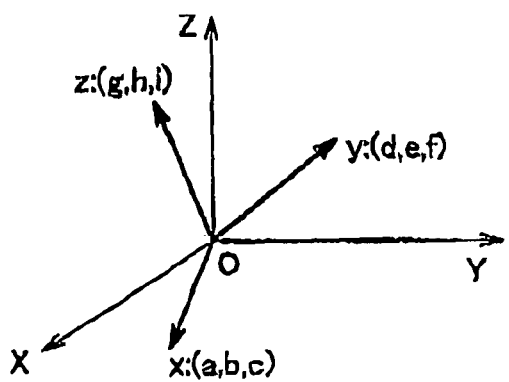
FIG. 7 is a view illustrating the relationship between a reference coordinate system (XYZ) and a sensor coordinate system (xyz).

In terms of meaning of the matrix T(n), the first column (a, b, c), the second column (d, e, f), and the third column (g, h, i) refer to the direction vectors of the x axis, y axis, and z axis, respectively, of the sensor coordinate system n when viewed in the reference coordinate system. The fourth column indicates the point of origin of the sensor coordinate system n in the reference coordinate system (i.e., typically when there is a translation, the translation amount is expressed in the fourth column). When the point of origin is stationary, the elements in the first to the third rows in the fourth column representing positional conversion are set at 0. As shown in FIG. 7, the point of origin O of the sensor coordinate system n is positioned at (0, 0, 0) in the reference coordinate system, the x axis vector has the components (a, b, c) on the reference coordinate system, the y axis vector has the components (d, e, f) on the reference coordinate system, and the z axis vector has the components (g, h, i) on the reference coordinate system.

Figure 8:
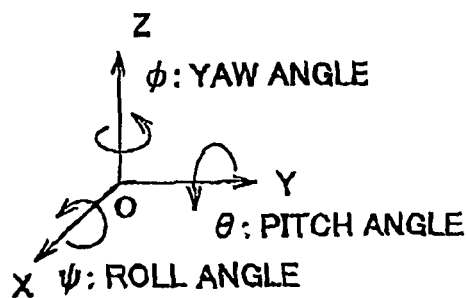
FIG. 8 is a view illustrating posture angles (roll angle, pitch angle, yaw angle) in the reference coordinate system.

The method for obtaining the posture matrix T(n) from the posture angle roll, pitch, and yaw angle is described below. This method calculates the posture matrix by the posture angle matrix calculator 36 based on the posture angle from the subtracter 32. In order to express the posture matrix T(n), a rotational conversion from the matrix must take into account the order of the rotating axes. As shown in FIG. 8, when using the roll, pitch, and yaw angle which are typically used with a robot, these are defined as three rotations that occur, i.e., first there is rotation $\phi$ around the z axis, next there is rotation $\theta$ around the y axis after that rotation, and finally there is rotation y around the x axis after that rotation (it is important to note that the order of rotation of the axes is specified).

The conversion matrix from the roll, pitch, and yaw angle is designated as RPY ($\phi$, $\theta$, $\psi$). RPY ($\phi$, $\theta$, $\psi$) to is the product of the rotational conversion matrices multiplied from left to right and is shown in Expression 2 below.

[Expression 2]

$$RPY(\phi,\theta,\psi) = Rot(z,\phi)Rot(y,\theta)Rot(x,\psi) \quad (2)$$

Expression 3 shows Expression 2 in more detail.

[Expression 3]

$$RPY(\phi, \theta, \psi) = \begin{pmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{pmatrix} \begin{pmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{pmatrix} \begin{pmatrix} 1 & 0 & 0 & 0 \\ 0 & \cos\psi & -\sin\psi & 0 \\ 0 & \sin\psi & \cos\psi & 0 \\ 0 & 0 & 0 & 1 \end{pmatrix} \quad (3)$$

When Expression 3 is written out, it can be expressed as shown in Expression 4.

[Expression 4]

$$RPY(\phi, \theta, \psi) = \begin{pmatrix} \cos\phi\cos\theta & -\cos\phi\sin\theta\sin\psi - \sin\phi\cos\psi & \cos\phi\sin\theta\cos\psi - \sin\phi\sin\psi & 0 \\ \sin\phi\cos\theta & \sin\phi\sin\theta\sin\psi + \cos\phi\cos\psi & \sin\phi\sin\theta\cos\psi - \cos\phi\sin\psi & 0 \\ -\sin\theta & \cos\theta\sin\psi & \cos\theta\cos\psi & 0 \\ 0 & 0 & 0 & 1 \end{pmatrix} \quad (4)$$

Eulerian angles may be used as the posture angles instead of the roll, pitch, and yaw angle. With the Eulerian angles, the conversion matrix when the rotation $\phi$ first occurs around the z axis, the rotation $\theta$ then occurs around the y axis after that rotation, and lastly the rotation $\psi$ occurs around the x axis after that rotation is designated as Euler (E$\phi$, E$\theta$, E$\psi$) and is shown in Expression 5.

[Expression 5]

$$Euler(E\phi,E\theta,E\psi) = Rot(z,E\phi)Rot(y,E\theta)Rot(x,E\psi) \quad (5)$$

Expression 5 is shown in detail in Expression 6 below.

[Expression 6]

$$Euler(E\phi, E\theta, E\psi) = \begin{pmatrix} \cos E\phi & -\sin E\phi & 0 & 0 \\ \sin E\phi & \cos E\phi & 0 & 0 \\ 0 & 0 & 1 & 0 \\ 0 & 0 & 0 & 1 \end{pmatrix} \quad (6)$$
$$\begin{pmatrix} \cos E\theta & 0 & \sin\theta & 0 \\ 0 & 1 & 0 & 0 \\ -\sin E\theta & 0 & \cos\theta & 0 \\ 0 & 0 & 0 & 1 \end{pmatrix} \begin{pmatrix} \cos E\psi & -\sin E\psi & 0 & 0 \\ \sin E\psi & \cos E\psi & 0 & 0 \\ 0 & 0 & 1 & 0 \\ 0 & 0 & 0 & 1 \end{pmatrix}.$$

When Expression 6 is written out, it can be expressed as shown in Expression 7.

[Expression 7]

$$Euler(E\phi, E\theta, E\psi) = \quad (7)$$
$$\begin{pmatrix} \cos E\phi\cos E\theta\cos E\psi - \sin E\phi\sin E\psi & -\cos E\phi\cos E\theta\sin E\psi - \sin E\phi\cos E\psi & \cos E\phi\sin E\theta \\ \sin E\phi\cos E\theta\cos E\psi + \cos E\phi\sin E\psi & -\sin E\phi\cos E\theta\sin E\psi + \cos E\phi\cos E\psi & \sin E\phi\sin E\theta \\ -\sin E\theta\cos E\phi & \sin E\theta\sin E\psi & \cos E\theta \\ 0 & 0 & 0 \end{pmatrix}$$

Figure 9:
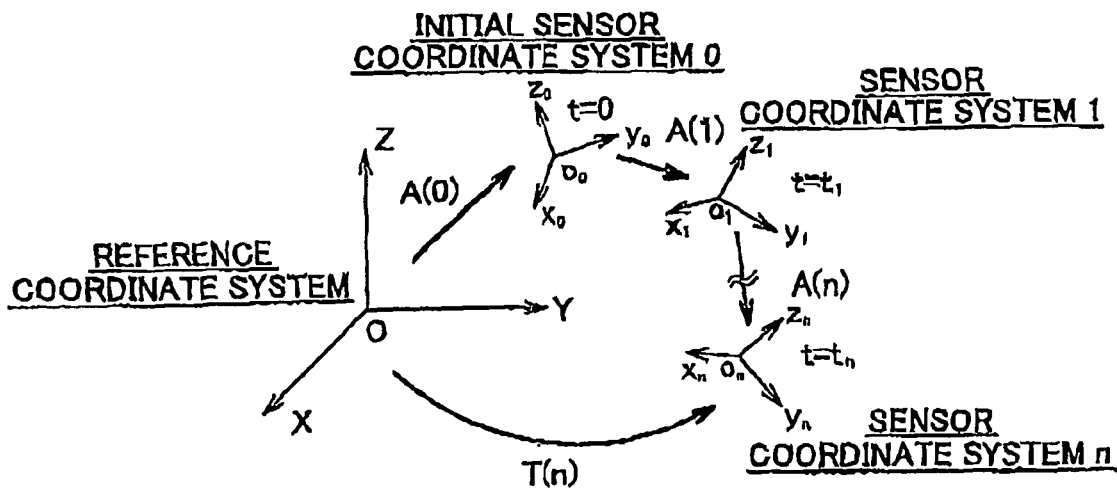
FIG. 9 is a view illustrating the change over time in a sensor coordinate system n.

The reference coordinate system is designated as O–XYZ, and the initial sensor coordinate system is designated as $O_0$–$x_0y_0z_0$. The reference coordinate system and the coordinate system $O_0$–$x_0y_0z_0$ at time t=0 are related by the coordinate conversion A(0). The coordinate system at time t=tn is designated as $O_n$–$x_ny_nz_n$. The points of origin O, $O_0$, $O_n$ of each coordinate system are the same and do not move in position. When there is a change from the coordinate system $O_{(n-1)}$–$x_{n-1}y_{(n-1)}z_{(n-1)}$ to $O_n$–$x_ny_nz_n$, as shown in FIG. 9, due to a change in the posture of the moving body, $O_{(n-1)}$–$x_{(n-1)}y_{(n-1)}z_{(n-1)}$ and $O_n$–$x_ny_nz_n$ are related by matrix A(n) obtained from the sensor output. The sensor coordinate system T(n) when viewed in the reference coordinate system is obtained in Expression 8 by multiplying the conversion A(n) from the right. When the point of origin of the sensor coordinate moves over time, the coordinates that have moved over time are successively input for the first to the third elements in the fourth column in matrix A. The fourth column in matrix A is not affected by the rotation of the sensor coordinate system so no particular description of it will be given here.

[Expression 8]

$$A(n)=A(0)A(1)A(n-1)A(n) \quad (8)$$

Figure 10:
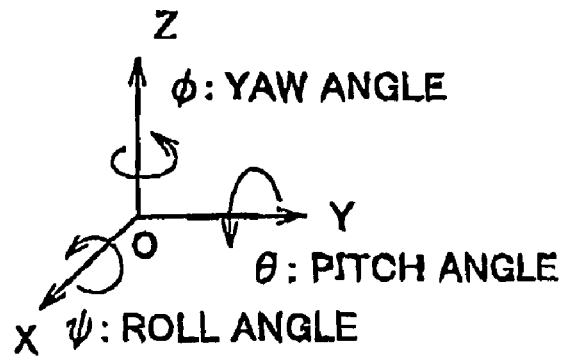
FIG. 10 is a view illustrating a small rotation angle in the sensor coordinate system.

Next, the method for introducing the matrix of the small rotation matrix A(n) from the sensor output will be described. This method calculates a small angle matrix based on the angular velocity from the angular velocity sensor 10 using the small angle matrix calculator 12. Three angular velocity sensors are arranged, one on each axis of the sensor coordinate system. These angular velocity sensors measure the angular velocities around the axes of sensors x, y, and z, as shown in FIG. 10. When the rotation angles $\Delta\phi$, $\Delta\theta$, $\Delta\psi$ are sufficiently small in Expression 4, then we have the following.

[Expression 9]

$$\sin \Delta\phi \approx \Delta\phi, \sin \Delta\theta \approx \Delta\theta, \sin \Delta\psi \approx \Delta\psi \qquad (9)$$

[Expression 10]

$$\cos \Delta\phi \approx 1, \cos \Delta\theta \approx 1, \cos \Delta\psi \approx 1 \qquad (10)$$

This can therefore be expressed by Expression 11 using the small rotation angle $\Delta\psi$ around the sensor x axis, the small rotation angle $\Delta\theta$ around the sensor y axis, and the small rotation angle $\Delta\phi$ around the sensor z axis. The results of Expression 11 resemble a case in which the rotation order is not relied upon because each element in the matrix is expressed independently by a small rotation angle.

[Expression 11]

$$A(i) = \begin{pmatrix} 1 & -\Delta\phi & \Delta\theta & 0 \\ \Delta\phi & 1 & -\Delta\psi & 0 \\ -\Delta\theta & \Delta\psi & 1 & 0 \\ 0 & 0 & 0 & 1 \end{pmatrix} \qquad (11)$$

The small angle and the sensor output are related as shown in Expressions 12 and 13 by the small rotation angles $\Delta\psi$, $\Delta\theta$, $\Delta\phi$, the angular velocity sensor outputs $\omega x$, $\omega y$, $\omega z$, and the sampling cycle ts. The sampling cycle ts is sufficiently early with respect to the rotational movement so the rotation within the time of the sampling cycle ts is sufficiently small and can thus be regarded as a small rotation angle.

[Expression 12]

$$\Delta\psi = \omega_x t_s \qquad (12)$$

[Expression 13]

$$\Delta\theta = \omega_y t_s \qquad (13)$$

[Expression 14]

$$\Delta\phi = \omega_z t_s \qquad (13)$$

Therefore, the A(n) matrix can be expressed by Expression 15.

[Expression 15]

$$A(n) = \begin{pmatrix} 1 & -\omega_z t_s & \omega_y t_s & 0 \\ \omega_z t_s & 1 & -\omega_x t_z & 0 \\ \omega_y t_s & \omega_x t_s & 1 & 0 \\ 0 & 0 & 0 & 1 \end{pmatrix} \qquad (15)$$

Next, a method for obtaining the posture angle from the posture matrix will be described. This method calculates the posture angle based on the posture matrix from the matrix adding calculator 14 (i.e., the posture matrix after integration) using the matrix posture angle calculator 16. This method also calculates the posture angle based on the posture matrix from the acceleration matrix calculator 24 using the matrix posture angle calculator 26.

The posture matrix T(n) is shown in Expression 16.

[Expression 16]

$$T(n) = \begin{pmatrix} a & d & g & 0 \\ b & e & h & 0 \\ c & f & i & 0 \\ 0 & 0 & 0 & 1 \end{pmatrix} \qquad (16)$$

The yaw angle $\phi$ is

[Expression 17]

$$\phi = \operatorname{atan} 2(b, a) \qquad (17)$$

and the range of change in the posture angle $\phi$ is $-\pi < \psi \leq \pi$.

The pitch angle $\theta$ is

[Expression 18]

$$\theta = \operatorname{atan} 2(-c, \cos\phi \cdot a + \sin\phi \cdot b) \qquad (18)$$

and the range of change in the posture angle $\theta$ is $-\pi/2 < \theta < \pi/2$.

The roll angle $\gamma$ is

[Expression 19]

$$\psi = \operatorname{atan} 2(\sin\phi \cdot g - \cos\phi \cdot h, -\sin\phi \cdot d + \cos\phi \cdot e) \qquad (19)$$

and the range of change in the posture angle $\psi$ is $-\pi/2 < \theta < \pi/2$.

If Eulerian angles are used, Expressions 21 to 23 are used.

[Expression 20]

$$T(n) = \begin{pmatrix} a & d & g & 0 \\ b & e & h & 0 \\ c & f & i & 0 \\ 0 & 0 & 0 & 1 \end{pmatrix} \qquad (20)$$

E$\phi$ is

[Expression 21]

$$E\phi = \operatorname{atan} 2(b, a) \qquad (21)$$

E$\theta$ is

[Expression 22]

$$E\theta = \operatorname{atan} 2(\cos\phi \cdot g + \sin\phi \cdot h, i) \qquad (22)$$

and E$\psi$ is [Expression 23]

$$E\psi = \operatorname{atan} 2(-\sin\phi \cdot a + \cos\phi \cdot b, -\sin\phi \cdot d + \cos\phi \cdot e) \qquad (23)$$

Next, normalization of the matrix will be described.

[Expression 24]

$$T(n) = \begin{pmatrix} a & d & g & 0 \\ b & e & h & 0 \\ c & f & i & 0 \\ 0 & 0 & 0 & 1 \end{pmatrix} \qquad (24)$$

With the posture matrix T(n), after calculation, each column in the posture matrix may not be in unit vectors so normalization is performed by Expression 25 to make the size of each column vector in Expression 24 one. This is a calculation that is performed by normalizer/orthogonalizers 54 and 56 in FIG. 5, which will be described later.

[Expression 25]

$$\text{Normalized}[T] = \begin{pmatrix} p_1 a & p_2 d & p_1 c p_2 f - p_1 c p_2 e & 0 \\ p_1 b & p_2 e & p_1 c p_2 d - p_1 a p_2 f & 0 \\ p_1 c & p_2 f & p_1 a p_2 e - p_1 b p_2 d & 0 \\ 0 & 0 & 0 & 1 \end{pmatrix} \quad (25)$$

Here, $p_1$ and $p_2$ are provided by Expressions 26 and 27.

[Expression 26]

$$P_1 = \frac{1}{\sqrt{a^2 + b^2 + c^2}} \quad (26)$$

[Expression 27]

$$P_2 = \frac{1}{\sqrt{d^2 + e^2 + f^2}} \quad (27)$$

Then, each element after normalization is reset again to

[Expression 28]

$$T(n) = \begin{pmatrix} a & d & g & 0 \\ b & e & h & 0 \\ c & f & i & 0 \\ 0 & 0 & 0 & 1 \end{pmatrix} \quad (28)$$

Furthermore, orthogonalization of the matrix will be described.

[Expression 29]

$$T(n) = \begin{pmatrix} a & d & g & 0 \\ b & e & h & 0 \\ c & f & i & 0 \\ 0 & 0 & 0 & 1 \end{pmatrix} \quad (29)$$

With the posture matrix T(n), after calculation, the columns in the posture matrix may not be orthogonal axes so an orthogonalization process is performed in which the column vectors in Expression 29 are made orthogonal (in this case, the z axis is used as the reference). a', b', and c' are obtained in order to obtain a new x' axis that is orthogonal to the z axis and the y axis.

[Expression 30]

$$a'=ei-fh \quad (30)$$

[Expression 31]

$$b'=fg-di \quad (31)$$

[Expression 32]

$$c'=dh-eg \quad (32)$$

Next, d', e', and f' are obtained in order to obtain a new y' axis which is orthogonal to the z axis and the x' axis.

[Expression 33]

$$d'=hc'-ib' \quad (33)$$

[Expression 34]

$$e'=ia'-gc' \quad (34)$$

[Expression 35]

$$f'=gb'-ha' \quad (35)$$

A posture matrix T(n) that has been orthogonalized is then obtained from the obtained a' to f'.

[Expression 36]

$$T(n) = \begin{pmatrix} a' & d' & g & 0 \\ b' & e' & h & 0 \\ c' & f' & i & 0 \\ 0 & 0 & 0 & 1 \end{pmatrix} \quad (36)$$

Here, atan 2 will be described. atan 2 (y, x) is a calculator function which has two variables x and y. The application range of atan 2 is wider than the atan function that is normally used.

[Expression 37]

$$\xi=\text{atan } 2(y,x) \quad (37)$$

$-\pi<\xi\leq\pi$ is such that when x>0 and y>0,

[Expression 38]

$$\xi=\tan^{-1}(y/x) \quad (38)$$

and when x>0 and y<0,

[Expression 39]

$$\xi=\tan^{-1}(y/x) \quad (39)$$

In the same way,
when x<0 and y>0, then $\xi=\pi+\tan^{-1}(y/x)$,
when x<0 and y<0, then $\xi=-\pi+\tan^{-1}(y/x)$,
when x=0 and y>0, then $\xi=-\pi+\tan^{-1}(y/x)$,
when x=0 and y<0, then $\xi=\pi/2$,
and when x=0 and y=0, then $\xi=0$.

Figure 11:
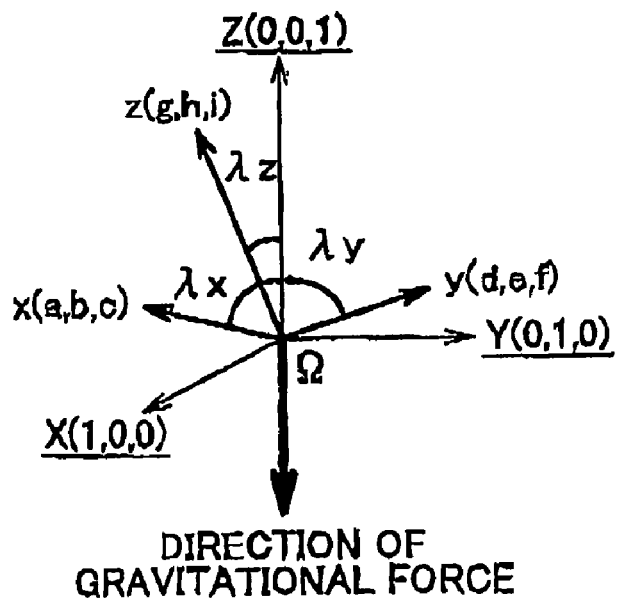
FIG. 11 is a view illustrating a tilt angle.

Next, the calculation for the tilt angle will be described. This method calculates the tilt angle using the tilt angle calculator 22 based on the acceleration obtained by the acceleration sensor 20. The tilt angle refers to angles λx, λy, λz between the sensor x, y, z axes and the reference Z axis. That is, λx is the angle between the x axis and the Z axis, λy is the angle between the y axis and the Z axis, and λz is the angle between the z axis and the Z axis. The range of λx, λy, and λz is 0 (λx, λy, λz) it. FIG. 11 shows the tilt angles and the gravity vectors.

The tilt angles are obtained as shown below from the acceleration sensors arranged on the sensor coordinates. The accelerations Gx, Gy, and Gz are normalized using Expressions 40 to 42, and accelerations Gx', Gy', and Gz' after normalization are obtained.

[Expression 40]
$$Gx' = \frac{Gx}{\sqrt{Gx^2 + Gy^2 + Gz^2}} \quad (40)$$

[Expression 41]
$$Gy' = \frac{Gy}{\sqrt{Gx^2 + Gy^2 + Gz^2}} \quad (41)$$

[Expression 42]
$$Gz' = \frac{Gz}{\sqrt{Gx^2 + Gy^2 + Gz^2}} \quad (42)$$

The tilt angles λx, λy, and λz are obtained from the accelerations Gx', Gy', and Gz' using Expressions 43 to 45.

[Expression 43]
$$\lambda x = \mathrm{acos}(-Gx') \quad (43)$$

[Expression 44]
$$\lambda y = \mathrm{acos}(-Gy') \quad (44)$$

[Expression 45]
$$\lambda z = \mathrm{acos}(-Gz') \quad (45)$$

Next, the procedure for obtaining the posture matrix T(n) from the tilt angles λx, λy, and λz will be described. This is a calculation obtains the posture matrix based on the tilt angles from the tilt angle calculator 22 using the acceleration matrix calculator 24.

[Expression 46]
$$c = \cos(\lambda x) \quad (46)$$

[Expression 47]
$$a = +29\sqrt{(1-c2)} \quad (47)$$

[Expression 48]
$$b = 0 \quad (48)$$

[Expression 49]
$$f = \cos(\lambda y) \quad (49)$$

[Expression 50]
$$d = -cf/a \quad (50)$$

[Expression 51]
$$e = +\sqrt{(1-f2-d2)} \text{ when } 0 \leq \lambda z < \pi/2 \quad (51)$$

[Expression 52]
$$e = -\sqrt{(1-f2-d2)} \text{ when } \pi/2 < \lambda z \leq \pi \quad (52)$$

[Expression 53]
$$e = 0 \text{ when } \lambda z = \pi/2 \quad (53)$$

[Expression 54]
$$g = -ce \quad (54)$$

[Expression 55]
$$h = cd - af \quad (55)$$

[Expression 56]
$$i = ae \quad (56)$$

The posture matrix T(n) is then obtained from the above results.

Next, the procedure for obtaining the tilt angles λx, λy, and λz from the posture matrix T(n) will be described.

[Expression 57]
$$T(n) = \begin{pmatrix} a & d & g & 0 \\ b & e & h & 0 \\ c & f & i & 0 \\ 0 & 0 & 0 & 1 \end{pmatrix} \quad (57)$$

[Expression 58]
$$\lambda x = \mathrm{acos}(c) \quad (58)$$

[Expression 59]
$$\lambda y = \mathrm{acos}(f) \quad (59)$$

[Expression 60]
$$\lambda z = \mathrm{acos}(i) \quad (60)$$

Figure 2:
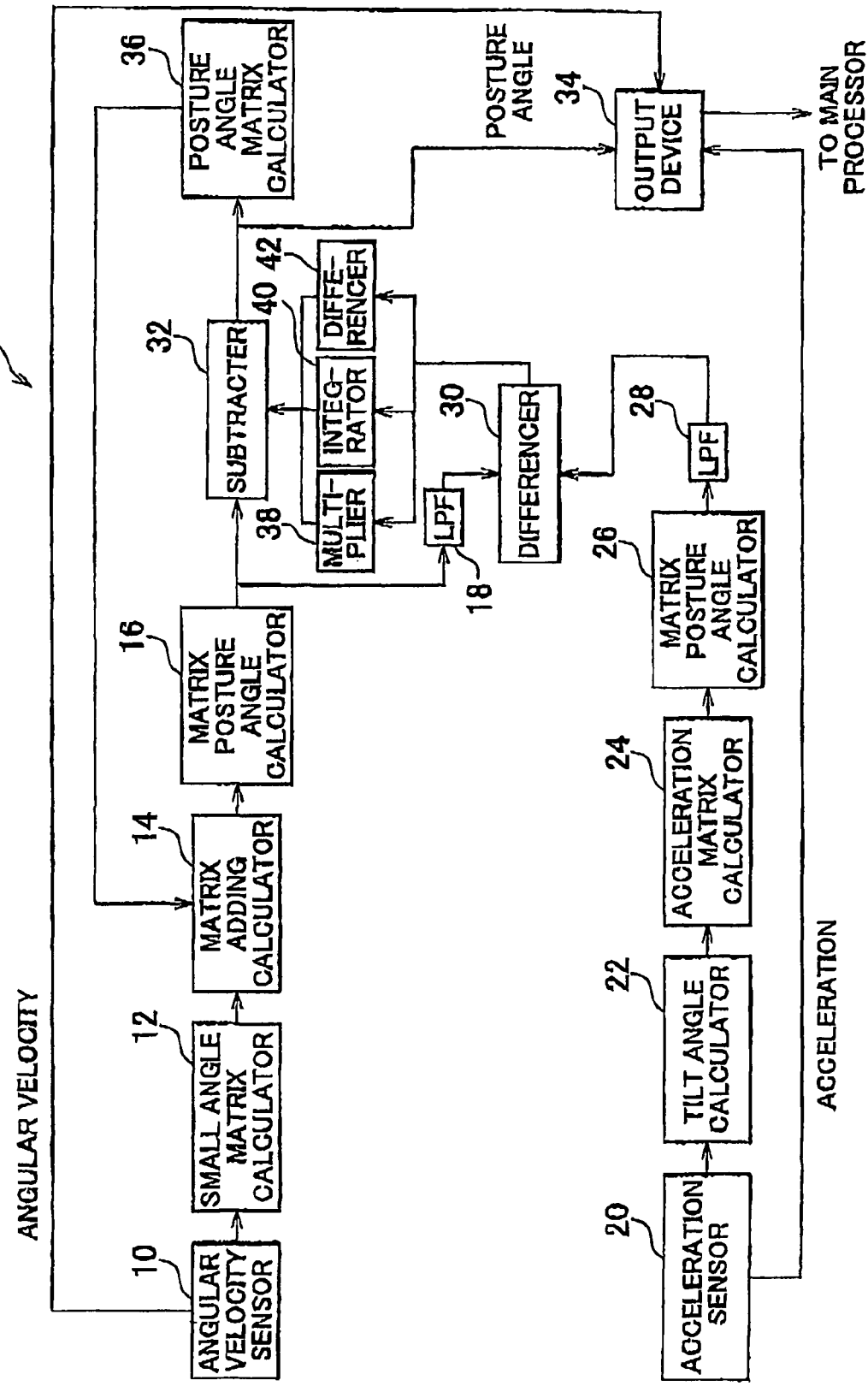
FIG. 2 is a block diagram of a second exemplary embodiment of the invention.

Continuing on, a second exemplary embodiment will be described. FIG. 2 is a block diagram of the second exemplary embodiment of the invention. This exemplary embodiment differs from the first exemplary embodiment in that the differencer 30 calculates the difference between the output of the low pass filter 18 and the output of the low pass filter 28 and outputs it to a multiplier 38, an integrator 40, and a differencer 42. The multiplier 38, the integrator 40, and the differencer 42 perform PID (i.e. Proportional Integral Differential) control. That is, the multiplier 38 performs a calculation of multiplying the drift amount from the differencer 30 by a coefficient that was set in advance and outputs the calculated value (proportional term) to the subtracter 32. The integrator 40 performs a calculation of multiplying the value of the drift amount from the differencer 30 accumulated over time by a coefficient that was set in advance and outputs the calculated value (integral term) to the subtracter 32. The differencer 42 performs a calculation of multiplying a value which is the difference over time in the drift amount from the differencer 30 by a coefficient that was set in advance and outputs the calculated value (differential term) to the subtracter 32. The coefficients may be fixed or they may be variable as will be described later. The subtracter 32 subtracts the sum of these terms (i.e., the proportional term+the integral term+the differential term) from the angular velocity posture angle that was input by the matrix posture angle calculator 16, and outputs the result as a posture angle of the moving body minus the drift amount to the output device 34 and the posture angle matrix calculator 36. The output from the subtracter 32 is converted to a posture matrix by the posture angle matrix calculator 36 and then fed back. The multiplier 38 mainly determines the degree of feedback, the integrator 40 accumulates the amount of long term deviation and determines the amount of feedback, and the differencer 42 determines the amount of feedback with respect to short term changes. Using this kind of PID control improves both short and long term characteristics.

Figure 3:
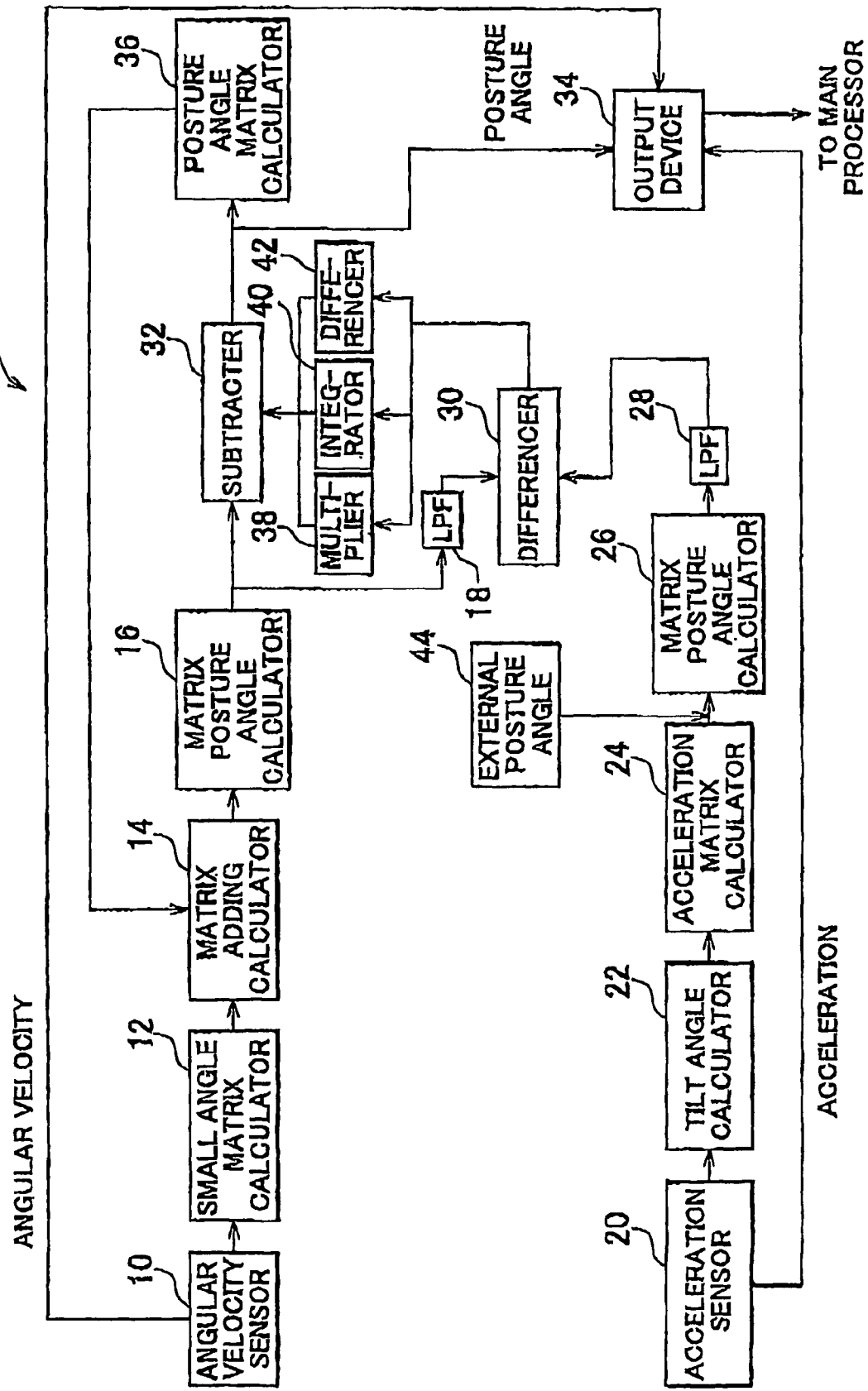
FIG. 3 is a block diagram of a third exemplary embodiment of the invention.

Continuing on, a third exemplary embodiment will be described. FIG. 3 is a block diagram of the third exemplary embodiment of the invention. This exemplary embodiment differs from the second exemplary embodiment in that the posture angle around the Z axis, i.e., the yaw angle, from an external posture angle 44 is supplied to the matrix posture angle calculator 26. The accelerator sensor 20 detects the accelerations in the directions of the axes x, y, and z. When a G sensor is used, however, the yaw angle φ, i.e., the posture angle around the Z axis, is unclear so it is necessary to fix the yaw angle φ at a constant value. In this exemplary embodiment, the yaw angle is detected separately and supplied to the matrix posture angle calculator 26, thus enabling the yaw angle φ to also be accurately calculated. More specifically, the matrix posture angle calculator 26 calculates the yaw angle φ, the pitch angle θ, and the roll angle γ as posture angles from the posture matrix T(n) according to the calculation described above. Of these, however, the yaw angle φ is replaced with a yaw angle φ input from an external component, which prevents the yaw angle φ from diverging.

Figure 4:
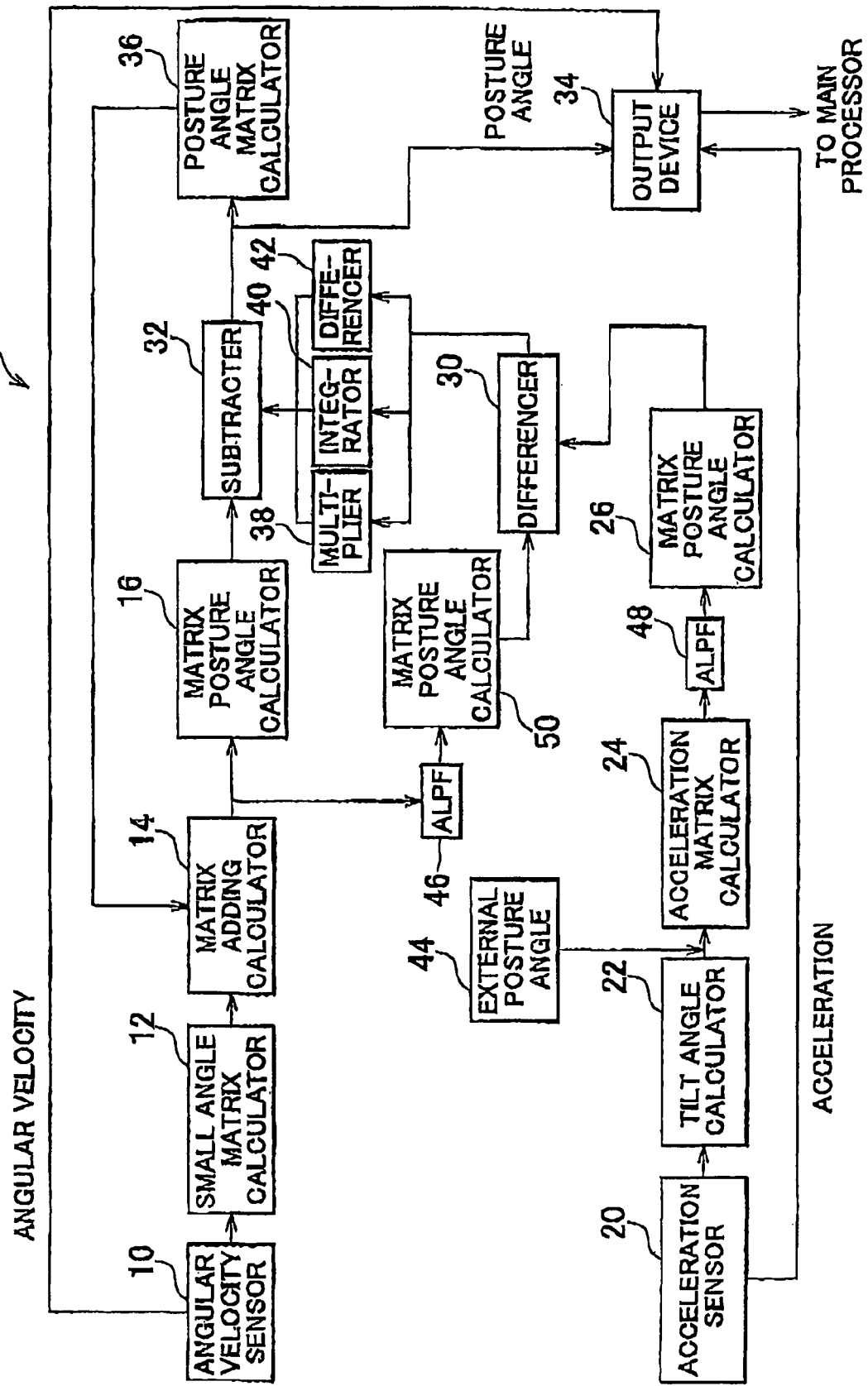
FIG. 4 is a block diagram of a fourth exemplary embodiment of the invention.

Continuing on, a fourth exemplary embodiment will be described. FIG. 4 is a block diagram of the fourth exemplary embodiment of the invention. In each of the foregoing exemplary embodiments, the angular velocity posture angle from the matrix posture angle calculator 16 is output to the low pass filter 18 and the acceleration posture angle from the matrix posture angle calculator 26 is output to the low pass filter 28. In the fourth exemplary embodiment, however, the posture matrix from the matrix adding calculator 14 is output to a low pass filter (ALPF) 46 and the posture matrix from the accelerator matrix calculator 24 is output to a low pass filter (ALPF) 48, and the low range components are extracted in the matrix stage without being extracted in the posture angle stage. The low pass filters 46 and 48 are adapted to each matrix component in the 4×4 posture matrix and extract the respective low range components. The cutoff frequencies of the low pass filters 46 and 48 are set the same, as are the attenuation factors. After extracting the low range component from the posture matrix, the low pass filter (angular velocity system) 46 outputs the posture matrix to a matrix posture angle calculator 50. Similar to the matrix posture angle calculator 16, the matrix posture angle calculator 50 calculates the angular velocity posture angle from the posture matrix and outputs it to the differencer 30. The low pass filters 46 and 48 are applied to the first column (a, b, c), the second column (d, e, f), and the third column (g, h, i) of components indicating rotation, i.e., 3×3 matrix components, in the 4×4 posture matrix, thus making it easier to extract the respective low range components. Also, the low pass filter can be applied to a total of six components, i.e., three opposite angle components on one side and three off-diagonal components on the other side, from among the 3×3 matrix components, and an equivalent matrix filter can be created.

Also, after extracting the low range component from the posture matrix, the low pass filter (acceleration system) 48 outputs the posture matrix to the matrix posture angle calculator 26. Similar to the third exemplary embodiment, the posture angle around the Z axis, i.e., the yaw angle, from the external posture angle 44 may be supplied to the acceleration system. In the third exemplary embodiment, however, the yaw angle φ detected by an external sensor is supplied to the matrix posture angle calculator 26, but in the fourth exemplary embodiment, that yaw angle φ is supplied to the acceleration matrix calculator 24. This of course is done to extract the low range component of the posture matrix using the low pass filter 48 and because it is necessary to include the yaw angle φ detected by the external sensor as a component of the posture matrix.

Figure 5:
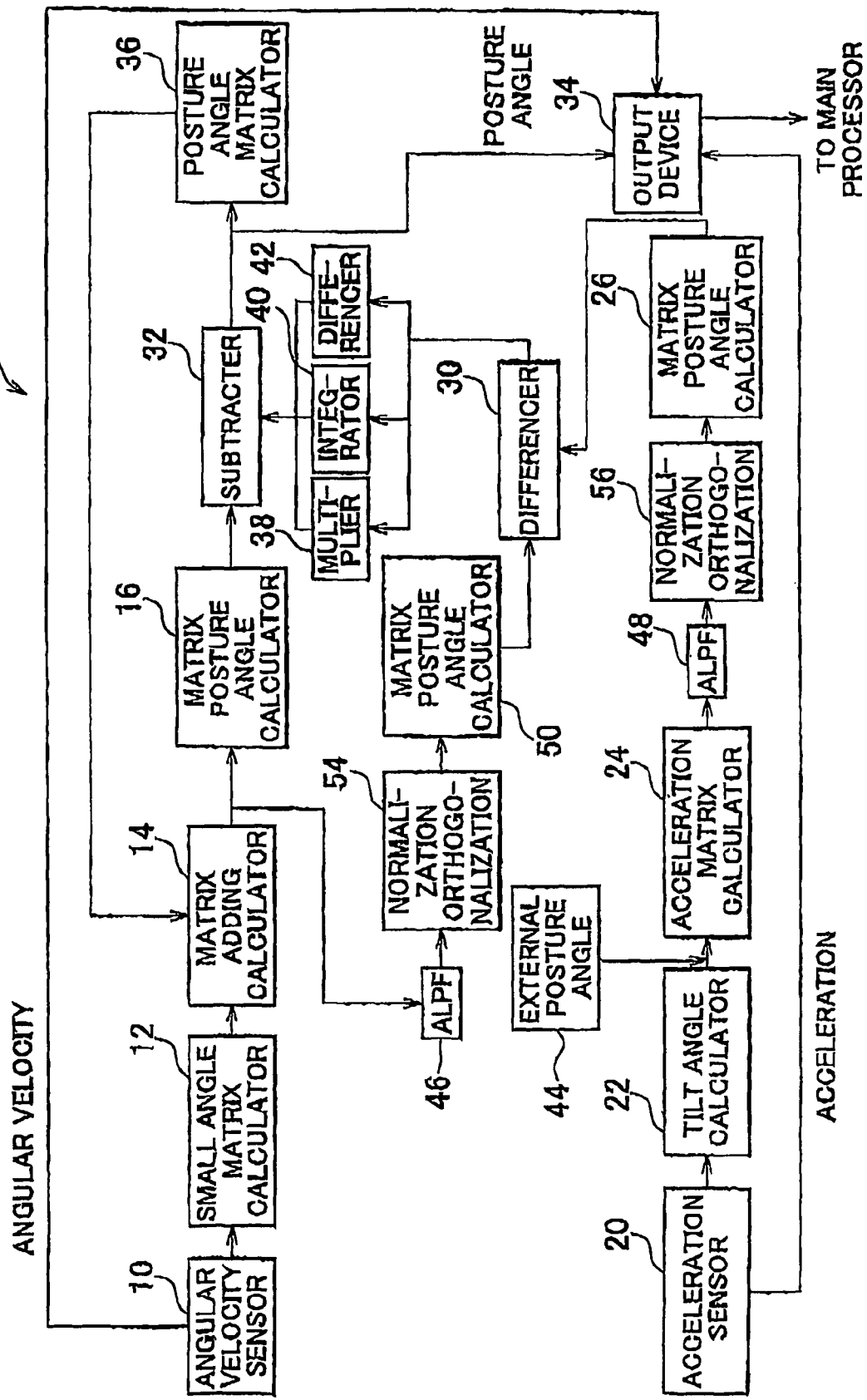
FIG. 5 is a block diagram of a fifth exemplary embodiment of the invention.

Continuing on, a fifth exemplary embodiment will be described. FIG. 5 is a block diagram of the fifth exemplary embodiment of the invention. The fifth exemplary embodiment differs from the fourth exemplary embodiment in that the normalizer/orthogonalizers 54 and 56 are added after the low pass filters 46 and 48. When the low range components are extracted from the posture matrix by the low pass filters 46 and 48, the posture matrix becomes distorted such that normality and orthogonality are no longer able to be guaranteed. This distortion is therefore corrected by normalizing and orthogonalizing using the normalizer/orthogonalizers 54 and 56. The method of normalizing and orthogonalizing is as described above.

Figure 6:
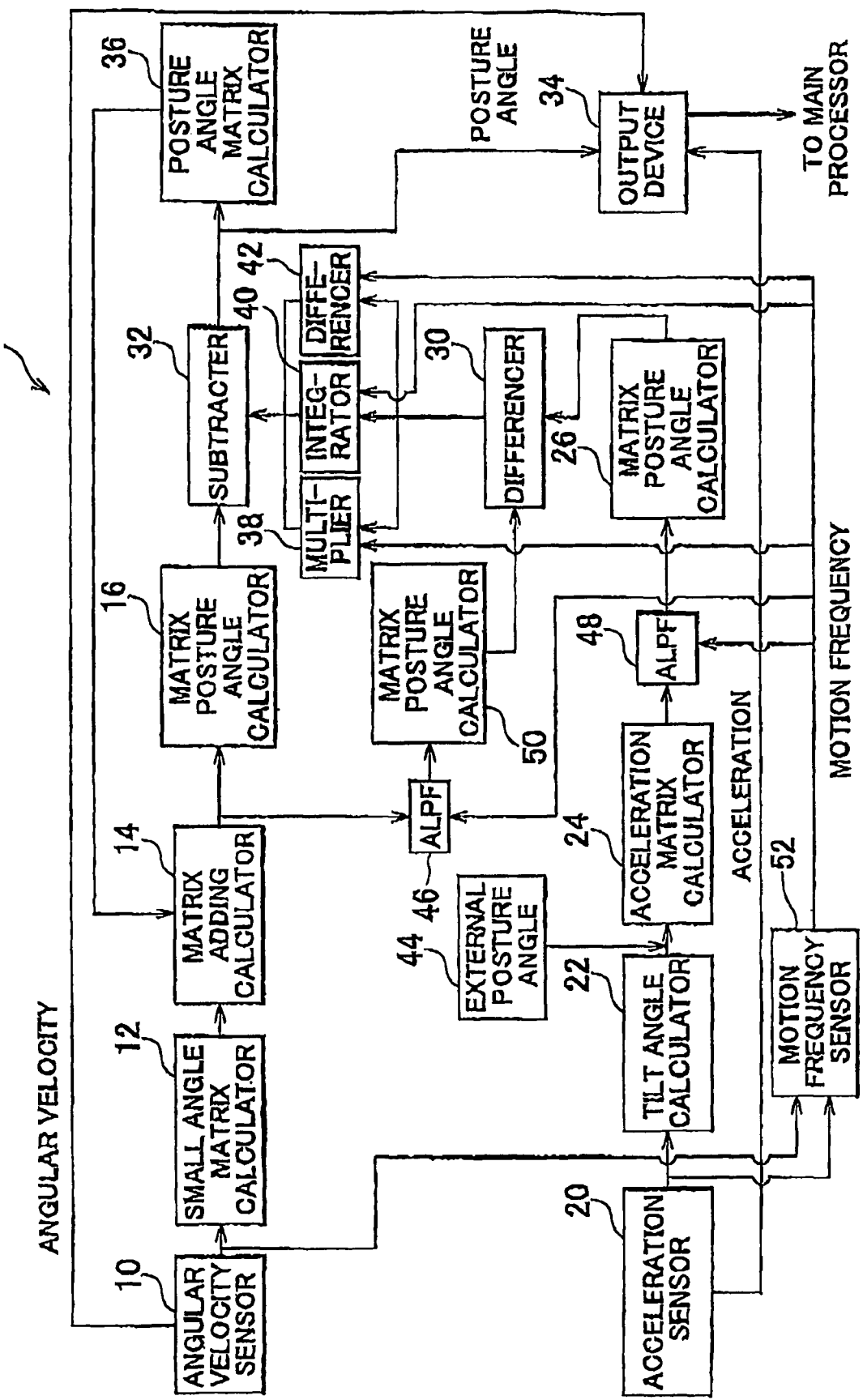
FIG. 6 is a block diagram of a sixth exemplary embodiment of the invention.

Continuing on, a sixth exemplary embodiment will be described. FIG. 6 is a block diagram of the sixth exemplary embodiment of the invention. This exemplary embodiment differs from the fourth exemplary embodiment in that a motion frequency sensor 52 is provided which inputs the angular velocity from the angular velocity sensor 10 and the acceleration from the acceleration sensor 20, and detects a particular frequency in the movement of the robot, i.e., the moving body. The motion frequency sensor 52 extracts a frequency component that appears frequently from the angular velocity and the acceleration and outputs it to the low pass filters 46 and 48. One example is the specific frequency in bipedal locomotion when the robot, i.e., moving body, is walking on two legs. The low pass filters 46 and 48 adaptively adjust the cutoff frequency according to the frequency input from the motion frequency sensor 52. The low pass filters 46 and 48 increase the cutoff frequency the greater the motion frequency. Also, the motion frequency sensor 52 outputs the motion frequency to the multiplier 38, the integrator 40, and the differencer 42 which execute PID control. The multiplier 38, the integrator 40, and the differencer 42 adjust the multiplier coefficients according to the motion frequency that was input. Adaptively adjusting the cutoff frequency and the coefficients of PID control according to a particular frequency in a motion in this way improves responsiveness, as well as the abilities to follow and adapt.

Figure 12:
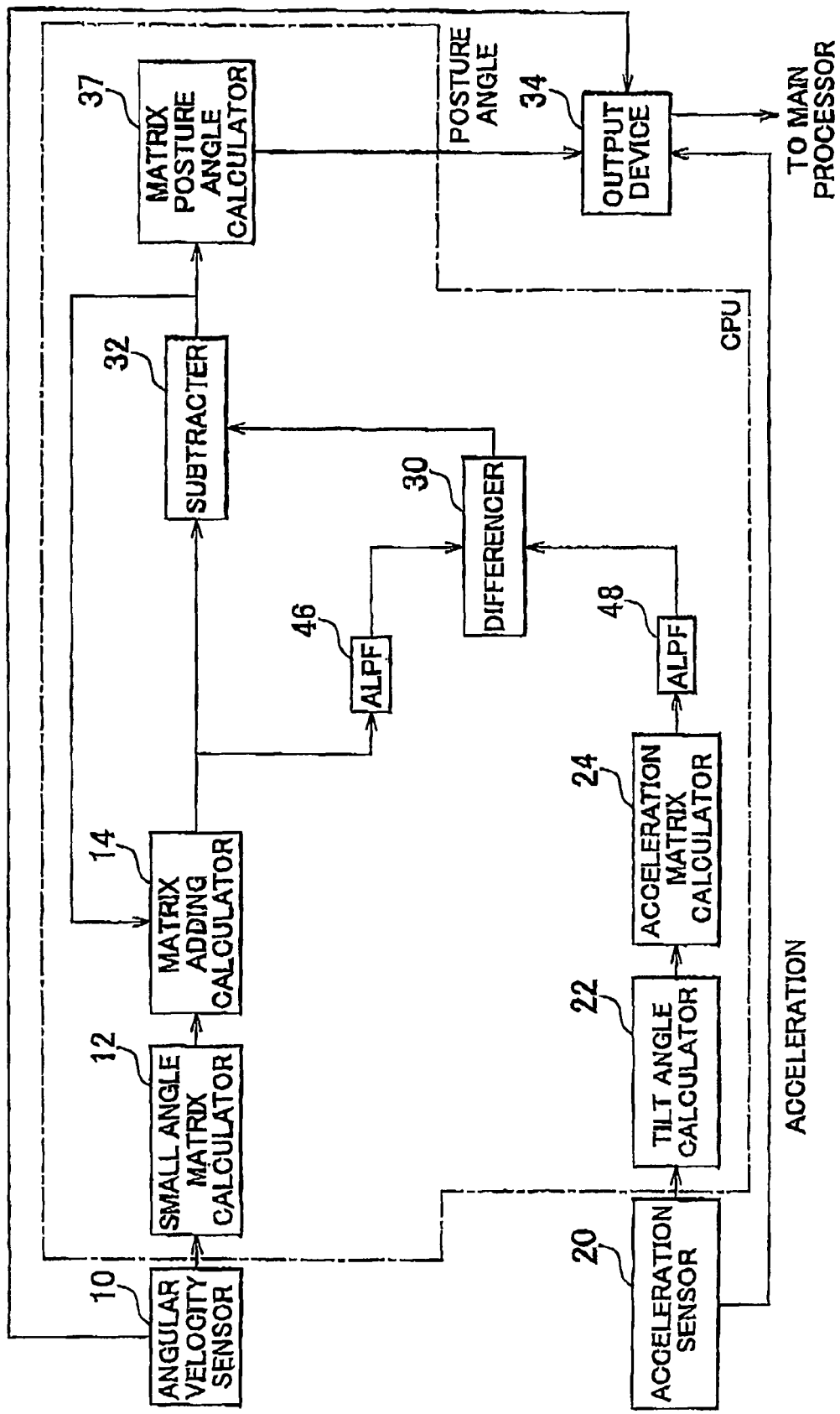
FIG. 12 is a block diagram of a seventh exemplary embodiment of the invention.

Continuing on, a seventh exemplary embodiment will be described. FIG. 12 is a block diagram of a moving body posture angle detecting apparatus according to the seventh exemplary embodiment.

The angular velocity sensor 10 detects the angular velocity in the sensor coordinate system (i.e., the coordinate system of the sensor unit). The angular velocities around the axes are designated as ωx, ωy, and ωz. The angular velocity sensor 10 outputs the detected angular velocities to the small angle matrix calculator 12.

The small angle matrix calculator 12 calculates a coordinate conversion matrix for calculating the sensor coordinate system xyz when viewed in the reference coordinate system XYZ: The small angle matrix will be described later. The small angle matrix calculator 12 outputs the calculated small angle matrix to the matrix adding calculator 14.

The matrix adding calculator 14 performs an integral calculation by adding the current small angle matrix detected by the angular velocity sensor 10 that was input from the small angle matrix calculator 12 to a posture matrix that was fed back from the output side. The matrix adding calculator 14 then outputs the integrated matrix (i.e., the angular velocity system posture matrix) to the low pass filter (ALPF) 46. The matrix adding calculator 14 also outputs the integrated matrix to the subtracter 32.

The low pass filter (i.e., the angular velocity system low pass filter) 46 extracts the low range component from the components of the angular velocity system posture matrix and outputs it to the differencer 30. The angular velocity system posture matrix includes the true posture (i.e., the posture true value) and a drift amount from integration error. The low pass filter 46 removes the high range posture true value from the angular velocity system posture matrix and extracts the low range posture true value and the drift amount.

Meanwhile, the acceleration sensor 20 detects the acceleration in the direction of each axis in the sensor coordinate system xyz. The detected accelerations are designated as Gx, Gy, and Gz. The acceleration sensor 20 outputs the detected accelerations to the tilt angle calculator 22.

The tilt angle calculator 22 calculates the angle between each axis in the sensor coordinate system xyz and the Z axis in the reference coordinate system XYZ. The calculated tilt angles are designated as λx, λy, and λz. The tilt angle calculator 22 then outputs the calculated tilt angles to the acceleration matrix calculator 24.

The acceleration matrix calculator 24 calculates the posture matrix with respect to the sensor coordinate system when viewed in the reference coordinate system using the tilt angles that were input, and outputs the result as an acceleration system posture matrix to the low pass filter (ALPF) 48.

The low pass filter (i.e., the acceleration system low pass filter) 48 is a filter in which the cutoff frequency and the attenuation factor are set the same as they are in the low pass filter 46. The low pass filter 48 extracts the low range component from the acceleration system posture matrix and outputs it to the differencer 30. The acceleration system posture matrix includes noise produced in the high range, a high range posture true value, and a low range posture true value. No drift from integration error occurs in the acceleration system posture matrix. Because the cutoff frequency and attenuation factor of the low pass filter 48 are set the same as they are in the low pass filter 46, the low range posture angle true value of the angular velocity system is the same as the low range posture angle true value of the acceleration system. The frequency characteristic of the angular velocity system is also the same as the frequency characteristic of the acceleration system. Thus, only the drift component is accurately output by subtraction calculation of both of the low range posture angle true values. When the responsiveness of the components corresponding to the postures produced by the angular velocity system and the acceleration system are known beforehand, however, the cutoff frequency and the attenuation factor of the low pass filter can be adjusted to match their characteristics. This method can be effective when the adaptive range is narrow but the movement characteristics are known beforehand.

As described above, (the low range posture true value plus the drift component) from the low pass filter 46, as well as (the low range posture true value) from the low pass filter 48 are input to the differencer 30. The differencer 30 then calculates the difference between the two and extracts the drift amount (i.e., drift amount=(low range posture true value+drift amount)−(low range posture true value)). The differencer 30 then outputs the drift amount obtained through the difference calculation to the subtracter 32.

The subtracter 32 calculates the difference between the angular velocity system posture that was input from the matrix adding calculator 14 and the drift amount that was input from the differencer 30 (i.e., the matrix difference), and then removes the drift amount included in the angular velocity system posture matrix from the matrix adding calculator 14. As described above, the angular velocity system posture matrix from the matrix adding calculator 14 includes the posture true value and the drift amount. The subtracter 32 then extracts the posture true value through subtraction (i.e., posture true value=(posture true value+drift amount)−(drift amount)). The subtracter 32 then outputs the angular velocity system posture matrix of the posture true value that was obtained through subtraction to a matrix posture angle calculator 37. The matrix posture angle calculator 37 calculates the posture angle from the posture matrix and outputs it as a posture angle of the moving body to the output device 34. The subtracter 32 also feeds back the posture matrix minus the drift amount to the matrix adding calculator 14. The matrix adding calculator 14 then performs an integral calculation by adding the posture matrix that was fed back to the small angle matrix that was calculated based on the angular velocity that was newly detected by the angular velocity sensor 10, and calculates a new angular velocity system posture matrix from the angular velocity.

The output device 34 outputs the posture angle minus the drift amount from the matrix posture angle calculator 37 to an external component. In the case of a robot, a main processor (or host processor) inputs the posture angle and the like detected by the sensor unit and performs feedback control on the posture of the robot. The output device 34 outputs the posture angle at a predetermined timing to the main processor in response to a command from the main processor. The angular velocity detected by the angular velocity sensor 10 or the acceleration detected by the acceleration sensor may be supplied to the output device 34, and the output device 34 may output the angular velocity or the acceleration, in addition to the posture angle, to the main processor. Which of those is to be output is determined either by a command from the main processor or set parameters. The output device 34 outputs all of the angular velocity, the acceleration, and the posture angle at a given timing to the main processor, and selectively outputs one of those at another timing.

As described above, an accurate posture angle from which the drift amount has been removed is thus detected and output. Because the drift amount is extracted based on the acceleration in the direction of each axis detected by the acceleration sensor 20, that drift amount then removed from the angular velocity posture and the result fed back, there is no need for the angular velocity sensor 10 to be an expensive, heavy and extremely accurate sensor.

Figure 13:
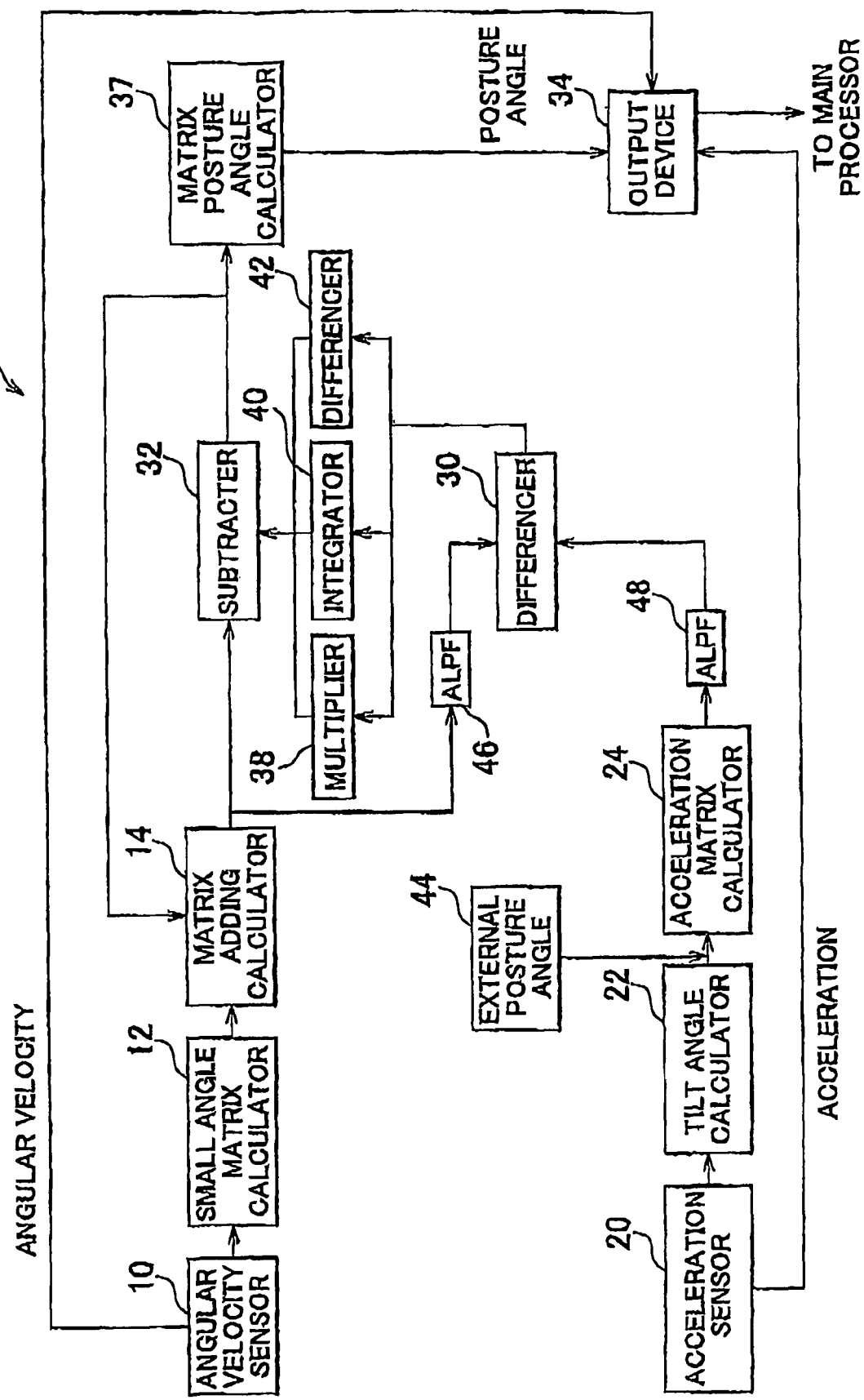
FIG. 13 is a block diagram of an eighth exemplary embodiment of the invention.

Continuing on, an eighth second exemplary embodiment will be described. FIG. 13 is a block diagram of the eighth exemplary embodiment of the invention. This exemplary embodiment differs from the seventh exemplary embodiment in that the differencer 30 calculates the difference between the output of the low pass filter 46 and the output of the low pass filter 48 and outputs the result to the multiplier 38, the integrator 40, and the differencer 42. The multiplier 38, the integrator 40, and the differencer 42 perform PID control. That is, the multiplier 38 performs a calculation of multiplying the drift amount from the differencer 30 by a coefficient that was set in advance and outputs the calculated value (proportional term) to the subtracter 32. The integrator 40 performs a calculation of multiplying the value of the drift amount from the differencer 30 accumulated over time by a coefficient that was set in advance and outputs the calculated value (integral term) to the subtracter 32. The differencer 42 performs a calculation of multiplying a value which is the difference over time in the drift amount from the differencer 30 by a coefficient that was set in advance and outputs the calculated value (differential term) to the subtracter 32. The multiplication operation, integral calculation, and difference operation are performed for each component of the matrix of the drift amount. The coefficients may be fixed or they may be variable as will be described later. The subtracter 32 subtracts the sum of these terms (i.e., the proportional term+the integral term+the differential term) from the angular velocity system posture matrix that was input by the matrix adding calculator 14, calculates the angular velocity system posture matrix minus the drift amount, and outputs it to the matrix posture angle calculator 37. The output from the subtracter 32 is fed back to the matrix adding calculator 14. The multiplier 38 mainly determines the degree of feedback, the integrator 40 accumulates the amount of long term deviation and determines the amount of feedback, and the differencer 42 determines the amount of feedback with respect to short term changes. Using this kind of PID control improves both short and long term characteristics.

Also, in FIG. 13 the posture angle around the Z axis, i.e., the yaw angle φ, from the external posture angle 44 is supplied to the acceleration matrix calculator 24. The acceleration sensor 20 detects the acceleration in the direction of each axis x, y, and z. When a G sensor is used, however, the yaw angle φ, i.e., the posture angle around the Z axis, is unclear so it is necessary to fix the yaw angle φ at a constant value (such as 0). In this exemplary embodiment, the yaw angle is detected separately and supplied to the acceleration matrix calculator 24, which also prevents the yaw angle φ from diverging.

Figure 14:
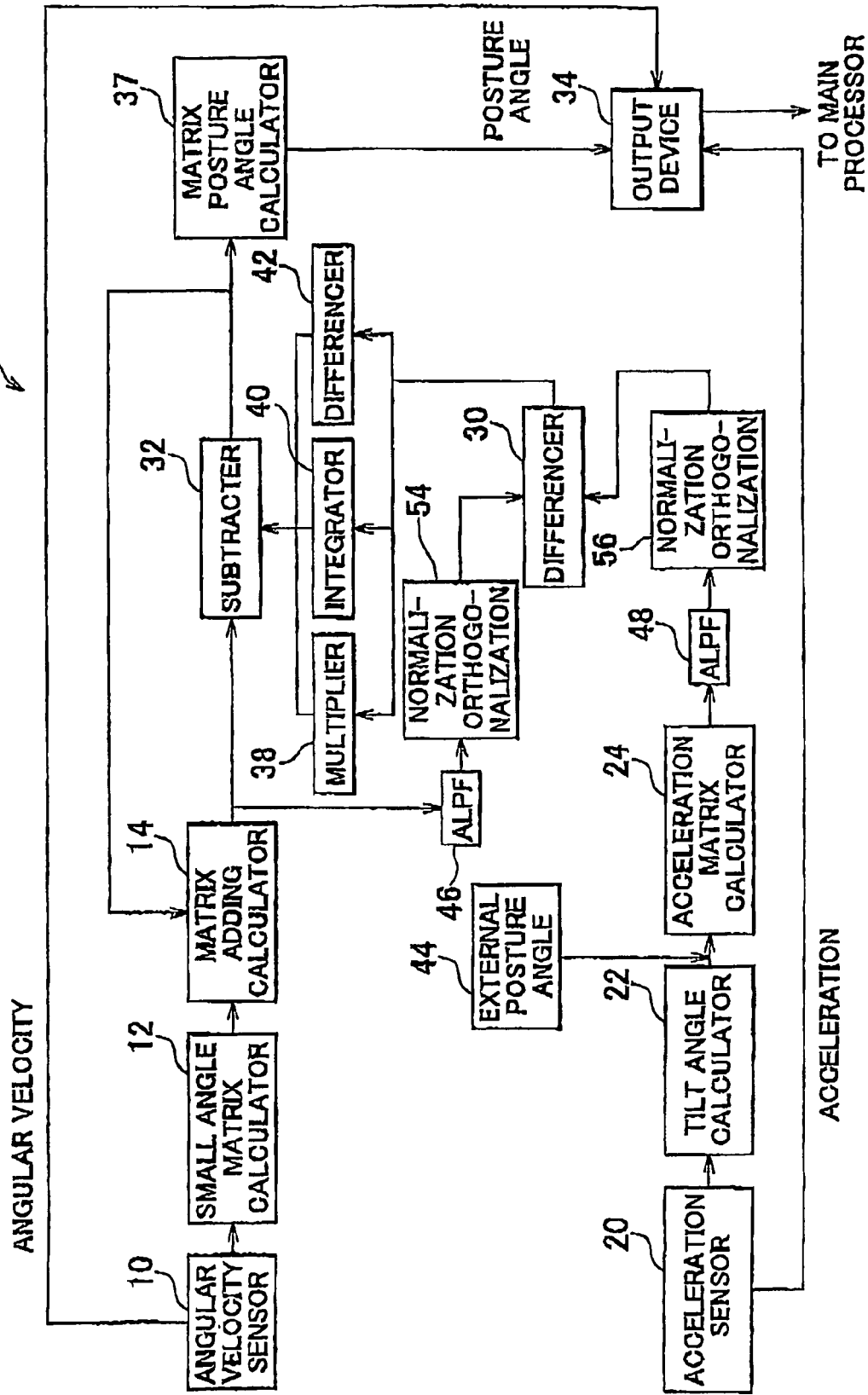
FIG. 14 is a block diagram of a ninth exemplary embodiment of the invention.

Continuing on, a ninth exemplary embodiment will be described. FIG. 14 is a block diagram showing the ninth exemplary embodiment of the invention. The ninth exemplary embodiment differs from the eighth exemplary embodiment in that the normalizer/orthogonalizers 54 and 56 are added after the low pass filters 46 and 48. When the low range components are extracted from the posture matrix by the low pass filters 46 and 48, the posture matrix becomes distorted such that normality and orthogonality are no longer able to be guaranteed. This distortion is therefore corrected by normalizing and orthogonalizing using the normalizer/orthogonalizers 54 and 56. The method of normalizing and orthogonalizing is as described above. The low pass filters 46 and 48 are applied to the first column (a, b, c), the second column (d, e, f), and the third column (g, h, i) of components indicating rotation, i.e., 3×3 matrix components, in the 4×4 posture matrix, thus making it easier to extract the respective low range components. Also, the low pass filters can be applied to a total of six components, i.e., three opposite angle components on one side and three off-diagonal components on the other side, from among the 3×3 matrix components, and an equivalent matrix filter can be created.

Figure 15:
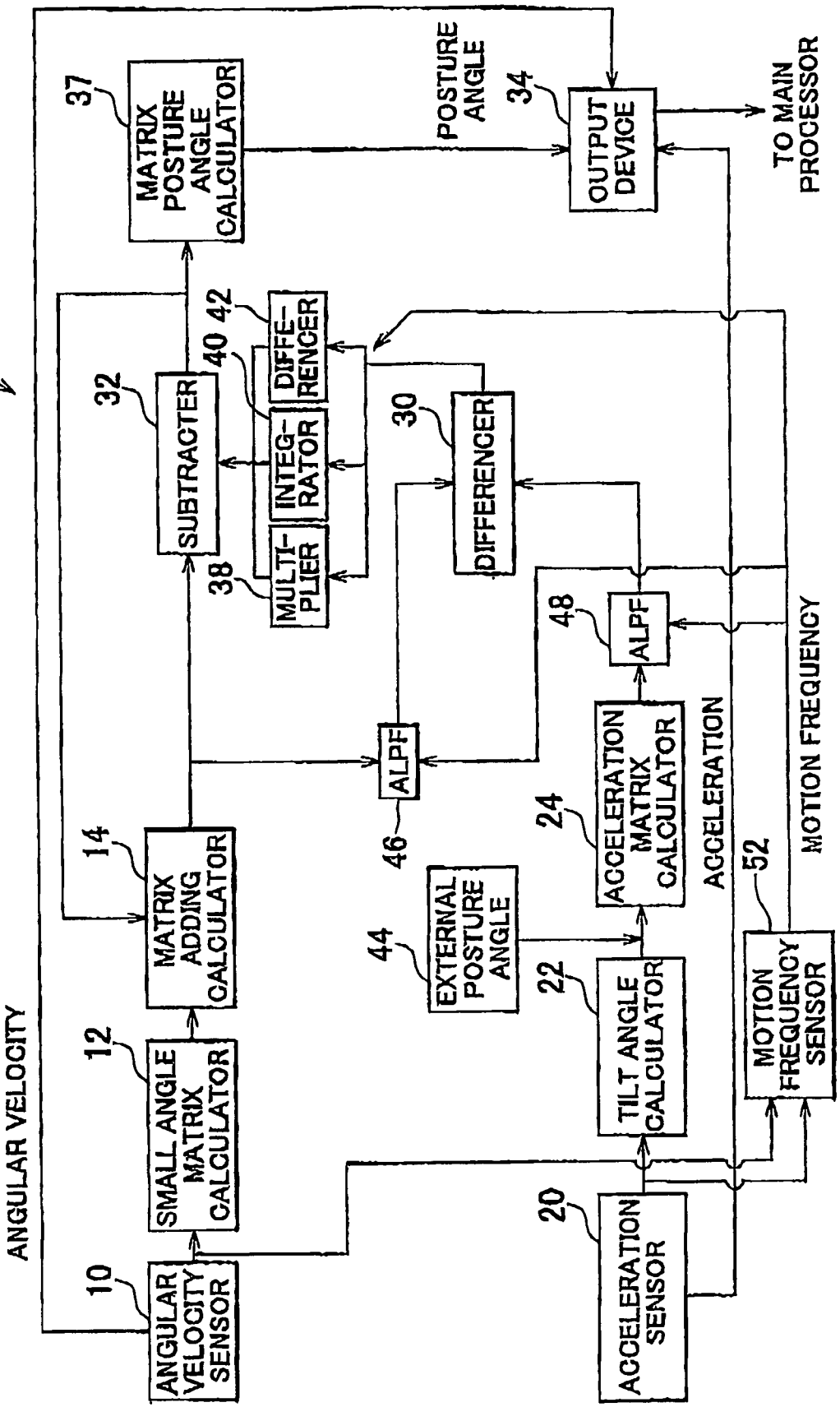
FIG. 15 is a block diagram of a tenth exemplary embodiment of the invention.

Continuing on, a tenth exemplary embodiment will be described. FIG. 15 is a block diagram of the tenth exemplary embodiment of the invention. This exemplary embodiment differs from the eighth exemplary embodiment in that a motion frequency sensor 52 is provided which inputs the angular velocity from the angular velocity sensor 10 and the acceleration from the acceleration sensor 20, and detects a particular frequency in the movement of the robot, i.e., the moving body. The motion frequency sensor 52 extracts a frequency component that appears frequently from the angular velocity and the acceleration and outputs it to the low pass filters 46 and 48. One example is the specific frequency in bipedal locomotion when the robot, i.e., moving body, is walking on two legs. The low pass filters 46 and 48 adaptively adjust the cutoff frequency according to the frequency input from the motion frequency sensor 52. The low pass filters 46 and 48 increase the cutoff frequency the greater the motion frequency. Also, the motion frequency sensor 52 outputs the motion frequency to the multiplier 38, the integrator 40, and the differencer 42 which execute PID control. The multiplier 38, the integrator 40, and the differencer 42 adjust the multiplier coefficients according to the motion frequency that was input. Adaptively adjusting the cutoff frequency and the coefficients of PID control according to a particular frequency in a motion in this way improves responsiveness, as well as the abilities to follow and adapt.

Continuing on, an eleventh exemplary embodiment will be described.

Figure 16:
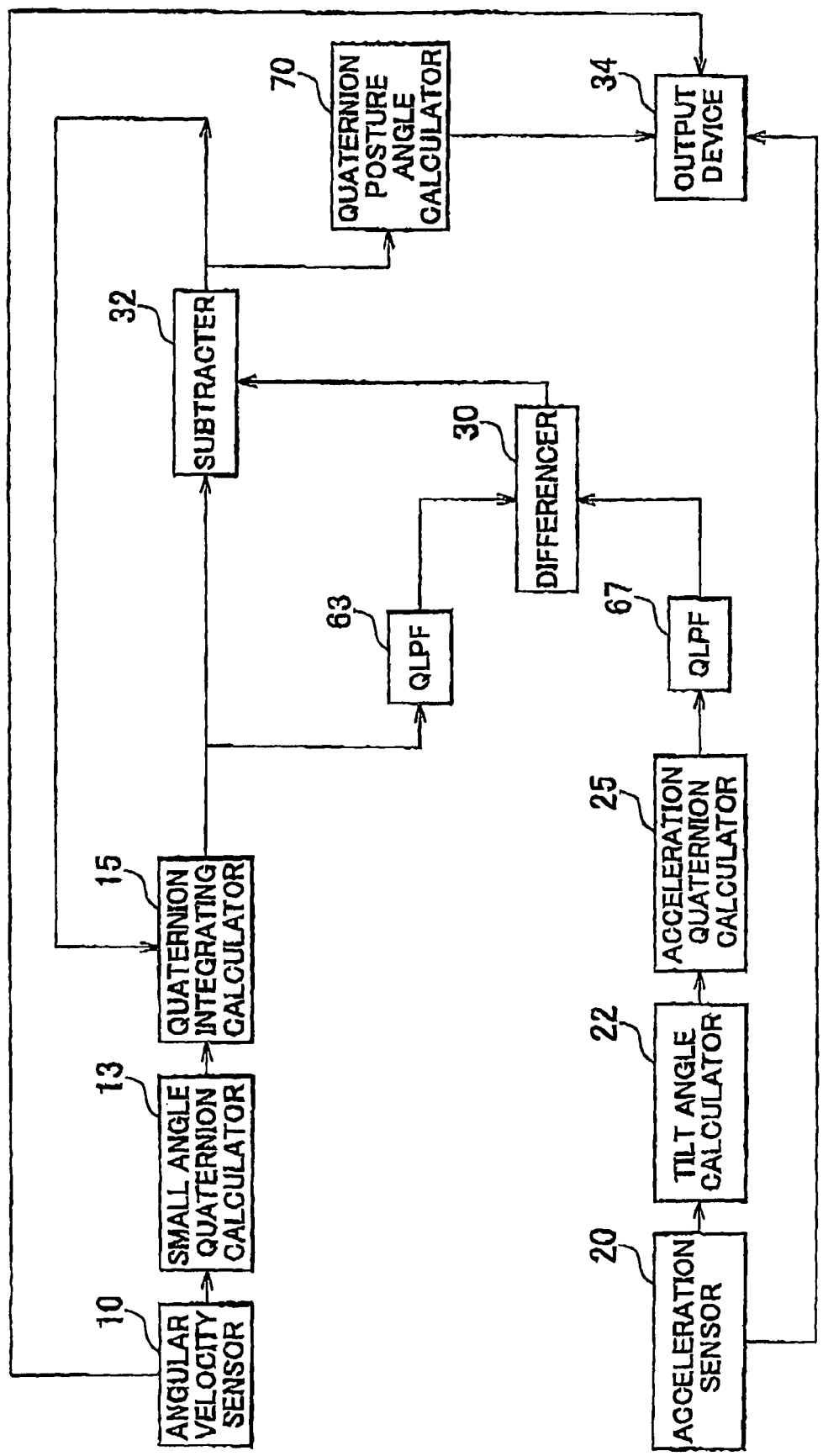
FIG. 16 is a block diagram of an eleventh exemplary embodiment of the invention.

FIG. 16 is a block diagram showing the eleventh exemplary embodiment of the invention. Each of the foregoing exemplary embodiments uses a posture matrix. This exemplary embodiment, however, uses a quaternion instead of a posture matrix. A small angle quaternion calculator 13 is used to create a small angle quaternion using a small angle obtained from the angular velocity sensor 10. Using this small angle quaternion, small rotation is applied to the quaternion that was fed back and a quaternion after that rotation is obtained by a quaternion integrating calculator 15. This integrated quaternion is then output to the subtracter 32. The same output that is output to the subtracter 32 is also input to a quaternion low pass filter 63. This quaternion low pass filter 63 extracts a low range component of the posture. After the tilt angle calculator 22 obtains the tilt angle, an acceleration quaternion calculator 25 uses the output from the acceleration sensor 20 to obtain an acceleration quaternion. This acceleration quaternion is then input to a quaternion low pass filter 67. The quaternion low pass filter 67 extracts a low range component of the posture. The differencer 30 calculates the difference between the low range component of the angular velocity system quaternion and the low range component of the acceleration system quaternion, and extracts the drift amount included in the angular velocity quaternion. The differencer 30 then outputs that drift amount to the subtracter 32.

The subtracter 32 calculates the difference between the angular velocity system quaternion input from the quaternion integrating calculator 15 and the drift amount from the differencer 30, and removes the drift amount from the angular velocity system quaternion. The subtracter 32 then outputs the angular velocity system quaternion from which the drift amount has been removed to the quaternion integrating calculator 15 as well as to a quaternion posture angle calculator 70.

The accumulation of integration error can be prevented because the quaternion that is fed back is a quaternion from which the drift amount has been removed. The quaternion posture angle calculator 70 calculates the posture angle from the quaternion that was input and outputs the result to the output device 34.

Hereinafter, a method for calculating the quaternion as well as a method for calculating the posture angle from the quaternion will be described.

First, the quaternion will be described. The quaternion is such that a plurality of prime numbers having degrees of freedom in two dimensions is expanded to have degrees of freedom in four dimensions. The quaternion is typically expressed as:

$$q = a + bi + cj + dk$$

Here, a, b, c, and d are real numbers and i, j, and k are bases (size=1). The products of the bases have the following relationships.

$$i \times 1 = 1 \times i = i$$

$$j \times 1 = 1 \times j = j$$

$$k \times 1 = 1 \times k = k$$

$i \times j = -j \times i = k$ $j \times k = -k \times j = i$ $k \times i = -i \times k = j$ Also, with respect to the two quaternions $q1=a1+b1i+c1j+d1k$ and $q2=a2+b2i+c2j+d2k$, the sums and differences are:

$q1+q2=a1+a2+(b1+b2)i+(c1+c2)j+(d1+d2)k$ $q1-q2=a1-a2+(b1-b2)i+(c1-c2)j+(d1-d2)k$ and the product is:

$q1q2=(a1+b1i+c1j+d1k)\times(a2+b2i+c2j+d2k)=(a1a2-b1b2-c1c2-d1d2)+(a1b2+b1a2+c1d2d2c2)i+(a1c2-b1d2+c1a2+d1b2)j+(a1d2+b1c2-c1b2+d1a2)k$ The quaternion is represented as follows using imaginary number units i, j, and k.

$P=(a;xi,yj,zk)$

Using a quaternion Q, the relationship, i.e., posture, of the sensor coordinate system xyz when viewed in the reference coordinate system XYZ is $Q=(\cos \eta/2; \alpha \sin \eta/2, \beta \sin \eta/2, \gamma \sin \eta/2)$ This shows a coordinate system (sensor coordinate system) in which the reference coordinate system rotated at an angle $\eta$ around rotating axes ($\alpha$, $\beta$, $\gamma$) expressed by the reference coordinate system, and expresses the posture of the sensor coordinate system.

Next, a representation by the quaternion of the angular velocity sensor output will be described. The relationship between the rotation angle and the sensor output is as follows from the small rotation angles $\Delta\psi$, $\Delta\theta$, and $\Delta\phi$, the angular velocity sensor outputs $\omega x$, $\omega y$, and $\omega z$, and the sampling cycle ts.

$\Delta\psi=\omega x \times ts$ $\Delta\theta=\omega y \times ts$ $\Delta\phi=\omega z \times ts$ When the rotational conversion at this time is expressed by the quaternion, we get $qx=(\cos \Delta\psi/2; \sin \Delta\psi/2i, 0j, 0k)$ $qy=(\cos \Delta\theta/2; 0i, \sin \Delta\theta/2j, 0k)$ $qz=(\cos \Delta\phi/2; 0i, 0j, \sin \Delta\phi/2k)$ The rotational conversions around the x axis, the y axis, and the z axis are represented together. When the rotation angle $\alpha$ is sufficiently small, we get the following.

$qxqyqz=(1+\Delta\psi\Delta\theta\Delta\phi/8;(\Delta\psi/2-\Delta\psi\Delta\phi/4)i,(\Delta\theta/2+\Delta\psi\Delta\phi/4)j,(\Delta\phi/2-\Delta\psi\Delta\theta/4)k)$ Next, the integration of the rotational conversion from the quaternion will be described. When the rotational conversion q1 is $q1=(\cos \eta1/2; \alpha \sin \eta1/2, \beta \sin \eta 1/2, \gamma \sin \eta1/2)$, then the rotational conversion q2 is $q2=(\cos \eta2/2; \alpha \sin \eta2/2, \beta \sin \eta2/2, \gamma \sin \eta2/2)$ First, the rotation conversion q1 is performed for the reference coordinate system, and then the rotational conversion q2 is performed for the coordinate system after that rotation. A conversion q3 from two rotational conversions is $q3=q1\times q2=(\cos \eta1/2; \alpha \sin \eta1/2, \beta \sin \eta1/2, \gamma \sin \eta1/2)\times(\cos \eta2/2; \alpha \sin \eta2/2, \beta \sin \eta2/2, \gamma \sin \eta2/2)$ Next, normalization of the quaternion will be described. With the quaternion that expresses rotation, after calculation, normalization is performed to make the size (norm) of the conversion q equal to 1. When the quaternion that expresses rotation is expressed by q, the size of q is obtained and then normalization is performed by dividing q by the size, thereby obtaining q'.

$q=(\epsilon 0; \epsilon 1, \epsilon 2, \epsilon 3)$ $|q|=(\epsilon 0^2+\epsilon 1^2+\epsilon 2^2+\epsilon 3^2)^{0.5}$ $q'=q/|q|$ The quaternion is a representational method that maintains the orthogonal condition so further orthogonalization is not necessary.

Next, the conversion from the quaternion to the posture angle will be described. When $a=\epsilon 0^2+\epsilon 1^2-\epsilon 2^2-\epsilon 3^2$ $b=2(\epsilon 1\epsilon 2+\epsilon 0\epsilon 3)$ $c=2(\epsilon 1\epsilon 3-\epsilon 0\epsilon 2)$ $d=2(\epsilon 1\epsilon 2-\epsilon 0\epsilon 3)$ $e=\epsilon 0^2-\epsilon 1^2+\epsilon 2^2\epsilon 3^2$ $f=2(\epsilon 2\epsilon 3+\epsilon 0\epsilon 1)$ $g=2(\epsilon 1\epsilon 3+\epsilon 0\epsilon 2)$ $h=2(\epsilon 2\epsilon 3-\epsilon 0\epsilon 1)$ $i=\epsilon 0^2-\epsilon 1^2-\epsilon 2^2+\epsilon 3^2$ in the conversion $q=(\epsilon 0; \epsilon 1, \epsilon 2, \epsilon 3)$ expressed by the quaternion, the posture angle is obtained by the following expressions.

yaw angle $\phi=\text{atan } 2(b,a)$ pitch angle $\theta=\text{atan } 2(-c, \cos \phi\cdot a+\sin \phi\cdot b)$ roll angle $\gamma=\text{atan } 2(\sin \phi\cdot g-\cos \phi\cdot h, -\sin \phi\cdot d+\cos \phi\cdot e)$ Next, the conversion from the posture angle (roll angle, pitch angle, yaw angle) to the quaternion will be described. The rotational conversions from the posture angles ($\psi$, $\theta$, $\phi$) are expressed with the quaternion.
The rotation around the x axis is $R(\psi; i)=\cos \psi/2+i \sin \psi/2$ The rotation around the y axis is $R(\theta; j)=\cos \phi/2+j \sin \theta/2$ The rotation around the z axis is $R(\phi; k)=\cos \phi/2+k \sin \phi/2$ When these are multiplied together, we get $S=R(\phi;k)\times R(\theta;j)\times R(\psi;i)=(\cos \phi/2+k \sin \phi/2)\times \cos \theta/2+j \sin \theta/2)\times(\cos \psi/2+i \sin \gamma/2)$ If the conversion q expressed by the quaternion is expressed as $q=(\epsilon 0; \epsilon 1, \epsilon 2, \epsilon 3)$ at this time, then the rotation angle becomes the real part in the calculation result of S and the rotation axis becomes the imaginary part of S.

$\epsilon 0=\cos \phi/2\cdot\cos \theta/2\cdot\cos \psi/2+\sin \phi/2\times\sin \theta/2\cdot\sin \psi/2$ $\epsilon 1 = -\sin \phi/2 \cdot \sin \theta/2 \cdot \cos \psi/2 + \cos \phi/2 \cdot \cos \theta/2 \cdot \sin \psi/2$ $\epsilon 2 = \sin \phi/2 \cdot \cos \theta/2 \cdot \sin \psi/2 + \cos \phi/2 \cdot \sin \theta/2 \cdot \cos \psi/2$ $\epsilon 3 = \sin \phi/2 \cdot \cos \theta/2 \cdot \psi/2 - \cos \phi/2 \cdot \sin \theta/2 \cdot \sin \psi/2$ At this time, the rotation angle α is obtained from cos α/2=ϵ0. Also, the rotation angles are (ϵ1, ϵ2, ϵ3). Also, the rotation angles are (ϵ1, ϵ2, ϵ3).

Figure 17:
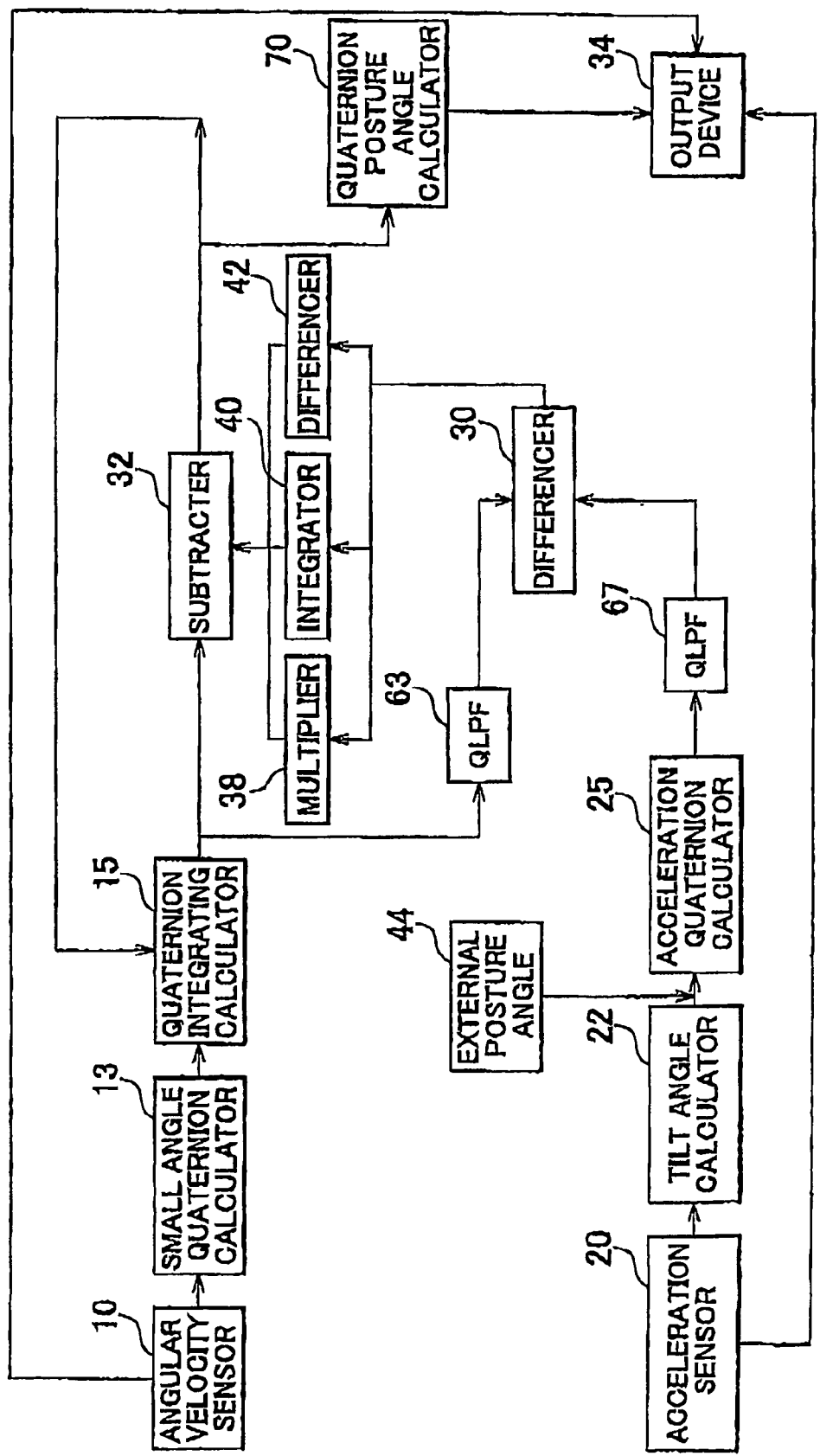
FIG. 17 is a block diagram of a twelfth exemplary embodiment of the invention.

Continuing on, a twelfth exemplary embodiment will be described. FIG. 17 is a block diagram of the twelfth exemplary embodiment of the invention. This exemplary embodiment differs from the eleventh exemplary embodiment in that the multiplier 38, the integrator 40, and the differencer 42 are provided for executing PID control, and the yaw angle detected by the external posture angle 44 is supplied to the acceleration quaternion calculator 25. The structure corresponds to that shown in FIG. 13. The multiplier 38 performs a calculation in which it multiplies the drift amount (quaternion) from the differencer 30 by a coefficient that was set in advance and outputs the calculated value (proportional term) to the subtracter 32. The integrator 40 performs a calculation in which it multiplies the value of the drift amount (quaternion) from the differencer 30 accumulated over time by a coefficient that was set in advance and outputs the calculated value (integral term) to the subtracter 32. The differencer 42 performs a calculation in which it multiplies a value which is the difference over time in the drift amount (quaternion) from the differencer 30 by a coefficient that was set in advance and outputs the calculated value (differential term) to the subtracter 32. The coefficients may be fixed or they may be variable. The subtracter 32 calculates the difference between the angular velocity system quaternion that was input and the sum of these terms (i.e., the proportional term+the integral term+the differential term), calculates an angular velocity system quaternion from which the drift amount has been removed, and outputs the result to the quaternion posture angle calculator 70.

Figure 18:
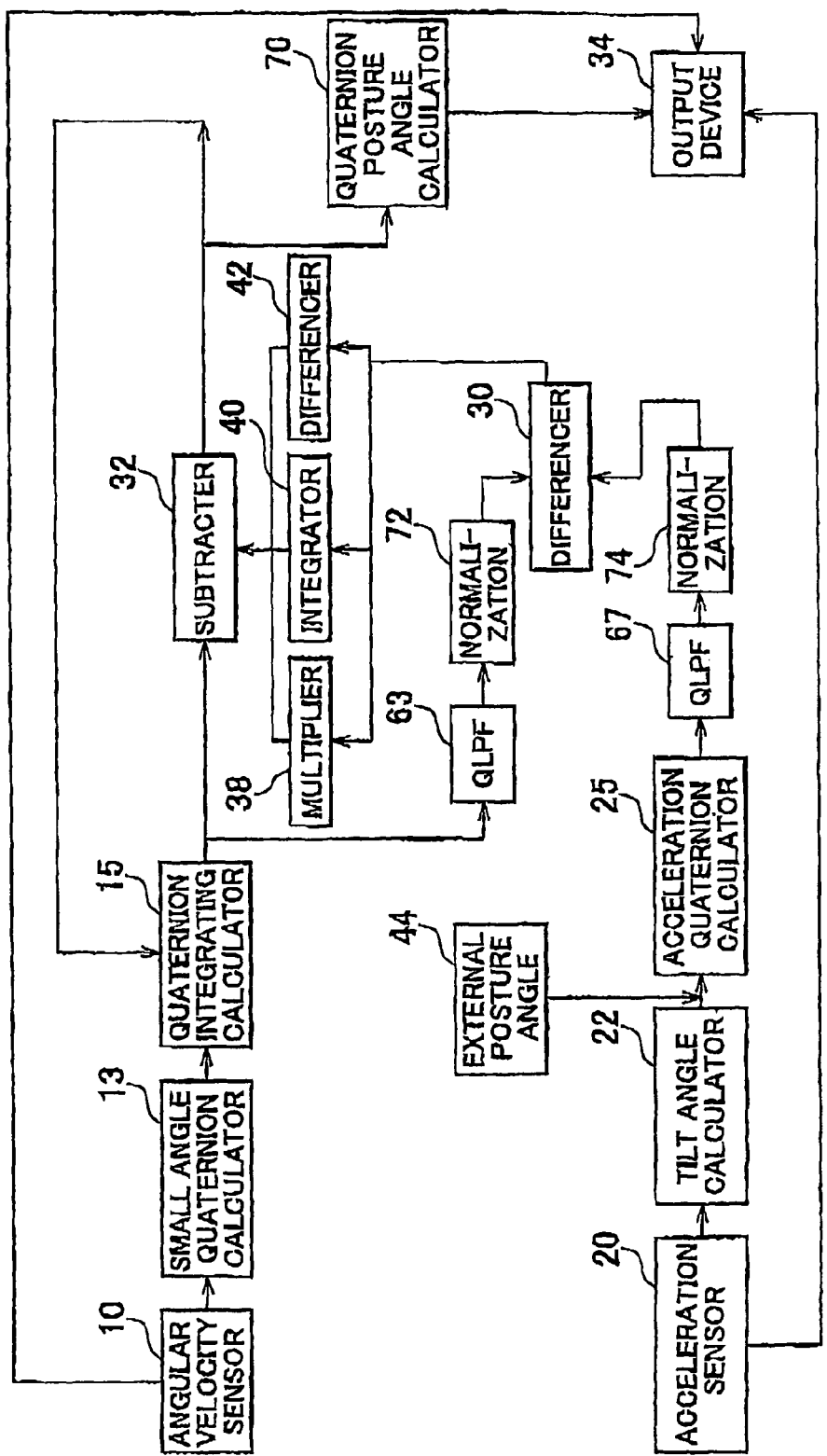
FIG. 18 is a block diagram of a thirteenth exemplary embodiment of the invention.

Continuing on, a thirteenth exemplary embodiment will be described. FIG. 18 is a block diagram of the thirteenth exemplary embodiment of the invention. This exemplary embodiment differs from the twelfth exemplary embodiment in that normalizers 72 and 74 are provided after the low pass filters 63 and 67. This structure corresponds to that shown in FIG. 14. The angular velocity system quaternion and the acceleration system quaternion are processed by the low pass filters 63 and 67, respectively. This processing, however, causes distortion such that they may become denormalized. Detection accuracy of the posture angle can therefore be maintained by correcting that distortion using the normalizers 72 and 74.

Figure 19:
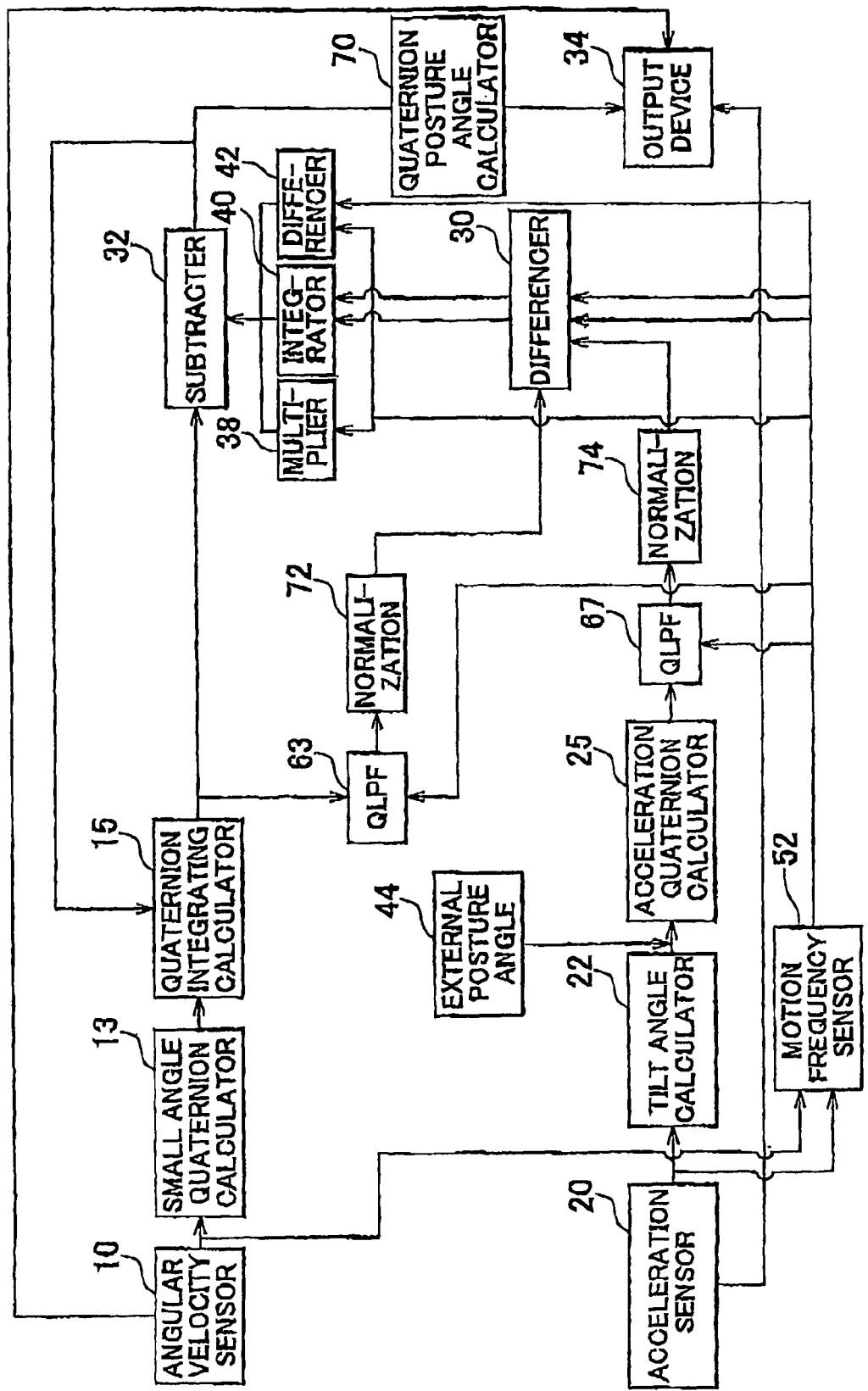
FIG. 19 is a block diagram of a fourteenth exemplary embodiment of the invention.

Continuing on, a fourteenth exemplary embodiment will be described. FIG. 19 is a block diagram of the fourteenth exemplary embodiment of the invention. This exemplary embodiment differs from the twelfth exemplary embodiment in that a motion frequency sensor 52 is provided which inputs the angular velocity from the angular velocity sensor 10 and the acceleration from the acceleration sensor 20, and detects a particular frequency in the movement of the robot, i.e., the moving body. This structure corresponds to that shown in FIG. 15. The motion frequency sensor 52 extracts frequency components that frequently appear from the angular velocity and the acceleration and outputs them to the low pass filters 63 and 67. The low pass filters 63 and 67 adaptively adjust the cutoff frequency according to the frequency input from the motion frequency sensor 52. The low pass filters 63 and 67 increase the cutoff frequency the greater the motion frequency. Also, the motion frequency sensor 52 outputs the motion frequency to the multiplier 38, the integrator 40, and the differencer 42 which execute PID control. The multiplier 38, the integrator 40, and the differencer 42 adjust the multiplier coefficients according to the motion frequency that was input. Adaptively adjusting the cutoff frequency and the coefficients of PID control according to a particular frequency in a motion in this way improves responsiveness, as well as the abilities to follow and adapt.

Figure 20:
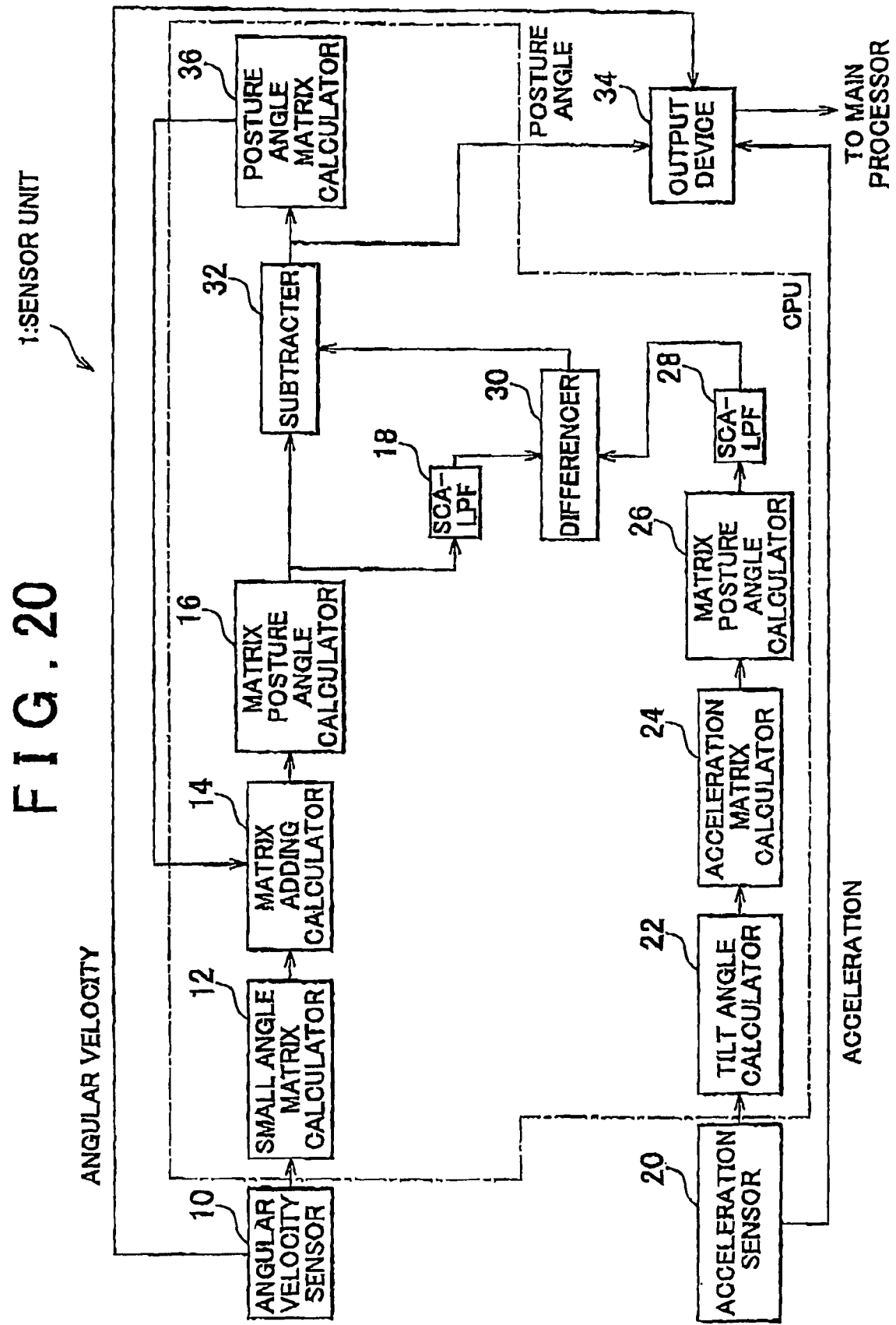
FIG. 20 is a block diagram of a fifteenth exemplary embodiment of the invention.

Continuing on, a fifteenth exemplary embodiment will be described. FIG. 20 is a block diagram of a moving body posture angle detecting apparatus according to the fifteenth exemplary embodiment of the invention. This exemplary embodiment differs from the first exemplary embodiment in that the low pass filters 18 and 28 perform a sin conversion, a cos conversion, and an atan 2 conversion (i.e., they both perform SCA conversion).

The angular velocity sensor 10 detects the angular velocity in the sensor coordinate system (i.e., the coordinate system of the sensor unit). The angular velocities around the axes are designated as ωx, ωy, and ωz. The angular velocity sensor 10 outputs the detected angular velocities to the small angle matrix calculator 12.

The small angle matrix calculator 12 calculates a coordinate conversion matrix for calculating the sensor coordinate system xyz when viewed in the reference coordinate system XYZ. The small angle matrix will be described later. The small angle matrix calculator 12 outputs the calculated small angle matrix to the matrix adding calculator 14.

The matrix adding calculator 14 performs an integral calculation by adding the current small angle matrix detected by the angular velocity sensor 10 that was input from the small angle matrix calculator 12 to a posture angle matrix that was fed back from the output side. The matrix adding calculator 14 then outputs the integrated matrix to the matrix position angle calculator 16.

The matrix posture angle calculator 16 calculates the posture angle from the integrated matrix that was input and outputs the result as an angular velocity posture angle SYA to both the low pass filter LPF 18 and the subtracter 32.

The low pass filter (i.e., angular velocity system low pass filter) 18 extracts a low range component from the angular velocity posture angle SYA and outputs it to the differencer 30. The angular velocity posture angle SYA includes a true posture angle (posture angle true value) and a drift amount from integration error. The low pass filter 18 removes the high range posture angle true value from the angular velocity posture angle SYA and extracts the low range posture angle true value and the drift amount.

Meanwhile, the acceleration sensor 20 detects the acceleration in the direction of each axis in the sensor coordinate system xyz. The detected accelerations are designated as Gx, Gy, and Gz. The acceleration sensor 20 then outputs the detected accelerations to the tilt angle calculator 22.

The tilt angle calculator 22 calculates the angles between the Z axis of the reference coordinate system XYZ and each axis of the sensor coordinate system xyz. The calculated tilt angles are designated as λx, λy, and λz. The tilt angle calculator 22 then outputs the calculated tilt angles to the acceleration matrix calculator 24.

The acceleration matrix calculator 24 calculates the sensor coordinate system when viewed in the reference coordinate system using the tilt angle that was input, and outputs the result to the matrix posture angle calculator 26.

Similar to the matrix posture angle calculator 16, the matrix posture angle calculator 26 then calculates the posture angle from the matrix that was input and outputs the calculated posture angle as the acceleration posture angle SGA to the low pass filter 28.

The low pass filter (i.e., acceleration system low pass filter) 28 is a filter in which the cutoff frequency and attenuation factor are set the same as they are in the low pass filter 18. The low pass filter 28 extracts a low range component from the acceleration posture angle SGA and outputs it to the differencer 30. The acceleration posture angle SGA includes a high range posture angle pseudo value in the high range component and a low range posture angle true value in the low range component. No drift from integration error occurs in the acceleration posture angle. Because the cutoff frequency and attenuation factor in the low pass filter 28 are set the same as they are in the low pass filter 18, the low range posture angle true value of the angular velocity system is the same as the low range posture angle true value of the acceleration system. The frequency characteristic of the angular velocity system is also the same as the frequency characteristic of the acceleration system. Thus, only the drift component is accurately output by subtraction calculation of both of the low range posture angle true values. When the responsiveness of the components corresponding to the posture angles produced by the angular velocity system and the acceleration system are known beforehand, however, the cutoff frequency and the attenuation factor of the low pass filter can be adjusted to match their characteristics. This method can be effective when the adaptive range is narrow but the movement characteristics are known beforehand.

As described above, (the low range posture angle true value plus the drift component) from the low pass filter 18, as well as (the low range posture angle true value) from the low pass filter 28 are input to the differencer 30. The differencer 30 then calculates the difference between the two and extracts the drift amount (i.e., drift amount=(low range posture angle true value+drift amount)−(low range posture angle true value)). The differencer 30 then outputs the drift amount obtained through the difference calculation to the subtracter 32.

The subtracter 32 calculates the difference between the angular velocity posture angle SYA that was input from the matrix posture angle calculator 16 and the drift amount that was input from the differencer 30, and then removes the drift amount included in the angular velocity posture angle SYA from the matrix posture angle calculator 16. As described above, the angular velocity posture angle SYA from the matrix posture angle calculator 16 includes the posture angle true value (high range component+low range component) and the drift amount. The subtracter 32 then extracts the low range posture angle true value through subtraction (i.e., low range posture angle true value=(low range posture angle true value+drift amount)−(drift amount)). The subtracter 32 then outputs the posture angle true value that was obtained through subtraction to the output device 34. The subtracter 32 also outputs the posture angle true value to the posture angle matrix calculator 36.

The posture angle matrix calculator 36 calculates a posture angle matrix from the posture angle that was input and feeds it back to the matrix adding calculator 14. The posture angle matrix calculator 36 then performs an inverse operation of the matrix posture angle calculator 16 and creates a posture angle matrix from the posture angle. The matrix adding calculator 14 then performs an integral calculation by adding the posture angle matrix that was fed back to the small angle matrix that was calculated based on an angular velocity that was newly detected by the angular velocity sensor 10, and then calculates the posture angle from the angular velocity.

The output device 34 outputs the posture angle from which the drift amount has been removed by the subtracter 32 to an external component. In the case of a robot, a main processor (or host processor) inputs the posture angle and the like detected by the sensor unit and performs feedback control on the posture of the robot. The output device 34 outputs the posture angle at a predetermined timing to the main processor in response to a command from the main processor. The angular velocity detected by the angular velocity sensor 10 or the acceleration detected by the acceleration sensor may be supplied to the output device 34, and the output device 34 may output the angular velocity or the acceleration, in addition to the posture angle, to the main processor. Which of those is to be output is determined either by a command from the main processor or set parameters. The output device 34 outputs all of the angular velocity, the acceleration, and the posture angle at a given timing to the main processor, and selectively outputs one of those at another timing.

As described above, an accurate posture angle from which the drift amount has been removed is thus detected and output. Because the drift amount is extracted based on the acceleration in the direction of each axis detected by the acceleration sensor 20, that drift amount then removed from the angular velocity posture angle and the result fed back, there is no need for the angular velocity sensor 10 to be an expensive, heavy and extremely accurate sensor.

Meanwhile, when the matrix posture angle calculators 16 and 26 calculate the posture angle from the posture matrix, they perform that calculation using the function atan 2. As a result, despite the fact that the original posture angle is continuously changing, the posture angle may not change continuously in the calculation. This is discontinuity in the posture angle expression. Therefore, the posture angles from the matrix posture angle calculators 16 and 26 are used as they are without the low range component being extracted by the low pass filters. Instead, the low range components are extracted after conversion to a continuous posture angle.

Figure 21:
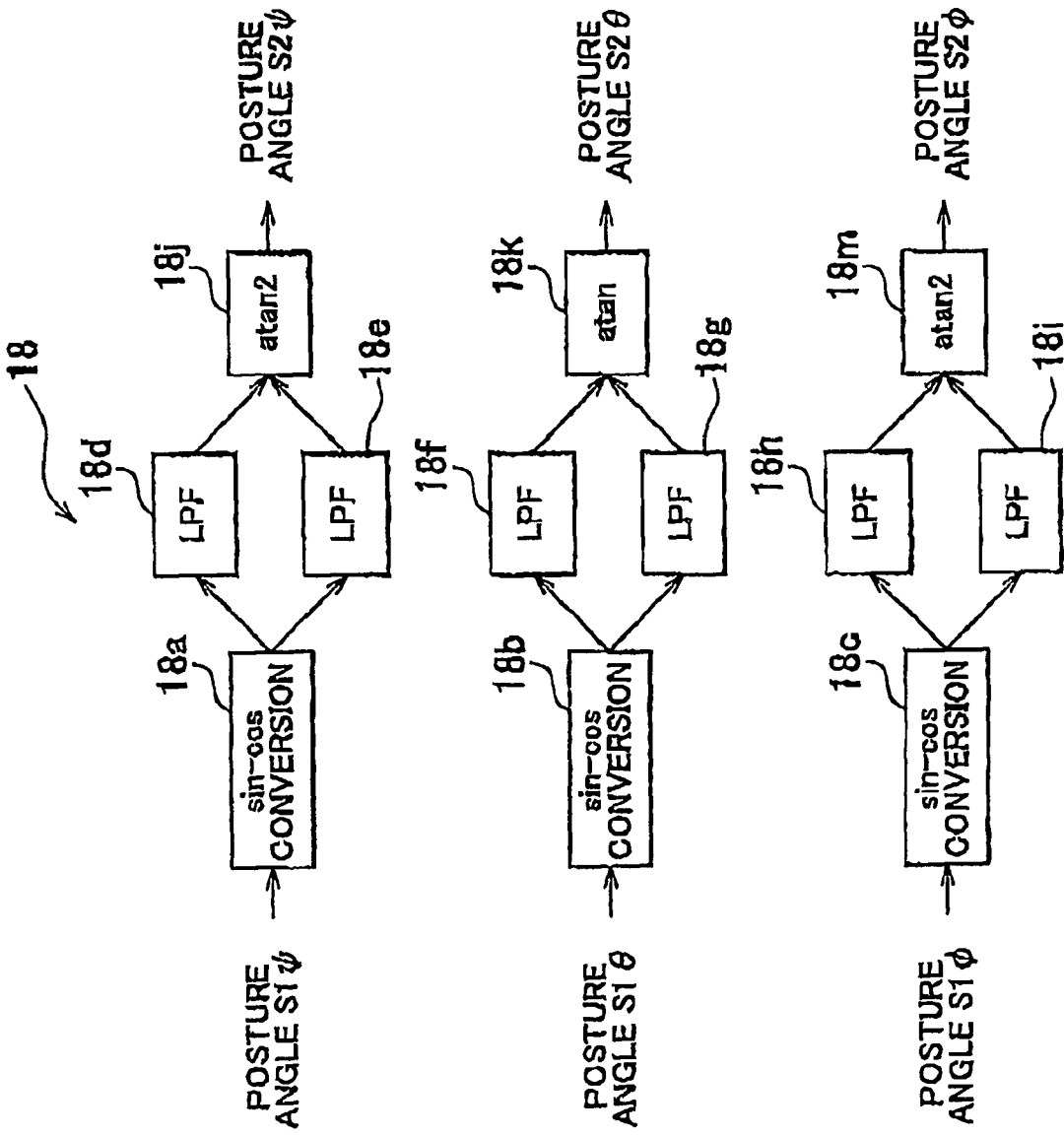
FIG. 21 is a block diagram of a low pass filter in FIG. 20.

FIG. 21 is a block diagram of the low pass filter 18. The low pass filter 18 has a converter that sin converts and cos converts the posture angle, and an atan 2 calculator or an atan calculator. The low pass filter 28 has the same structure as the low pass filter 18 so a description thereof will be omitted.

The sin-cos converters 18a, 18b, and 18c perform sin and cos conversions on the posture angles of each of the three axes and output the results. For example, if the angular velocity posture angles are $S1\psi$, $S1\theta$, and $S1\phi$, the sin-cos converter 18a calculates the sin ($S1\psi$) and cos ($S1\psi$) for the $S1\psi$ and outputs the result. The sin and cos converted values are then output to the low pass filters 18d and 18e, respectively. The low pass filters 18d and 18e then extract the low range components from the sin and cos converted values and output the results to an atan 2 calculator 18j. The atan 2 calculator 18j calculates an atan 2 using the sin and cos converted values and outputs the result as a posture angle $S2\psi$. Also, the sin-cos converter 18b calculates the sin ($S1\theta$) and cos ($S1\theta$) for the $S1\theta$ and outputs the result. The sin and cos converted values are then output to the low pass filters 18f and 18g, respectively. The low pass filters 18f and 18g then extract low range components from the sin and cos converted values and output the results to an atan calculator 18k. The atan calculator 18k then calculates an atan using the sin and cos converted values and outputs the result as a posture angle $S2\theta$. Moreover, the sin-cos converter 18c calculates the sin ($S1\phi$) and the cos ($S14$)) for the $S1\phi$ and outputs the result. The sin and cos converted values are output to the low pass filters 18h and 18i, respectively. The low pass filters 18h and 18i then extract the low range components from the sin and cos converted values and output the result to an atan 2 calculator 18m. The atan 2 calculator 18*m* calculates an atan 2 using the sin and cos converted values and outputs the result as a posture angle S24).

Combining the sin-cos conversion and the atan 2 calculation or atan calculation in this way makes it possible to eliminate poor operation of the low pass filters due to discontinuity in the posture angle, and thus stably extract the low range components. The values after the sin and cos conversions change continuously and smoothly within a range of ±1 so no dispersion or abnormal values are produced in the filter process. By performing the atan 2 calculation process using the sin and cos converted values after the filter process, the values are reconverted to posture angle components so the filter process of the posture angle components can be realized without the values exceeding the posture angle expression range.

Figure 22:
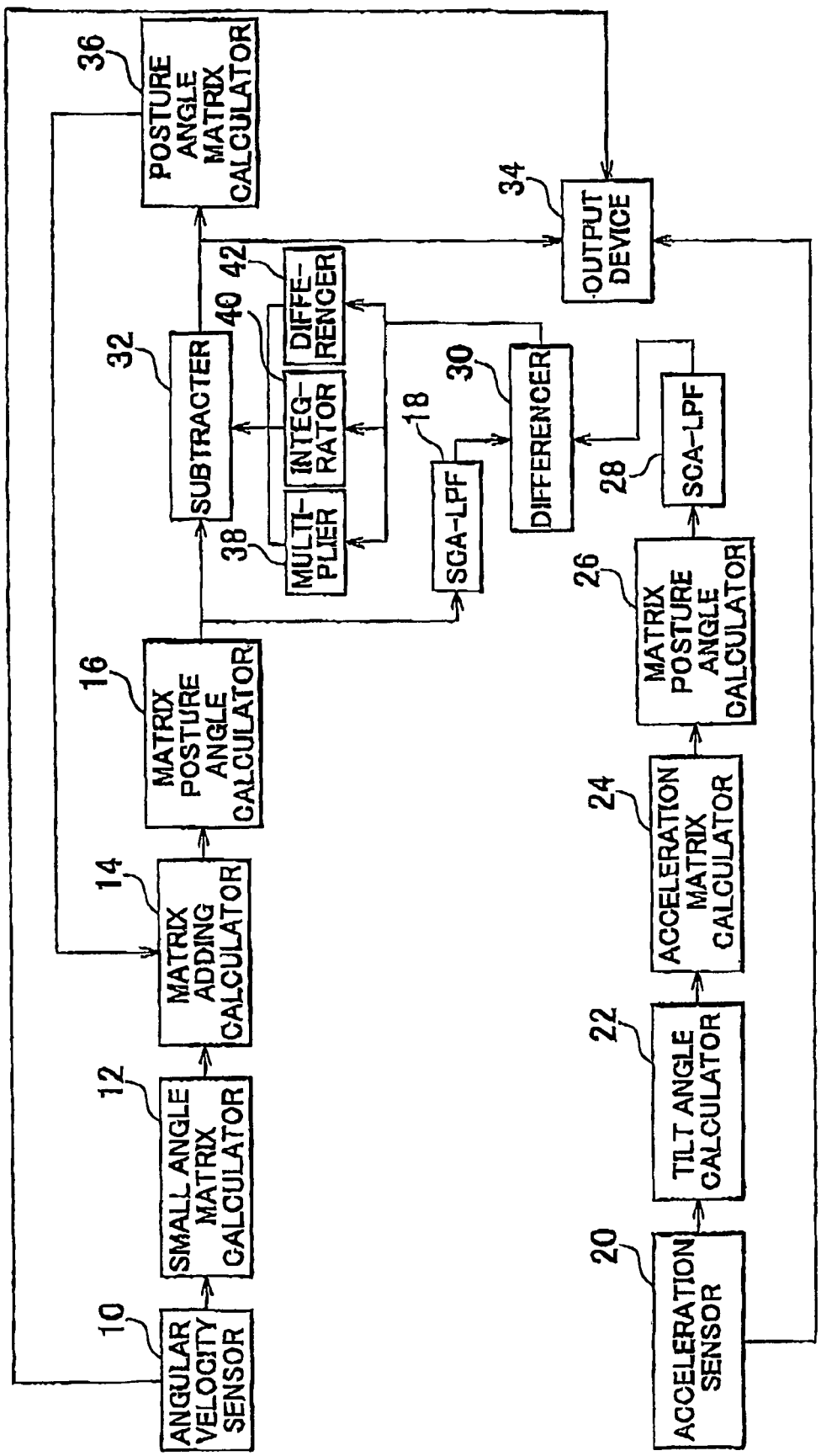
FIG. 22 is a block diagram of a sixteenth exemplary embodiment of the invention.

Continuing on, a sixteenth exemplary embodiment will be described. FIG. 22 is a block diagram of the sixteenth exemplary embodiment of the invention. This exemplary embodiment differs from the fifteenth exemplary embodiment in that the differencer 30 calculates the difference between the output of the low pass filter 18 and the output of the low pass filter 28 and outputs the result to the multiplier 38, the integrator 40, and the differencer 42. The multiplier 38, the integrator 40, and the differencer 42 perform PID control. That is, the multiplier 38 performs a calculation of multiplying the drift amount from the differencer 30 by a coefficient that was set in advance and outputs the calculated value (proportional term) to the subtracter 32. The integrator 40 performs a calculation of multiplying the value of the drift amount from the differencer 30 accumulated over time by a coefficient that was set in advance and outputs the calculated value (integral term) to the subtracter 32. The differencer 42 performs a calculation of multiplying a value which is the difference over time in the drift amount from the differencer 30 by a coefficient that was set in advance and outputs the calculated value (differential term) to the subtracter 32. The coefficients may be fixed or they may be variable as will be described later. The subtracter 32 subtracts the sum of these terms (i.e., the proportional term+the integral term+the differential term) from the angular velocity posture angle that was input by the matrix posture angle calculator 16, and outputs the result as a posture angle of the moving body minus the drift amount to the output device 34 and the posture angle matrix calculator 36. The output from the subtracter 32 is converted to a posture matrix by the posture angle matrix calculator 36 and the result is fed back. The multiplier 38 mainly determines the degree of feedback, the integrator 40 accumulates the amount of long term deviation and determines the amount of feedback, and the differencer 42 determines the amount of feedback with respect to short term changes. Using this kind of PID control improves both short and long term characteristics.

Figure 23:
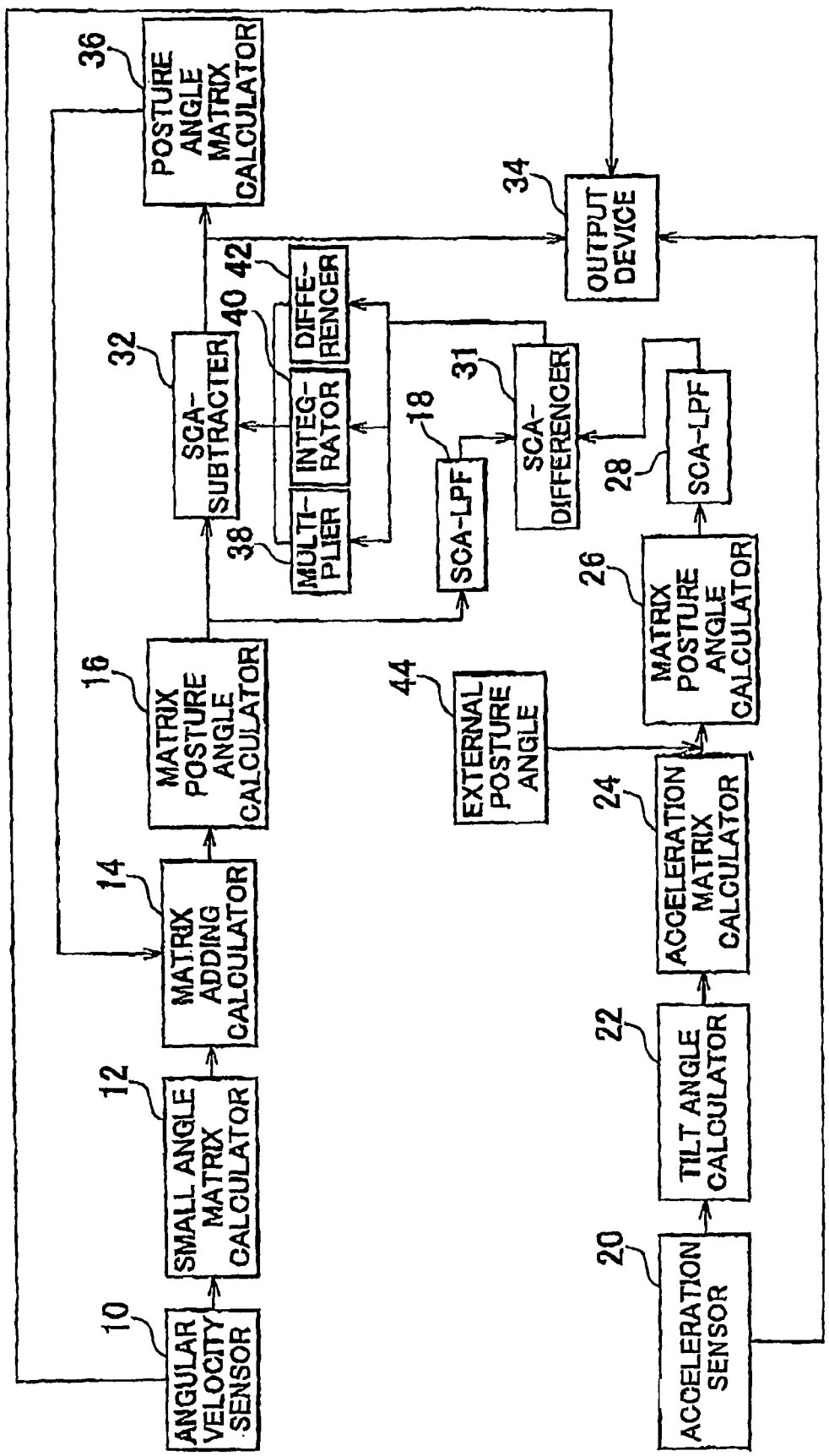
FIG. 23 is a block diagram of a seventeenth exemplary embodiment of the invention.

Continuing on, a seventeenth exemplary embodiment will be described. FIG. 23 is a block diagram of the seventeenth exemplary embodiment of the invention. This exemplary embodiment differs from the sixteenth exemplary embodiment in that the posture angle around the Z axis, i.e., the yaw angle, from the external posture angle 44 is supplied to the matrix posture angle calculator 26. The accelerator sensor 20 detects the acceleration in the direction of each axis x, y, and z. When a G sensor is used, however, the yaw angle $\phi$, i.e., the posture angle around the Z axis, is unclear so it is necessary to fix the yaw angle $\phi$ at a constant value. In this exemplary embodiment, the yaw angle is detected separately and supplied to the matrix posture angle calculator 26, thus enabling the yaw angle $\phi$ to also be accurately calculated. More specifically, the matrix posture angle calculator 26 calculates the yaw angle $\phi$, the roll angle $\theta$, and the pitch angle $\psi$ as posture angles from the posture matrix T(n) according to the calculation described above. Of these, however, the yaw angle $\phi$ is replaced with a yaw angle $\phi$ input from an external component, which prevents the yaw angle $\phi$ from diverging.

Also, in this exemplary embodiment, a differencer 31 is provided instead of the differencer 30. This differencer 31 includes a sin-cos converter and an atan 2 calculator or an atan calculator, just like the low pass filters 18 and 28.

Figure 24:
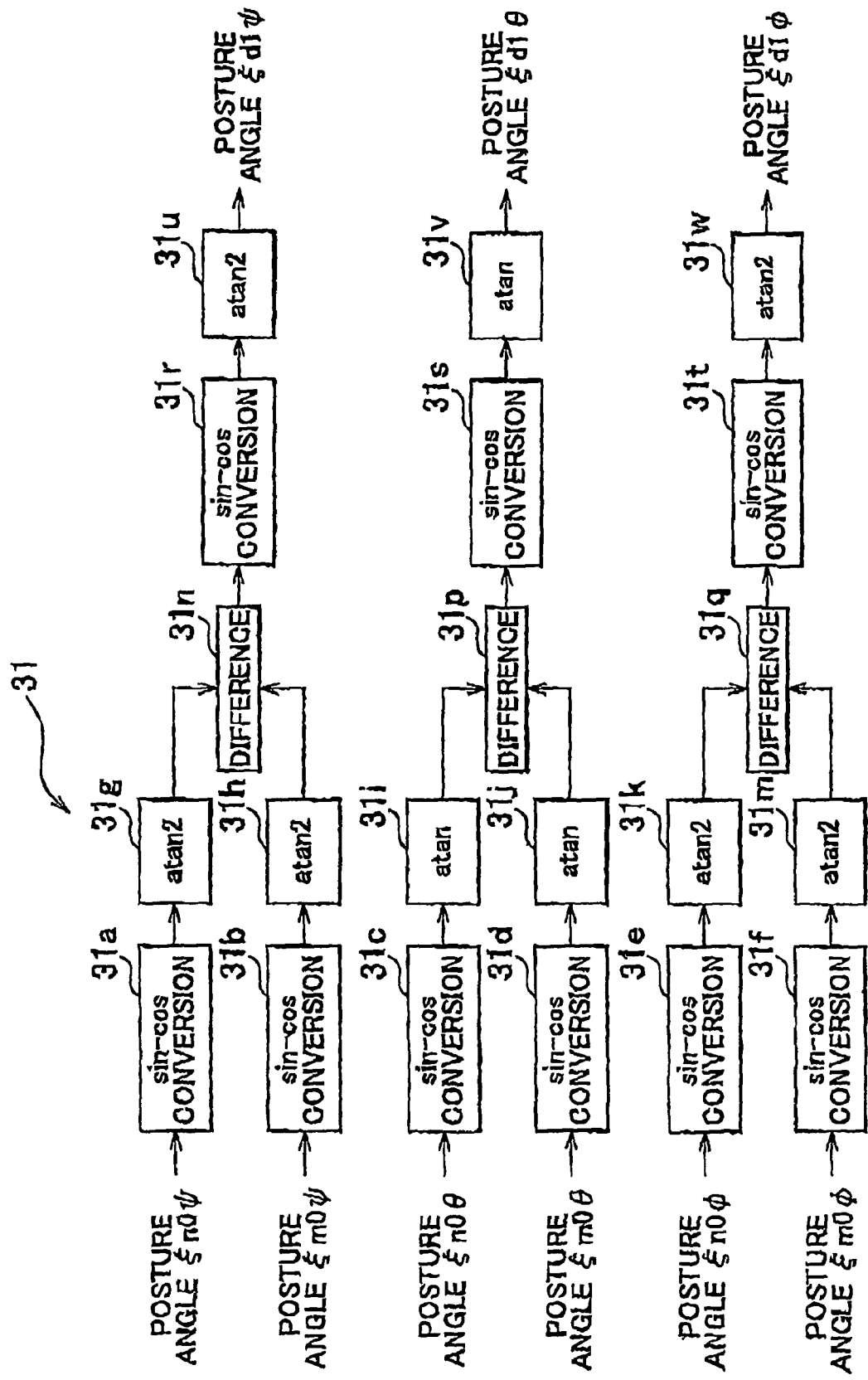
FIG. 24 is a block diagram of a differencer in FIG. 23.

FIG. 24 is a block diagram of the differencer 31. The angular velocity posture angle from the low pass filter 18 and the acceleration posture angle from the low pass filter 28 are both supplied to the differencer 31. The angular velocity posture angles of the three axes are designated as $\xi n0\psi$, $\xi n0\theta$, and $\xi n0\phi$, respectively, and the acceleration posture angles of the three axes are designated as $\xi m0\psi$, $\xi m0\theta$, and $\xi m0\phi$, respectively.

A sin-cos converter 31*a* performs sin and cos conversions on the $\xi n0\psi$ and outputs the respective values to an atan 2 calculator 31*g*. The atan 2 calculator 31*g* performs an atan 2 calculation using the sin and cos converted values and outputs the result to a differencer 31*n*. Meanwhile, a sin-cos converter 31*b* performs sin and cos conversions on the $\xi m0\psi$ and outputs the respective values to an atan 2 calculator 31*h*. The atan 2 calculator 31*h* performs an atan 2 calculation using the sin and cos converted values and outputs the result to the differencer 31*n*. The differencer 31*n* calculates the difference between the two and extracts the drift amount, which it then outputs to a sin-cos converter 31*r*. The sin-cos converter 31*r* and an atan 2 calculator 31*u* perform the same calculation and output $\xi d1\psi$ as the drift amount. A sin-cos converter 31*c* performs sin and cos conversions on the $\xi n0\theta$ and outputs the respective values to an atan calculator 31*i*. The atan calculator 31*i* performs an atan calculation using the sin and cos converted values and outputs the result to a differencer 31*p*. Meanwhile, a sin-cos converter 31*d* performs sin and cos conversions on the $\xi m0\theta$ and outputs the respective values to an atan calculator 31*j*. The atan calculator 31*j* performs an atan calculation using the sin and cos converted values and outputs the result to the differencer 31*p*. The differencer 31*p* calculates the difference between the two and extracts a drift amount, which it outputs to a sin-cos converter 31*s*. The sin-cos converter 31*s* and an atan calculator 31*v* perform the same operation and output $\xi d1\theta$ as the drift amount. A sin-cos converter 31*e* performs sin and cos conversions on the $\xi n0\phi$ and outputs the respective values to an atan 2 calculator 31*k*. The atan 2 calculator 31*k* performs an atan 2 calculation using the sin and cos converted values and outputs the result to a differencer 31*q*. Meanwhile, a sin-cos converter 31*f* performs sin and cos conversions on the $\xi m0\phi$ and outputs the respective values to an atan 2 calculator 31*m*. The atan 2 calculator 31*m* performs an atan 2 calculation using the sin and cos converted values and outputs the result to the differencer 31*q*. The differencer 31*q* calculates the difference between the two and extracts the drift amount. The differencer 31*q* then outputs the drift amount to a sin-cos converter 31*t*. The sin-cos converter 31*t* and an atan 2 calculator 31*w* perform the same operation and output $\xi d1\phi$ as the drift amount.

In this way an abnormal calculation due to discontinuity in the angular velocity posture angle and the acceleration posture angle is prevented from occurring. Also, an abnormal calculation due to discontinuity in the posture angle when the posture angle difference is calculated is prevented from occurring. Moreover, discontinuity in the posture angle of the drift amount is also eliminated so poor operation of PID control can be prevented.

Figure 25:
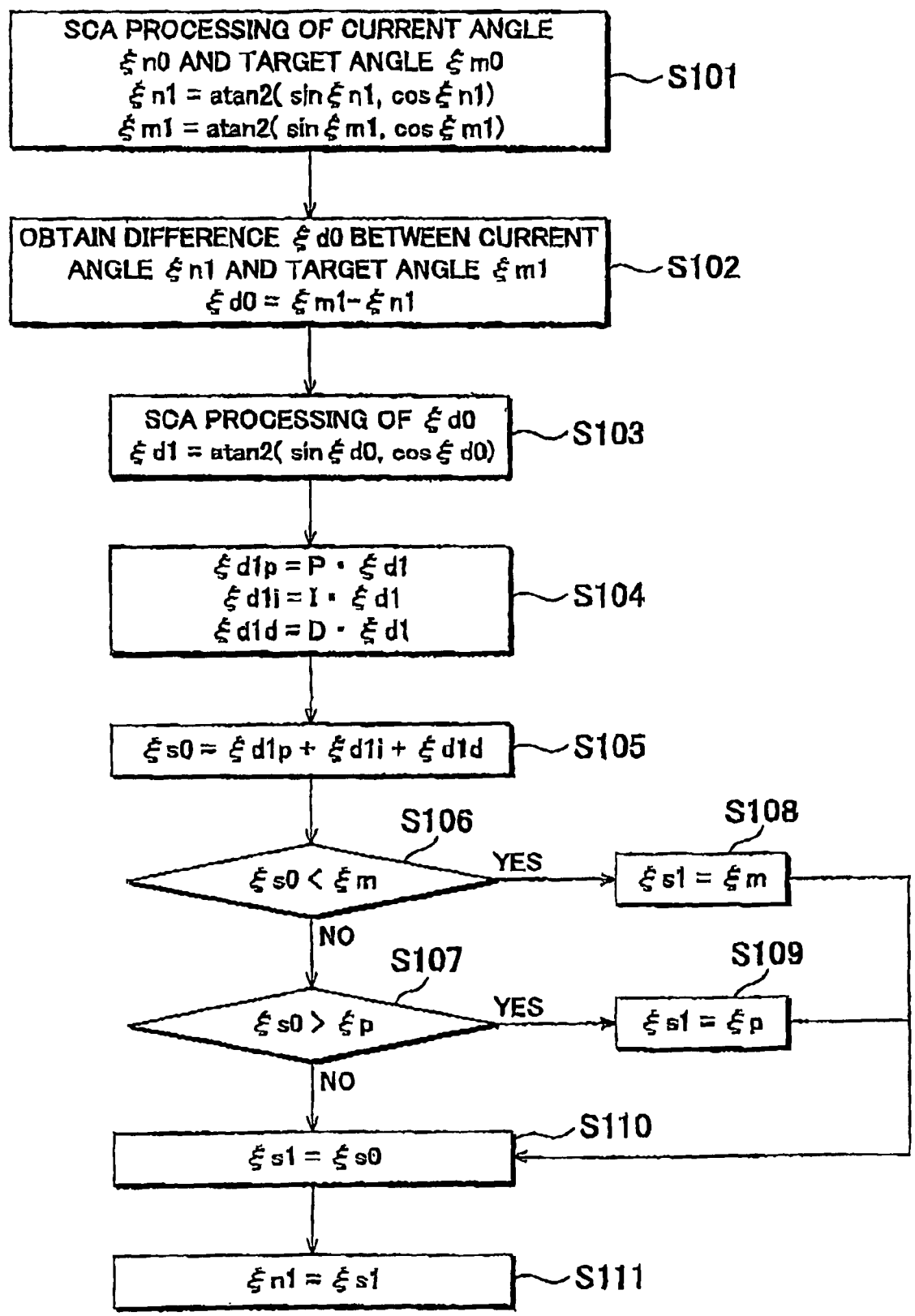
FIG. 25 is a flowchart according to the seventeenth exemplary embodiment of the invention.

FIG. 25 is a flowchart according to this exemplary embodiment. First, sin and cos conversions are performed on an angular velocity posture angle ξn1 and an acceleration posture angle ξm1, and an atan 2 or atan calculation is performed (S101). Next, the difference in the values after the calculation is calculated (S102). The value obtained through that calculation, i.e., ξd0=ξm1−ξn1, is the drift amount. Sin-cos conversions and an atan 2 or atan calculation are then performed to obtain ξd1 (S103). After the drift amount 411 is calculated, PID control is performed on that drift amount. That is, the proportional term, integral term, and differential term are calculated $$\xi d1p = P \times \xi d1$$

$$\xi d1i = I \times \xi d1$$

$$\xi d1d = D \times \xi d1$$

and then added together to obtain ξs0 (i.e., ξs0=ξd1$p$+ξd1$i$+ξd1$d$) (S104 and S105).

Then, the difference between the angular velocity posture angle ξn1 and ξs0 may be calculated. However, the posture angles are defined with ψ and φ being values between ξm=−π and ξp=+π, and θ being a value between ξm=−π/2 and ξp=+π/2 so control becomes unstable with ψ and φ if the value of ξs0 exceeds a value between −π and +π. Therefore, if ξs0 exceeds this range, it is necessary to replace it with the closest value within that range. Thus, it is first determined whether ξs0 is less than ξm=−π (S106). If ξs0 is less than ξm=−π, then ξs0 is replaced with ξm=−π and made ξs1 (S108). Also, if ξs0 is greater than ξp=π (S107), then ξs0 is replaced with ξp=π and made ξs1 (S109). No problems arise when ξs0 is between ξm=−π and ξp=π so that value is made ξs1 and the difference between it and ξn1 is calculated (S111). On the other hand, control becomes unstable with θ if the value of ξs0 exceeds a value between ξm=−π/2 and ξp=π/2. Therefore, if ξs0 exceeds this range, it is necessary to replace it with the closest value within that range. Thus, it is first determined whether ξs0 is less than ξm=−π/2 (S106). If ξs0 is less than ξm=−π/2, then ξs0 is replaced with ξm=−π/2+δ and made ξs1 (S108). Also, if ξs0 is greater than ξp=π/2 (S107), then ξs0 is replaced with ξp=π/2−δ and made ξs1 (S109). Here, δ is a real number and expresses the smallest effective number with the calculation. No problems arise when ξs0 is between ξm=−π/2 and ξp=π/2 so that value is made ξs1 and the difference between it and ξn1 is calculated (S111). However, when ξs0 becomes −π/2, it is made −π/2+δ and when ξs0 becomes π/2, it is made π/2−δ. The routine described above enables a stable posture angle to be output.

In this way, according to this exemplary embodiment, discontinuity in the parameters is eliminated by performing the sin, cos, and atan 2 conversions (i.e., SCA conversion). A supplementary explanation of the discontinuity of the posture angles and the operation of the differencer 31 is as follows.

Next, a discontinuity of the posture angles is explained. The posture angles are expressed by (ψ, θ, φ) using the ψ around the X axis, the θ around the Y axis, and the φ around the Z axis. The respective ranges are $$-\pi < \psi \leq \pi (\text{rad}) \text{ or } -180 < \psi \leq 180 \text{ (deg)}$$

$$-\pi/2 < \theta < \pi/2 (\text{rad}) \text{ or } -90 < \theta < 90 \text{ (deg)}$$

$$-\pi < \phi \leq \pi (\text{rad}) \text{ or } -180 < \phi \leq 180 \text{ (deg)}$$

Figure 26:
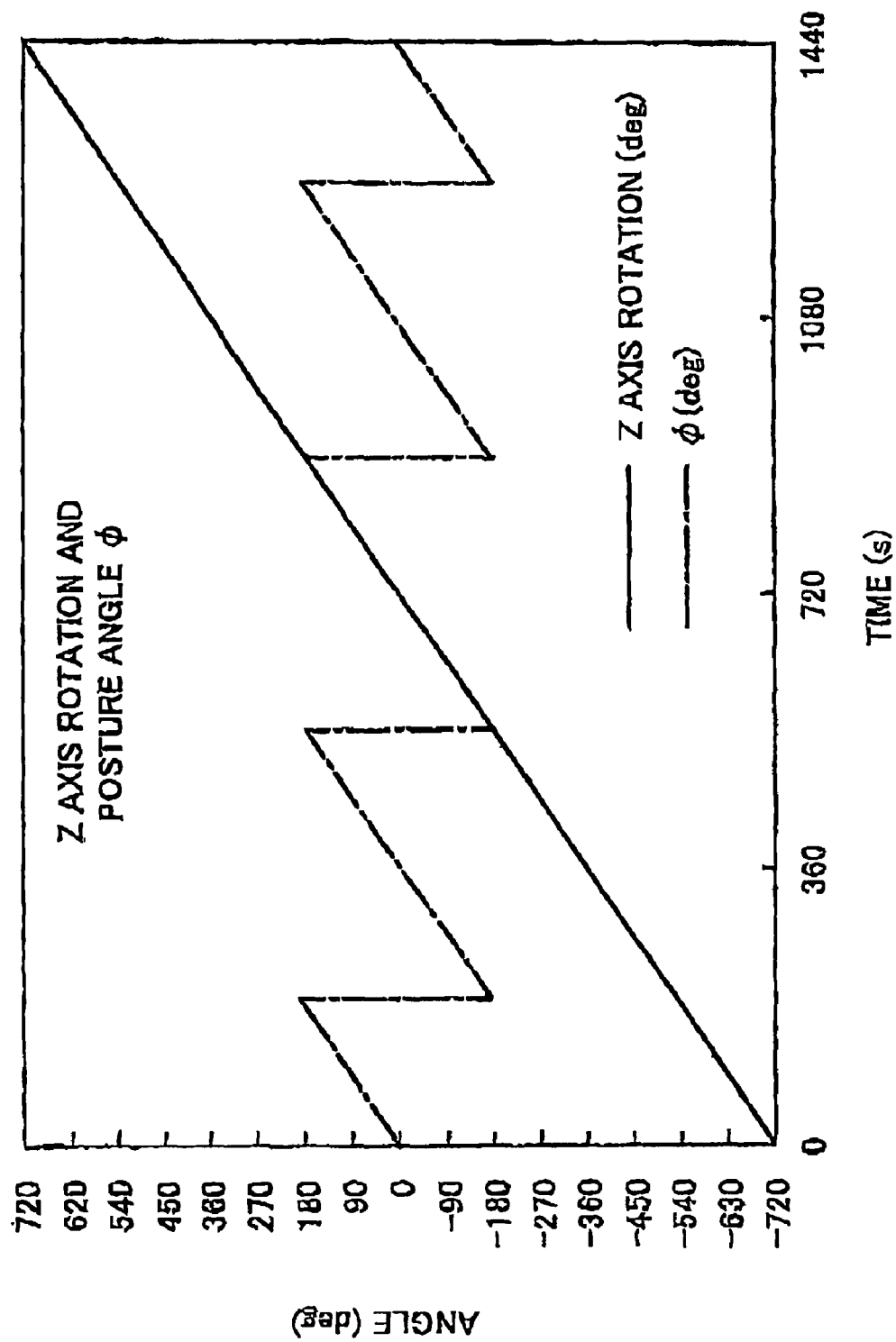
FIG. 26 is a graph showing the relationship between Z axis rotation and the posture angle $\phi$.

FIG. 26 shows the relationship between the posture angle φ and the rotation angle when there is rotation around the Z axis. When the Z axis rotation changes from −720 to 720 deg, φ oscillates in a range of ±180 deg. When the φ reaches 180 deg, it abruptly switches and starts to approach −180 deg. This is the mechanism that produces discontinuity. Although the moving body is rotating continuously over time (as illustrated by the Z axis rotation in the drawing), the posture angle φ is discontinuous.

Figure 27:
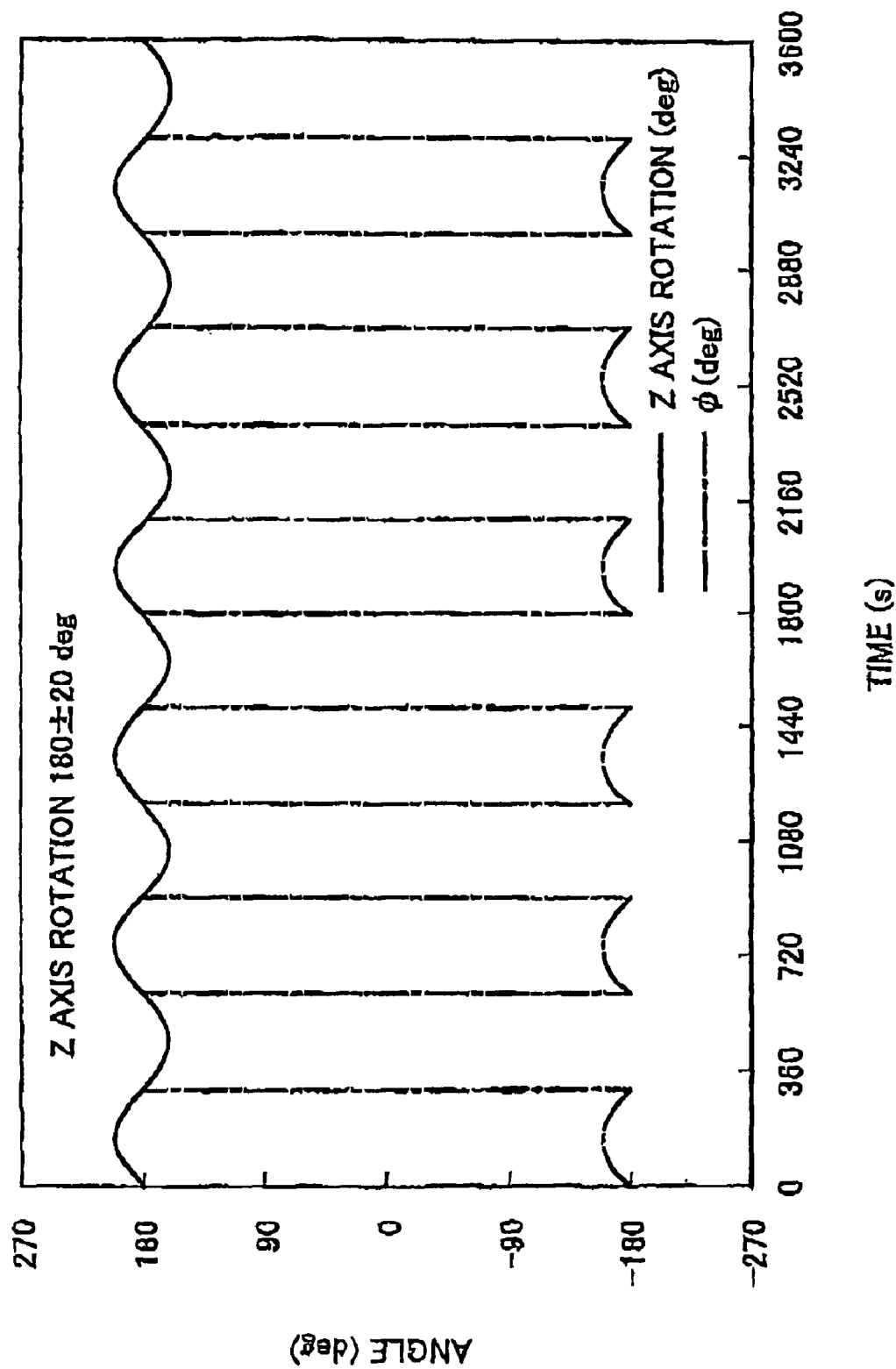
FIG. 27 is a graph illustrating a posture angle $\phi$ at a Z axis rotation of 180±20 deg.

FIG. 27 shows more specifically when a sin wave type continuous rotation oscillation of ±20 deg is applied near φ=180 deg. In the drawing, the Z axis rotation changes continuously with a ±20 deg sin wave type oscillation at 180 deg, but φ changes discontinuously between ±180 deg.

Figure 28:
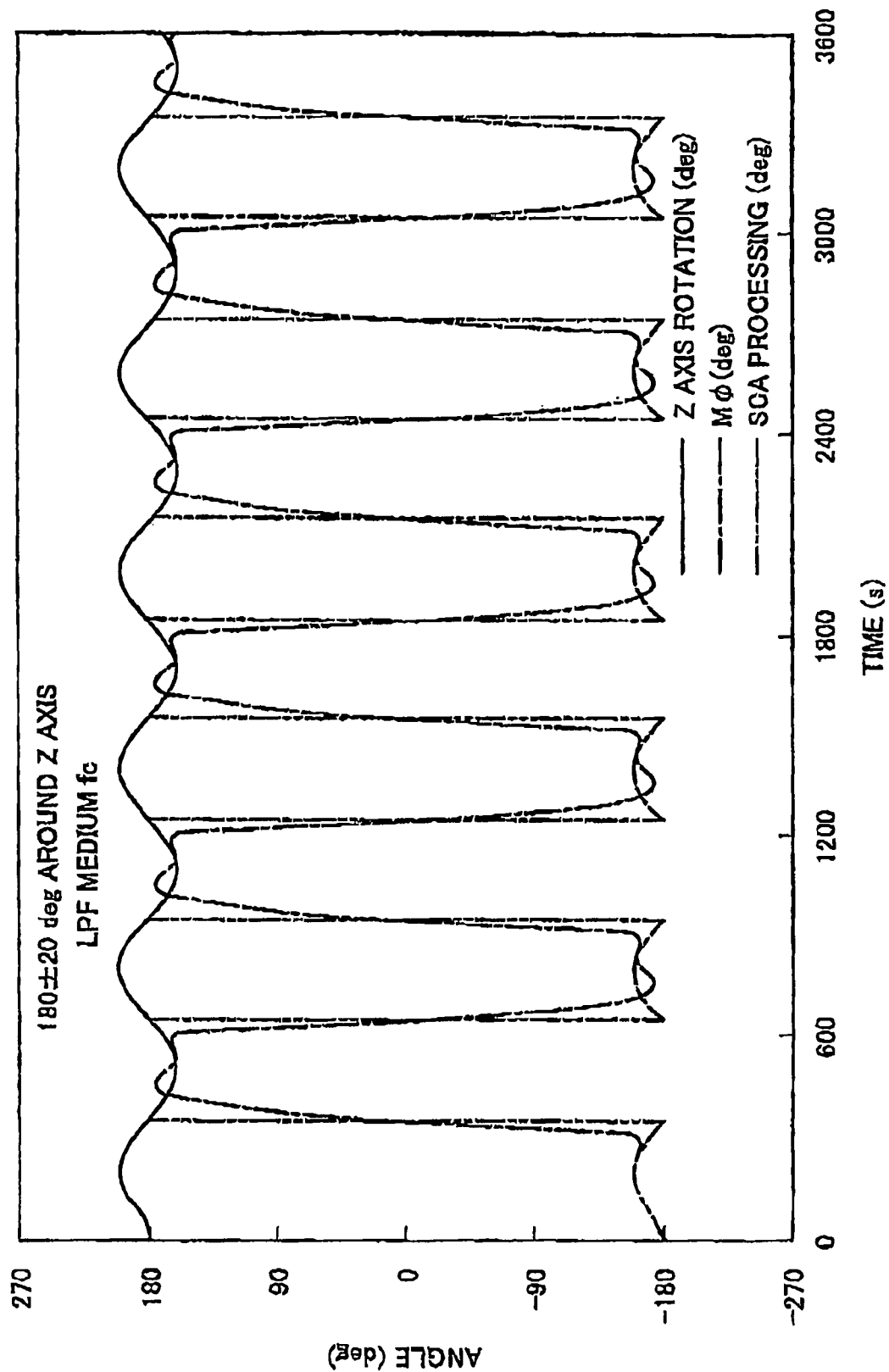
FIG. 28 is a graph showing the signals for the SCA processing, the posture angle $\phi$, and the rotation angle through which an LPF (fc=medium) has passed.
Figure 29:
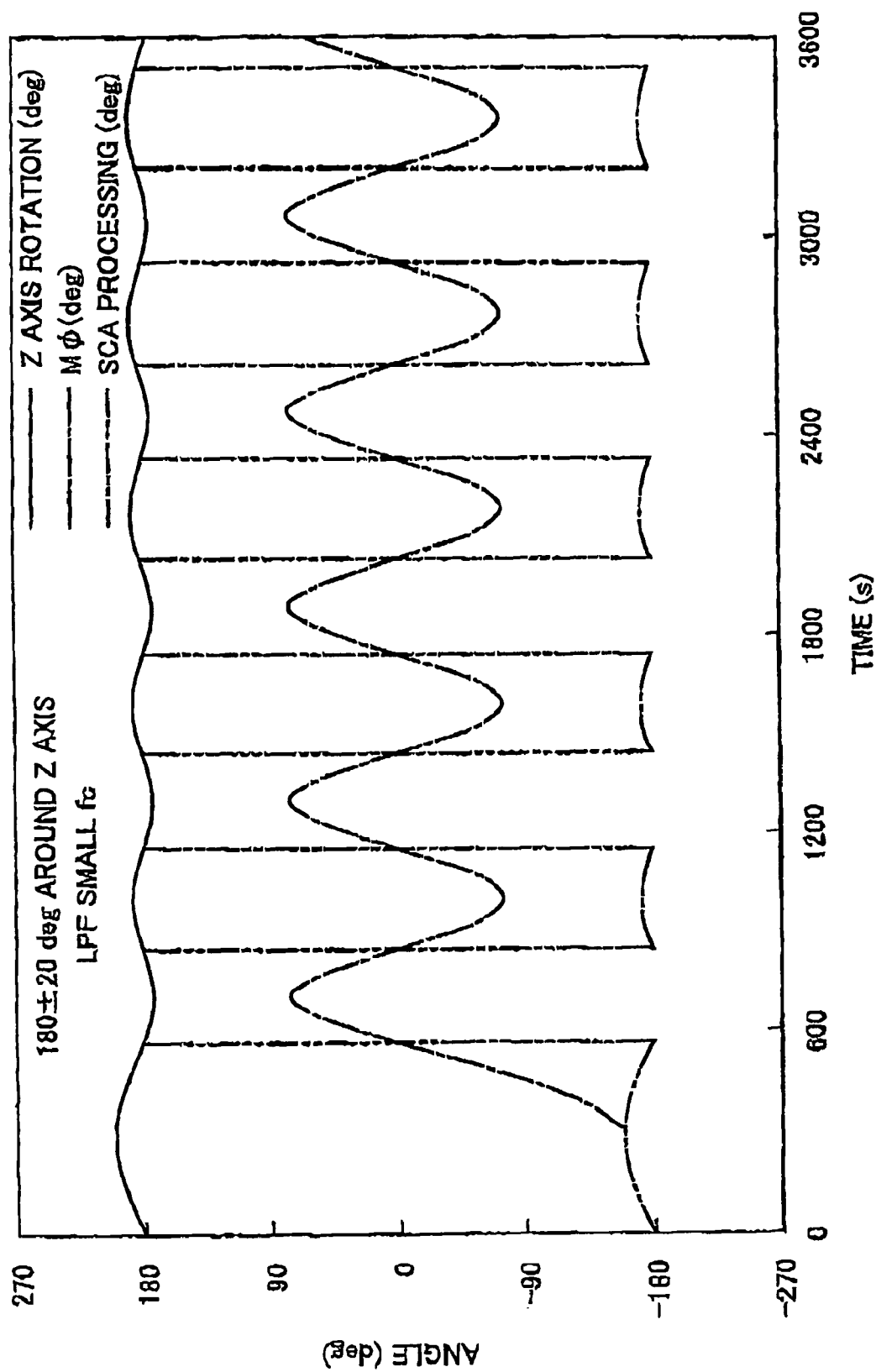
FIG. 29 is a graph showing the signals for the SCA processing, the posture angle $\phi$, and the rotation angle through which an LPF (fc=small) has passed.

FIGS. 28 and 29 simultaneously show the results from the invention as SCA processing. According to the results, the wave shape from SCA processing is similar the φ shown in FIG. 27. It is evident from the drawing that the problem in which the wave shape is distorted or altogether different like the wave shape Mφ in the related art has been solved. The same is also true for ψ. As a result, the posture angle over a wide operation range can be accurately detected.

Figure 30:
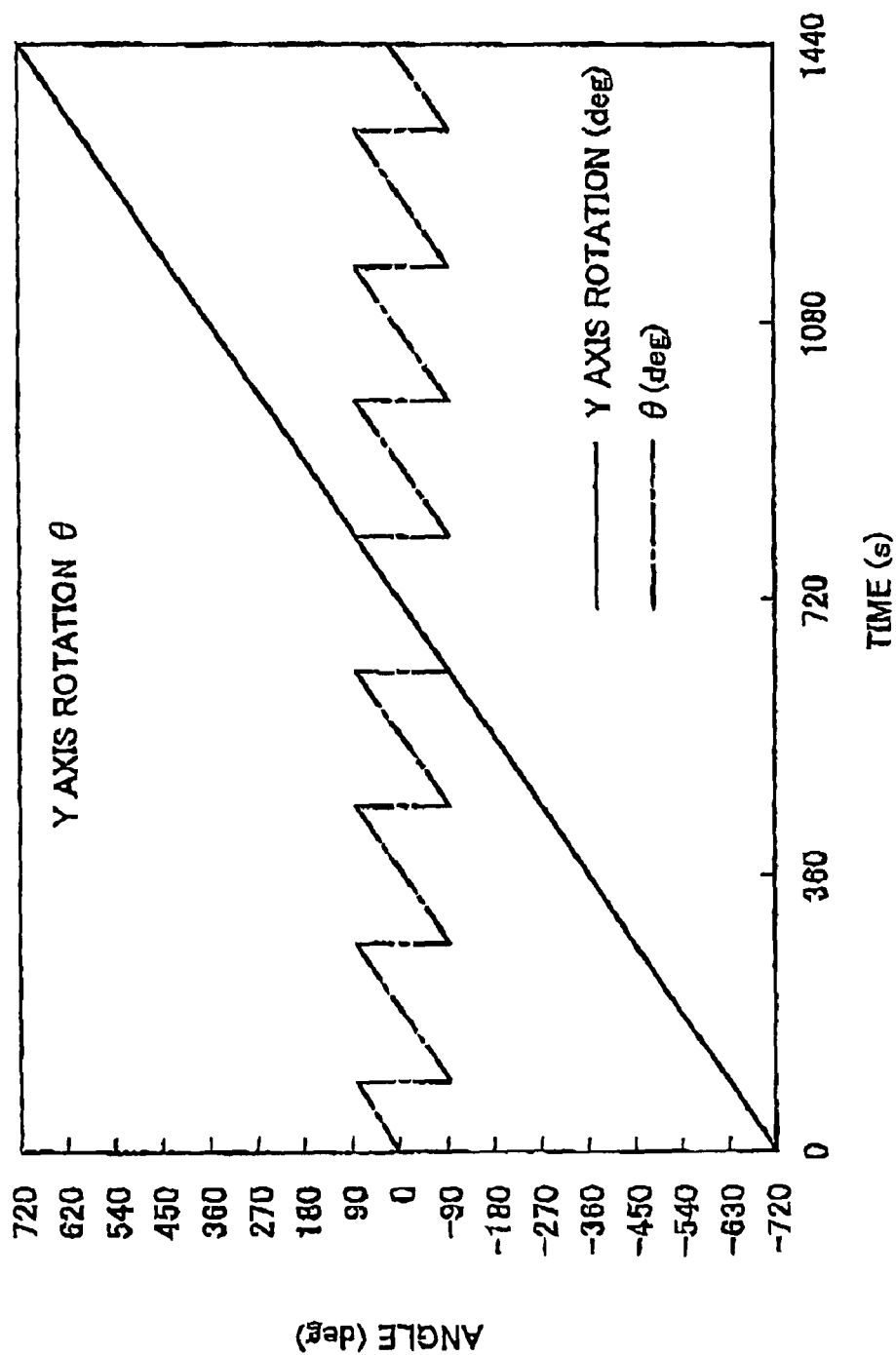
FIG. 30 is a graph showing the relationship between the posture angle $\theta$ and Y axis rotation.

FIG. 30 shows the relationship between θ and the rotation angle when there is rotation around the Y axis. When the Y axis rotation changes from −720 to 720 deg, θ oscillates in a range of ±90 deg. When the θ reaches 90 deg, it abruptly switches and starts to approach −90 deg. This is the mechanism that produces discontinuity. Although the moving body is rotating continuously over time, the posture angle θ is discontinuous.

Figure 31:
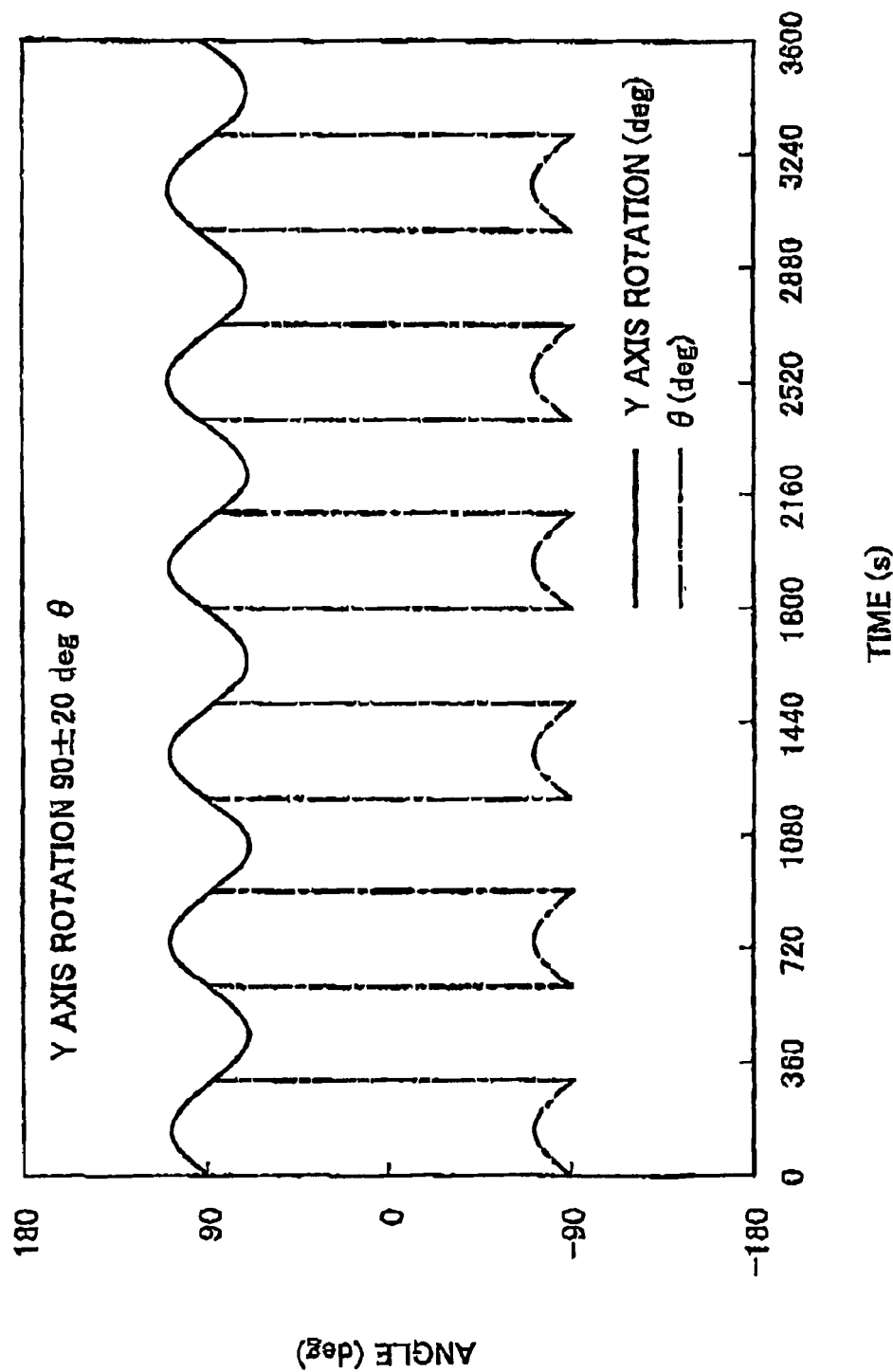
FIG. 31 is a graph illustrating a posture angle $\theta$ at a Y axis rotation of 90±20 deg.

FIG. 31 shows more specifically when a sin wave type continuous rotation oscillation of ±20 deg is applied near θ=90 deg. The Y axis rotation is changing continuously but θ changes discontinuously between ±90 deg.

Figure 32:
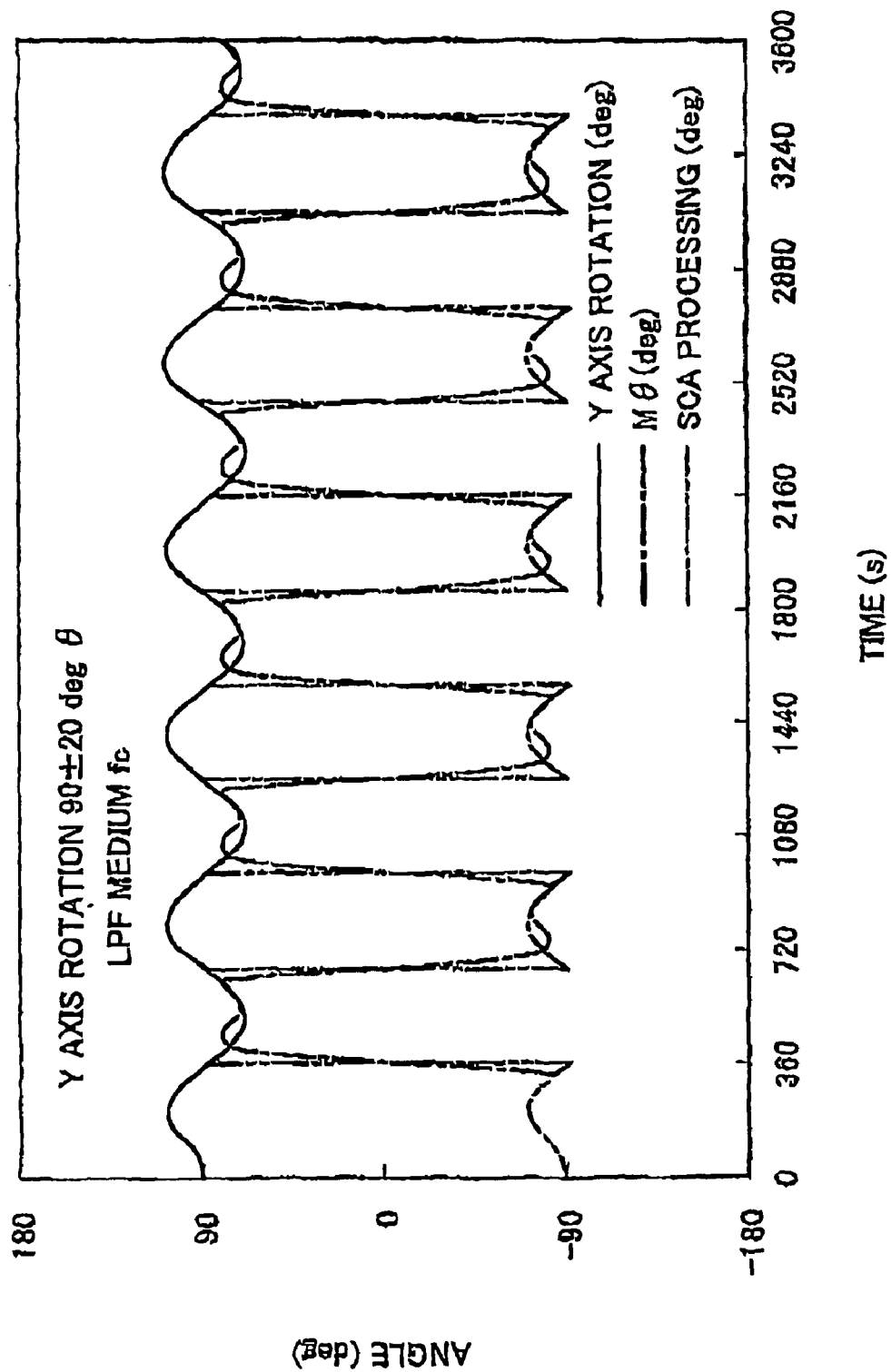
FIG. 32 is a graph showing the signals for the SCA processing, the posture angle $\theta$, and the rotation angle through which the LPF (fc=medium) has passed.
Figure 33:
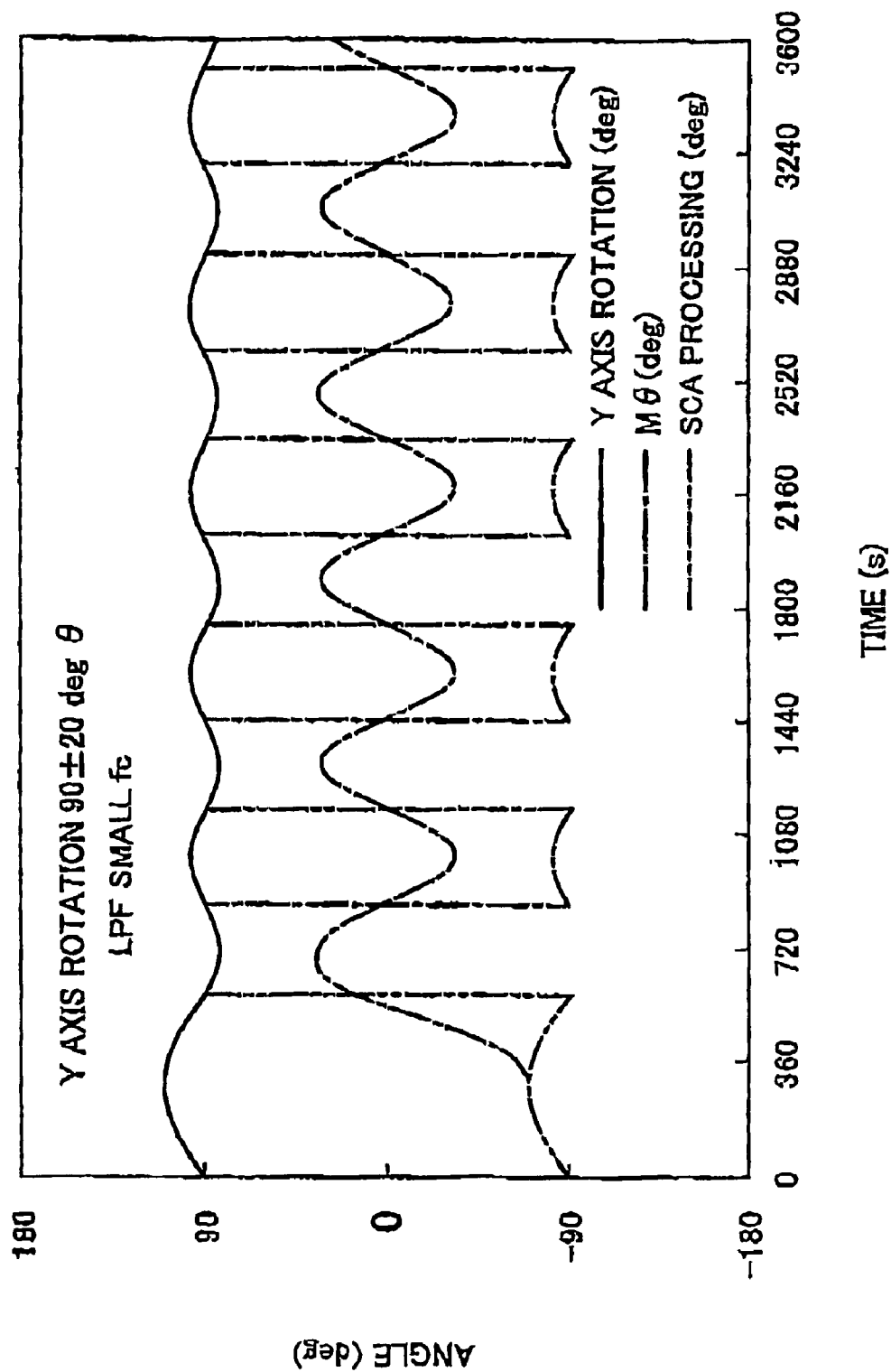
FIG. 33 is a graph showing the signals for the sin-cos conversions, the posture angle $\theta$, and the rotation angle through which the LPF (fc=small) has passed.

FIGS. 32 and 33 simultaneously show the results of the invention with SCA processing. According to the results, the wave shape from SCA processing is similar to the θ shown in FIG. 31. It is evident from the drawing that the problem in which the wave shape is distorted or altogether different like the wave shape Mθ in the related art has been solved. As a result, the posture angle over a wide operation range can be accurately detected.

Next, a SCA differencer is explained. The differencer 31 calculates the difference with respect to each component of the posture angles (ψ, θ, φ). For example, with respect to φ, let us say that in FIG. 26 the angular velocity posture angle ξnoφ is 175 deg and the acceleration posture angle ξmo is −25 deg. When a difference calculation is performed, ξno−ξmo=200 deg. Because this exceeds the ±180 deg defined range for φ, an absurdity occurs. In this way, the calculation operation results in the φ tending to exceed the defined range. Therefore, the differencer 31 performs an operation to bring the φ into the defined range. This operation is the sin, cos, and atan 2 conversion (i.e., SCA conversion). More specifically, the sin value and the cos value of ξnoφ−ξmoφ are obtained. Then ξd1φ is obtained through an atan 2 calculation using the sin and cos values. ξd1φ falls within the defined range at this time. Depending on the conditions, a method for making 200−360=−160 deg may also be used. However, many cases are possible in which it would largely exceed ±180 deg, such as ±360 deg, ±540 deg, ±720 deg. etc. Depending on the conditions, it would be necessary to describe an extremely large, essentially infinite number of combinations. Also, depending on the conditions, the numerical values may change drastically in the calculation thus resulting in discontinuity, which would make it extremely difficult to manage. In actuality, the object is a signal on which noise is superimposed. Therefore, when noise is superimposed near ±180 deg, extremely large, discontinuous oscillation is produced. As a result, it easily becomes unstable in the calculation due to its relationship with calculation accuracy such that a highly accurate and stable output is no longer able to be obtained. The SCA conversion process is a method for arithmetically performing this smoothly. It is a process which fits the data that exceeds the defined range into that defined range by a computing process, and which thus resembles normalization.

$\xi no\phi$ itself may also exceed the defined range in one of the calculations in the process. Therefore, by expressing $\xi no\phi$ with sin and cos and calculating the atan 2, $\xi no\phi$ is first made to fit within the ±180 deg range. $\xi mo\phi$ is similarly normalized to within the defined range. Next, the differencer 31 performs the calculation of $\xi no\phi - \xi mo\phi$. Depending on the state, the output of this differencer may exceed the defined range of the $\phi$. Therefore, normalization is performed by fitting the output back into the defined range by the sin-cos-atan 2 conversion. Of the posture angles $\psi$, $\theta$, and $\phi$, the defined region of $\psi$ and $\phi$ is $-\pi$ to $\pi$, which is the same as the output range of the atan 2 processing so the atan 2 calculation is performed. Meanwhile, the defined region of $\theta$ is $-\pi/2$ to $\pi/2$, which is half of the output range of the atan 2 processing. Therefore, the atan calculation is used with $\theta$. The output range of atan matches $\theta$ at $-\pi/2$ to $\pi/2$. $\mathrm{atan}(y,x)=\tan^{-1}(x,y)$ is such that in the small x region, the denominator tan (y/x) is small so the error becomes large. Therefore, when x is small compared with y, $\cot^{-1}(y,x)$ is used.

Although exemplary embodiments of the invention have heretofore been described, the invention is not limited to these exemplary embodiments. To the contrary, various modifications are possible.

For example, with the structure illustrated in FIG. 6, the motion frequency sensor 52 detects a specific frequency in the movement of the robot such as bipedal locomotion, and outputs it to the low pass filters 46 and 48. Alternatively, however, the motion frequency sensor 52 may output that specific frequency to the low pass filters 18 and 28 with the structures in FIGS. 1 to 3, and the cutoff frequency of the low pass filters 18 and 28 may be set to change adaptively.

Also, with the structure in FIG. 1, the angular velocity system posture angle from the matrix posture angle calculator (angular velocity system) 16 is output to the low pass filter 18 and the acceleration posture angle from the matrix posture angle calculator (acceleration system) 26 is output to the low pass filter 28. Alternatively, however, the angular velocity system posture angle from the matrix posture angle calculator 16 and the acceleration posture angle from the matrix posture angle calculator 26 may both be output directly to the differencer 30, the difference from the differencer 30 then input to a single low pass filter, and the low range component output as the drift amount to the subtracter 32. This is beneficial for reducing the number of LPFs. The same is also true for the structures in FIGS. 2 and 3.

Also, either an analog filter or a digital filter may be used as the low pass filter in FIGS. 1 to 6. The digital filter may be a FIR (Finite-duration Impulse Response) filter or an IIR (Infinite-duration Impulse Response) filter.

Moreover, in each of the structures, at least one of the posture angle, the angular velocity, and the acceleration is output from the output device 34 to the main processor of the robot. In addition, however, the posture matrix calculated by the matrix adding calculator 14, the posture matrix calculated by the acceleration matrix calculator 24, the drift amount calculated by the differencer 30, and the quaternions extracted by the quaternion LPFs 63 and 67 and the like may be output to the output device 34 and then output from the output device 34 to the main processor.

Also, the structures illustrated in FIGS. 20, 22, and 23 may also be provided with a motion frequency sensor 52 which inputs the angular velocity from the angular velocity sensor 10 and the acceleration from the acceleration sensor 20, and detects a particular frequency in the movement of the robot, i.e., the moving body. The motion frequency sensor extracts a frequency component that appears frequently from the angular velocity and the acceleration and outputs it to the low pass filters 18 and 28. One example is the specific frequency in bipedal locomotion when the robot, i.e., moving body, is walking on two legs. The low pass filters 18 and 28 adaptively adjust the cutoff frequency according to the frequency input from the motion frequency sensor. The low pass filters 18 and 26 increase the cutoff frequency the greater the motion frequency. Also, the motion frequency sensor outputs the motion frequency to the multiplier 38, the integrator 40, and the differencer 42 which execute PID control. The multiplier 38, the integrator 40, and the differencer 42 adjust the multiplier coefficients according to the motion frequency that was input.

Exemplary embodiments of the invention have heretofore been described. The form of each of these exemplary embodiments displays the following unique effects. That is, according to the form using the posture angle, the output is a posture angle used in control and the like related to robots, vehicles, marine vessels, and aircraft. The posture angle itself is the object of control of a correction loop in the apparatus so a stable output appropriate for the actual phenomenon is able to be obtained. Also, when optimizing the control parameters in the apparatus by suitable measurements and control, the various parameters can be effectively optimized with good compatibility with the posture angle from the actual movement. Therefore, less time and work are required for optimization and characteristics suitable for application can be obtained.

Accordingly, this form is suitable for measurement and control that utilize the posture angle as the primary subject, and enables posture measurements and control of a vehicle or robot that was either not possible or insufficient in the past. Also, with the form that uses the posture matrix, the output is the posture angle used for measurement and control and the like relating to robots, vehicles, marine vessels, and aircraft. With internal calculations, the posture matrix is the object of a correction loop. Therefore, special processing to avoid particularities and the like is not performed in internal calculations, which makes it easier to understand. Further, the posture matrix itself can also be output to an external component. Accordingly, this form is suitable for measurement and control using a posture matrix. With a posture matrix, the number of elements is greater than the number of posture angles so there is a large amount of data. This unfortunately means that it takes time for communication and the data processing is troublesome and complicated. Despite this drawback, however, the large amount of data enables problems with particularities to be avoided, as well as enables compatibility with expanded, contracted, and modified coordinate systems, and thus offers a large degree of freedom. This form is easy to use when there is sufficient communication speed, sufficient calculation speed of measurements and control, and a large area for memory necessary to perform the calculations. Therefore, this form is particularly effective when there is a fast communication network and the form is applied to a high performance measurement/control processing system having a fast calculation speed, for example, in equipment to be used in space and high level measurement/control equipment such as nuclear energy plants and industrial equipment.

Moreover, with the form using a quaternion, the output is a posture angle used in measurements and control and the like related to robots, vehicles, marine vessels, and aircraft. With internal calculations, the quaternion is the object of a correction loop. Using the quaternion is beneficial in that it reduces the amount of data necessary for the calculations as well as reduces the number of calculation steps. Accordingly, this function can be realized using a processor having moderate calculation speed and little memory in an apparatus, thereby enabling costs to be reduced. However, because the quaternion is a representational method in which the behavior in real space is difficult to understand, it is used after being converted to a posture angle. Therefore, this is a form in which the characteristics for measurement and control are clear and is thus suitable for when there are a lot of similar movements. Accordingly, this form is suitable for measurements and control of small-sized industrial equipment, multipurpose robots, and mass-produced vehicles.

The invention claimed is:

1. A moving body posture angle detecting apparatus, comprising:
    an angular velocity sensor which detects an angular velocity of a moving body;
    an acceleration sensor which detects an acceleration of the moving body;
    an angular velocity posture angle calculating device that calculates, as an angular velocity posture angle, a posture angle of the moving body from the angular velocity;
    an acceleration posture angle calculating device that calculates, as an acceleration posture angle, a posture angle of the moving body from the acceleration;
    an angular velocity posture angle low range component extracting device that extracts a low range component of the angular velocity posture angle;
    an acceleration posture angle low range component extracting device that extracts a low range component of the acceleration posture angle;
    a difference calculating device that calculates, as error, a difference between the low range component of the angular velocity posture angle and the low range component of the acceleration posture angle;
    an error removing device that removes the error from the angular velocity posture angle;
    an outputting device that outputs, as a posture angle of the moving body, an angular velocity posture angle from which the error has been removed by the error removing device; and
    a feedback device that feeds back the angular velocity posture angle from which the error has been removed by the error removing device to the angular velocity posture angle calculating device.

2. The apparatus according to claim 1, wherein the error removing device includes
    a multiplier which proportionally calculates the value of the error from the difference from the difference calculating device,
    an integrator which performs an integral calculation on the value of the error from the difference from the difference calculating device, and
    a differencer which performs a differential calculation on the value of the error from the difference from the difference calculating device;
    and removes the error by subtracting the sum of the calculated values from the multiplier, the integrator, and the differencer from the angular velocity posture angle.

3. The apparatus according to claim 2, further comprising:
    a device that detects a motion frequency specific to the moving body from the angular velocity and the acceleration,
    wherein coefficients of the multiplier, the integrator, and the differencer are variably set according to the motion frequency.

4. The apparatus according to claim 1, further comprising:
    a device that detects, independent from the acceleration sensor, a posture angle around a vertical axis of the moving body and outputs the result to the acceleration posture angle calculating device.

5. The apparatus according to claim 1, wherein the angular velocity posture angle calculating device includes
    a device that calculates a small angle matrix that defines a small rotation angle after a small period of time $\Delta t$ has passed from the angular velocity;
    a device that calculates a new angular velocity system posture matrix from the small angle matrix and a posture matrix that corresponds to the angular velocity posture angle that was fed back from the feedback device; and
    a device that calculates the angular velocity posture angle from the new angular velocity system posture matrix; and
    the acceleration posture angle calculating device includes
    a device that calculates a tilt angle from the acceleration;
    a device that calculates an acceleration system posture matrix from the tilt angle; and
    a device that calculates the acceleration posture angle from the acceleration system posture matrix.

6. The apparatus according to claim 5, wherein
    the angular velocity posture angle low range component extracting device has an angular velocity system low pass filter which extracts the low range component of the angular velocity posture angle from the device that calculates the angular velocity posture angle;
    the acceleration posture angle low range component extracting device has an acceleration system low pass filter which extracts the low range component of the acceleration posture angle from the device that calculates the acceleration posture angle; and
    the angular velocity system low pass filter and the acceleration system low pass filter have the same cutoff frequency and the same attenuation factor.

7. The apparatus according to claim 6, further comprising:
    a device that detects a motion frequency specific to the moving body from the angular velocity and the acceleration,
    wherein the cutoff frequencies of the angular velocity system low pass filter and the acceleration system low pass filter are variably set according to the motion frequency.

8. The apparatus according to claim 6, wherein
    the angular velocity posture angle low range component extracting device has an angular velocity system low pass filter which extracts the low range component of the new angular velocity system posture matrix from the device that calculates the new angular velocity system posture matrix;
    the acceleration posture angle low range component extracting device has an acceleration system low pass filter which extracts the low range component of the acceleration system posture matrix from the device that calculates the acceleration system posture matrix; and
    the angular velocity system low pass filter and the acceleration system low pass filter have the same cutoff frequency and the same attenuation factor.

9. The apparatus according to claim 8, further comprising:
    a device that normalizes and orthogonalizes the angular velocity system posture matrix from the angular velocity system low pass filter; and
    a device that normalizes and orthogonalizes the acceleration system posture matrix from the acceleration system low pass filter.

10. The apparatus according to claim 8, further comprising:
- a device that detects a motion frequency specific to the moving body from the angular velocity and the acceleration,
- wherein the cutoff frequencies of the angular velocity system low pas filter and the acceleration system low pass filter are variably set according to the motion frequency.

11. The apparatus according to claim 1, wherein the angular velocity posture angle low range component extracting device and the acceleration posture angle low range component extracting device include
- a device that sin converts and cos converts the angular velocity posture angle;
- a device that extracts a low range component of a value obtained by the sin conversion and the cos conversion; and
- a device that performs an atan 2 calculation or an atan calculation on the value of the extracted low component.

12. The apparatus according to claim 11, wherein the error removing device includes
- a multiplier which proportionally calculates the value of the error from the difference from the difference calculating device,
- an integrator which performs an integral calculation on the value of the error from the difference from the difference calculating device, and
- a differencer which performs a differential calculation on the value of the error from the difference from the difference calculating device;
- and removes the error by subtracting the sum of the calculated values from the multiplier, the integrator, and the differencer from the angular velocity posture angle.

13. The apparatus according to claim 12, further comprising:
- a device that detects a motion frequency specific to the moving body from the angular velocity and the acceleration,
- wherein coefficients of the multiplier, the integrator, and the differencer are variably set according to the motion frequency.

14. The apparatus according to claim 11, further comprising:
- a device that detects, independent from the acceleration sensor, a tilt angle around a vertical axis of the moving body and outputs the result to the acceleration posture angle calculating device.

15. The apparatus according to claim 11, wherein the angular velocity posture angle calculating device includes
- a device that calculates a small angle matrix that defines a small rotation angle after a small period of time is has passed from the angular velocity;
- a device that calculates a new angular velocity system posture matrix from the small angle matrix and a posture matrix that corresponds to the angular velocity posture angle that was fed back from the feedback device; and
- a device that calculates the angular velocity posture angle from the new angular velocity system posture matrix;
- and the acceleration posture angle calculating device includes
  - a device that calculates a tilt angle from the acceleration;
  - a device that calculates an acceleration system posture matrix from the tilt angle; and
  - a device that calculates the acceleration posture angle from the acceleration system posture matrix.

16. The apparatus according to claim 11, wherein
- the angular velocity posture angle low range component extracting device has an angular velocity system low pass filter which extracts the low range component of the sin converted and cos converted values;
- the acceleration posture angle low range component extracting device has an acceleration system low pass filter which extracts the low range component of the sin converted and cos converted values; and
- the angular velocity system low pass filter and the acceleration system low pass filter have the same cutoff frequency and the same attenuation factor.

17. The apparatus according to claim 16, further comprising:
- a device that detects a motion frequency specific to the moving body from the angular velocity and the acceleration,
- wherein the cutoff frequencies of the angular velocity system low pass filter and the acceleration system low pass filter are variably set according to the motion frequency.

18. The apparatus according to claim 11, wherein
- the difference calculating device includes a device that calculates the difference between a value which is the result of the low range component of the angular velocity posture angle after being sin converted and cos converted and then that result being atan 2 calculated or atan calculated, and a value which is the result of the low range component of the acceleration posture angle after being sin converted and cos converted and then that result being atan 2 calculated or atan calculated.

19. The apparatus according to claim 18, further comprising:
- a device that sin converts and cos converts the value obtained by calculating the difference and atan 2 calculating or atan calculating the result.

20. The apparatus according to claim 11, wherein
- a ψ or a φ of the angular velocity posture angle and the acceleration posture angle are defined as angles between −π and π, inclusive;
- the error removing device removes the error from the angular velocity posture angle by replacing the error with −π when the error is less than −π and replacing the error with π when the error is greater than π
- a θ of the angular velocity posture angle and the acceleration posture angle is defined as an angle between −π/2 and π/2, inclusive; and
- the error removing device removes the error from the angular velocity posture angle by replacing the error with −π/2+δ (δ is a real number) when the error is less than −π/2 and replacing the error with π/2−δ when the error is greater than π/2.

21. A moving body posture angle detecting apparatus, comprising:
- an angular velocity sensor which detects an angular velocity of a moving body;
- an acceleration sensor which detects an acceleration of the moving body;
- an angular velocity posture angle calculating device that calculates, as an angular velocity posture angle, a posture angle of the moving body from the angular velocity;
- an acceleration posture angle calculating device that calculates, as an acceleration posture angle, a posture angle of the moving body from the acceleration;
- a difference calculating device that calculates a difference between the angular velocity posture angle and the acceleration posture angle;

a low range component extracting device that extracts, as error, a low range component of the difference;

an error removing device that removes the error from the angular velocity posture angle;

an outputting device that outputs, as a posture angle of the moving body, an angular velocity posture angle from which the error has been removed by the error removing device; and a feedback device that feeds back the angular velocity posture angle from which the error has been removed by the error removing device to the angular velocity posture angle calculating device.

22. A moving body posture angle detecting apparatus, comprising:

an angular velocity sensor which detects an angular velocity of a moving body;

an acceleration sensor which detects an acceleration of the moving body;

a device that calculates a small angle matrix which defines a small rotation angle after a small period of time is has passed from the angular velocity;

a device that calculates a new angular velocity system posture matrix from the small angle matrix and a posture matrix that was fed back;

a device that calculates a tilt angle from the acceleration;

a device that calculates an acceleration system posture matrix from the tilt angle;

an angular velocity system low range component extracting device that extracts a low range component of the angular velocity system posture matrix;

an acceleration system low range component extracting device that extracts a low range component of the acceleration system posture matrix;

a difference calculating device that calculates, as error, a difference between the low range component of the angular velocity system posture matrix and the low range component of the acceleration system posture matrix;

an error removing device that removes the error from the angular velocity system posture matrix;

an outputting device that calculates a posture angle from the angular velocity system posture matrix from which the error has been removed by the error removing device and outputs the result a posture angle of the moving body; and a feedback device that feeds back the angular velocity system posture matrix from which the error has been removed by the error removing device to the device that calculates the new angular velocity system posture matrix.

23. The apparatus according to claim 22, wherein the error removing device includes a multiplier which proportionally calculates the value of the error from the difference from the difference calculating device, an integrator which performs an integral calculation on the value of the error from the difference from the difference calculating device, and a differencer which performs a differential calculation on the value of the error from the difference from the difference calculating device;

and removes the error by subtracting a matrix obtained by adding the calculated values from the multiplier, the integrator, and the differencer from the angular velocity system posture mixture.

24. The apparatus according to claim 23, further comprising:

a device that detects a motion frequency specific to the moving body from the angular velocity and the acceleration, wherein coefficients of the multiplier, the integrator, and the differencer are variably set according to the motion frequency.

25. The apparatus according to claim 22, further comprising:

a device that detects, independent from the acceleration sensor, a tilt angle around a vertical axis of the moving body and outputting the result to the device that calculates the acceleration system posture device.

26. The apparatus according to claim 22, wherein the angular velocity system low range component extracting device has an angular velocity system low pass filter;

the acceleration system low range component extracting device has an acceleration system low pass filter; and the angular velocity system low pass filter and the acceleration system low pass filter have the same cutoff frequency and the same attenuation factor.

27. The apparatus according to claim 26, further comprising:

a device that normalizes output of the angular velocity system low pass filter; and a device that normalizes output of the acceleration system low pass filter.

28. The apparatus according to claim 26, further comprising:

a device that detects a motion frequency specific to the moving body from the angular velocity and the acceleration, wherein the cutoff frequencies of the angular velocity system low pass filter and the acceleration system low pass filter are variably set according to the motion frequency.

29. A moving body posture angle detecting apparatus, comprising:

an angular velocity sensor which detects an angular velocity of a moving body;

an acceleration sensor which detects an acceleration of the moving body;

a device that calculates a small angle quaternion which defines a small rotation angle after a small period of time is has passed from the angular velocity;

a device that calculates a new angular velocity system quaternion from the small angle quaternion and a quaternion that was fed back;

a device that calculates a tilt angle from the acceleration;

a device that calculates an acceleration system quaternion from the tilt angle;

an angular velocity system low range component extracting device that extracts a low range component of the angular velocity system quaternion;

an acceleration system low range component extracting device that extracts a low range component of the acceleration system quaternion;

a difference calculating device that calculates, as error, a difference between the low range component of the angular velocity system quaternion and the low range component of the acceleration system quaternion;

an error removing device that removes the error from the angular velocity system quaternion;

an outputting device that calculates a posture angle from the angular velocity system quaternion from which the error has been removed by the error removing device and outputs the result a posture angle of the moving body; and a feedback device that feeds back the angular velocity system quaternion from which the error has been removed by the error removing device to the device that calculates the new angular velocity system quaternion.

30. The apparatus according to claim 29, wherein the error removing device includes a multiplier which proportionally calculates the value of error from the difference from the difference calculating device, an integrator which performs an integral calculation on the value of the error from the difference from the difference calculating device, and a differencer which performs a differential calculation on the value of the error from the difference from the difference calculating device;

and removes the error by subtracting a quaternion obtained by adding the calculated values from the multiplier, the integrator, and the differencer together from the angular velocity system quaternion.

31. The apparatus according to claim 30, further comprising:

a device that detects a motion frequency specific to the moving body from the angular velocity and the acceleration, wherein coefficients of the multiplier, the integrator, and the differencer are variably set according to the motion frequency.

32. The apparatus according to claim 29, further comprising:

a device that detects, independent from the acceleration sensor, a tilt angle around a vertical axis of the moving body and outputting the result to the device that calculates the acceleration system posture device.

33. The apparatus according to claim 29, wherein the angular velocity posture angle low range component extracting device has an angular velocity system low pass filter;

the acceleration system low range component extracting device has an acceleration system low pass filter; and the angular velocity system low pass filter and the acceleration system low pass filter have the same cutoff frequency and the same attenuation factor.

34. The apparatus according to claim 33, further comprising:

a device that normalizes output of the angular velocity system low pass filter; and a device that normalizes output of the acceleration system low pass filter.

35. The apparatus according to claim 33, further comprising:

a device that detects a motion frequency specific to the moving body from the angular velocity and the acceleration, wherein the cutoff frequencies of the angular velocity system low pass filter and the acceleration system low pass filter are variably set according to the motion frequency.

* * * * *